(12) United States Patent
Monzyk et al.

(10) Patent No.: US 8,585,903 B2
(45) Date of Patent: Nov. 19, 2013

(54) WATER PURIFICATION

(75) Inventors: Bruce F. Monzyk, Jerome Township, OH (US); F. Michael Von Fahnestock, Columbus, OH (US); James Kevin Rose, Millersport, OH (US); H. Nick Conkle, Columbus, OH (US); Ming Wang, Emeryville, CA (US); Satya P. Chauhan, Columbus, OH (US); Ruey K. Bruce, Columbus, OH (US); Tenisha Highsmith, Westerville, OH (US)

(73) Assignee: Winner Water Services, Inc., Sharon, PA (US)

( * ) Notice: Subject to any disclaimer, the term of this patent is extended or adjusted under 35 U.S.C. 154(b) by 901 days.

(21) Appl. No.: 12/527,325

(22) PCT Filed: Feb. 14, 2008

(86) PCT No.: PCT/US2008/002092
§ 371 (c)(1),
(2), (4) Date: Mar. 29, 2010

(87) PCT Pub. No.: WO2008/100610
PCT Pub. Date: Aug. 21, 2008

(65) Prior Publication Data
US 2010/0176061 A1 Jul. 15, 2010

Related U.S. Application Data

(63) Continuation-in-part of application No. 11/809,893, filed on May 31, 2007, now abandoned.

(60) Provisional application No. 60/901,624, filed on Feb. 14, 2007.

(51) Int. Cl.
*B01D 21/01* (2006.01)
*C02F 1/26* (2006.01)
*C02F 1/52* (2006.01)
*C02F 1/56* (2006.01)

(52) U.S. Cl.
USPC ........... 210/639; 210/669; 210/712; 210/729; 210/787; 210/804; 210/806; 252/175; 252/179

(58) Field of Classification Search
USPC ......... 210/634, 638, 639, 669, 702, 708, 712, 210/729, 732, 735, 787, 801, 803–806, 912, 210/913, 683, 684, 688; 252/175, 179–181
See application file for complete search history.

(56) References Cited

U.S. PATENT DOCUMENTS 2,126,368 A * 8/1938 Colbeth ......................... 516/139
2,980,657 A * 4/1961 Melamed ....................... 526/307

(Continued)

FOREIGN PATENT DOCUMENTS

| EP | 1 533 276 | 5/2005 |
| GB | 1 057 933 | 2/1967 |
| GB | 2 356 860 | 6/2001 |

OTHER PUBLICATIONS
International Search Report for PCT/US2008/002092.

(Continued)

*Primary Examiner* — Joseph Drodge
(74) *Attorney, Agent, or Firm* — Richard M. Klein; Fay Sharpe LLP

(57) ABSTRACT

The invention provides an efficient method to purify an aqueous solution, typically mine drainage water, especially of anions and cations present in the aqueous solution as dissolved solids, the anions and cations are removed by treatment with a positively charged extractant having at least eight carbon atoms, whereby an unstable emulsion is formed; the unstable emulsion is allowed to break into an extract phase loaded with the anions and cations, and a water phase depleted in anions and cations; a floc inherently forms in the loaded extractant phase and then the loaded extractant phase and floc are separated from the purified water and treated to remove the anions and cations as concentrated useful products; the treated aqueous phase now reduced in anion and/or cation content is also separated from the emulsion as a purified aqueous solution. The extractant phase is preferably recycled. A continuous water purification process is provided.

31 Claims, 21 Drawing Sheets

(56) References Cited

U.S. PATENT DOCUMENTS

| | | | | |
|---|---|---|---|---|
| 3,288,707 | A | * | 11/1966 | Hurwitz ................... 210/735 |
| 3,300,406 | A | * | 1/1967 | Pollio ..................... 210/666 |
| 4,026,790 | A | | 5/1977 | Moore et al. |
| 4,151,076 | A | | 4/1979 | Reinhardt et al. |
| 4,198,294 | A | * | 4/1980 | Deane ..................... 210/650 |
| 4,876,004 | A | | 10/1989 | Verhoeff |
| 5,073,272 | A | * | 12/1991 | O'Neill et al. ............. 210/728 |
| 5,112,500 | A | * | 5/1992 | Jones ..................... 210/728 |
| 5,151,195 | A | * | 9/1992 | Buriks et al. ............. 210/705 |
| 5,286,386 | A | * | 2/1994 | Darian et al. ............. 210/639 |
| 5,447,638 | A | * | 9/1995 | Holdar et al. ............. 210/728 |
| 5,520,820 | A | * | 5/1996 | Moody et al. ............. 210/734 |
| 5,560,826 | A | | 10/1996 | Szereday et al. |
| 6,126,837 | A | * | 10/2000 | Miknevich et al. ........ 210/705 |
| 6,171,506 | B1 | * | 1/2001 | Allen et al. ............... 210/728 |
| 7,331,472 | B2 | * | 2/2008 | Seregin et al. ............ 210/521 |
| 2002/0190005 | A1 | * | 12/2002 | Branning ................. 210/702 |
| 2004/0010955 | A1 | | 1/2004 | Zhuang et al. |
| 2004/0129636 | A1 | | 7/2004 | Monzyk et al. |
| 2006/0060539 | A1 | | 3/2006 | Anthony |
| 2006/0237372 | A1 | * | 10/2006 | Arciszewski et al. ..... 210/708 |
| 2009/0184055 | A1 | * | 7/2009 | Mueller ................... 210/708 |

OTHER PUBLICATIONS

Written Opinion for PCT/US2008/002092.

* cited by examiner

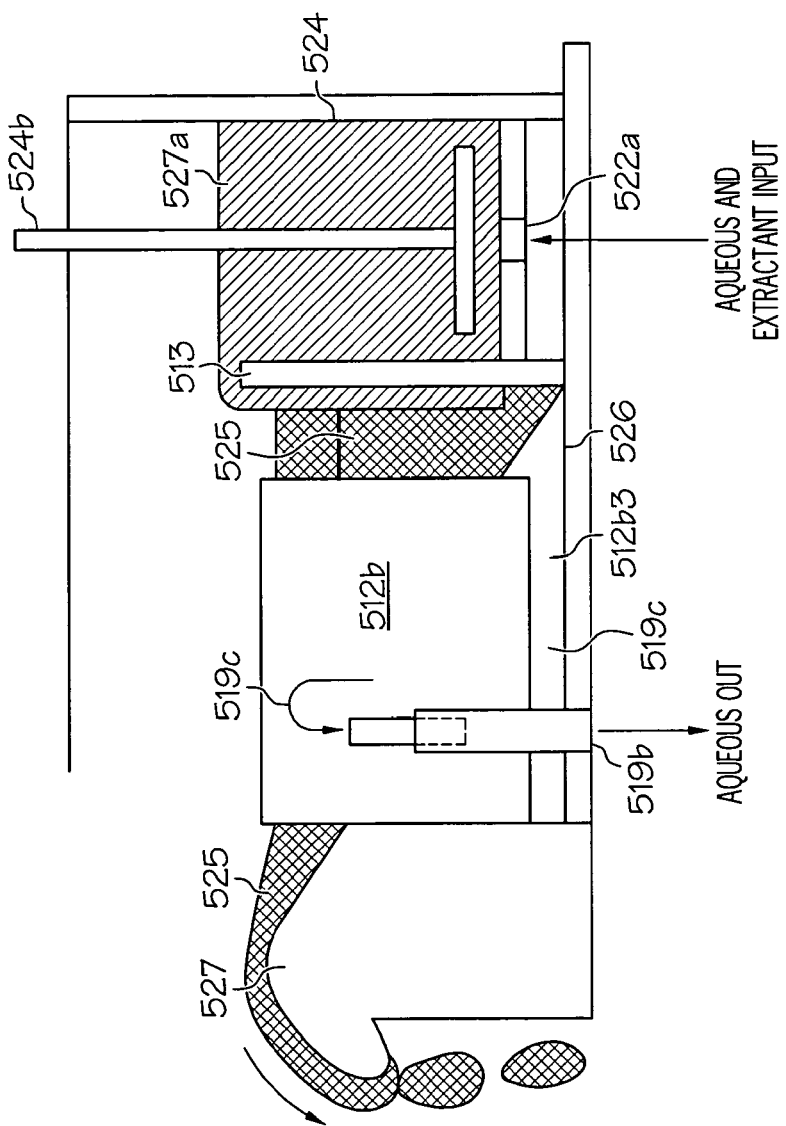

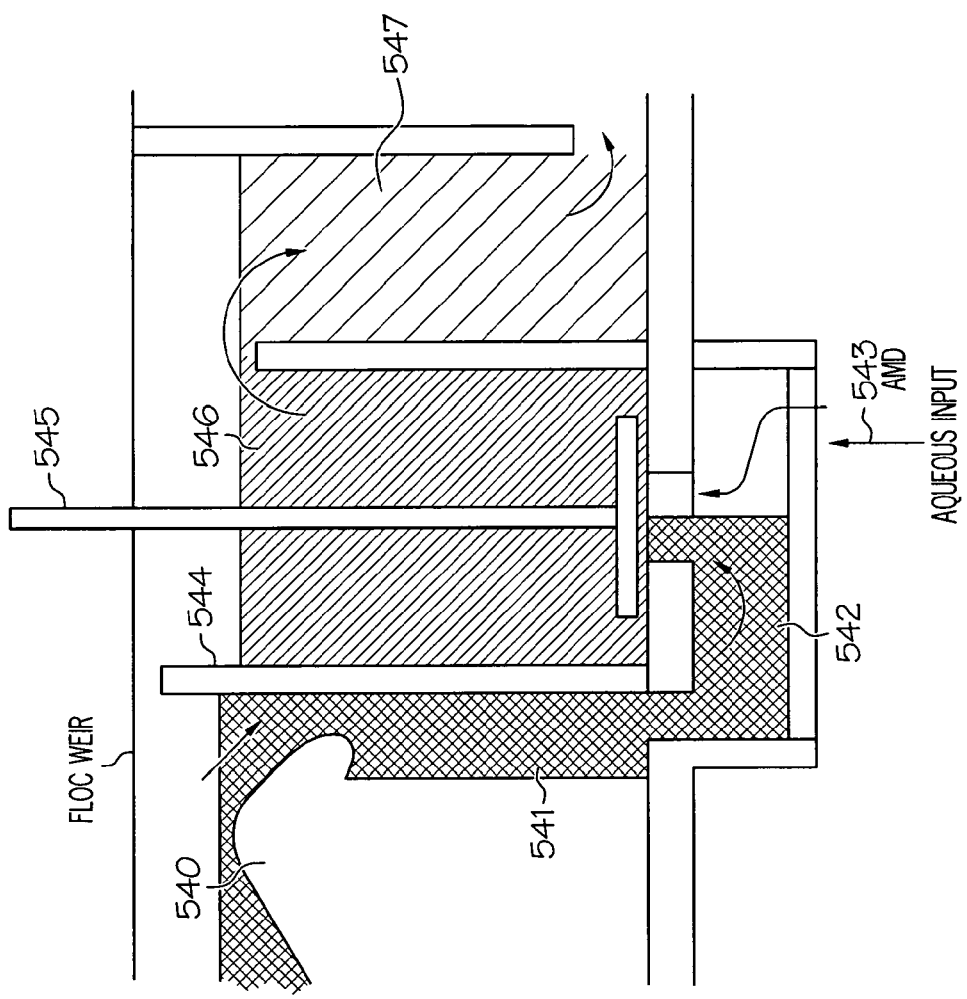

WATER PURIFICATION

This application claims the benefit of and is a continuation-in-part of U.S. application Ser. No. 11/809,893, filed May 31, 2007 now abandoned, that claims the benefit of U.S. Provisional Application No. 60/901,624, filed Feb. 14, 2007, Water Purification, Bruce F. Monzyk et al. inventors.

The entire disclosures of the two above applications are hereby incorporated by reference.

FIELD OF THE INVENTION

The invention provides for large scale water purification that is useful for removing anions and cations simultaneously from a large variety of contaminated waters.

A particularly useful application is in the purification of acid mine drainage.

BACKGROUND OF THE INVENTION

The demand for decontaminated fresh water has been steadily increasing in the United States and world wide due to increasing populations and increasing industrialization, mining operations, and agriculture and this trend is projected to continue. In addition, fresh water sources, such as wells that use aquifer water are increasingly found to be contaminated by these mostly human activities. A particularly problematic example is that of mining, especially that of coal mining, where the mining activity has exposed gangue minerals left in the mine and mine tailings to erosion by air, water, and microbial action. Sulfidic minerals, such as pyrite, $FeS_2$, are commonly found in many geological strata, and especially in reducing ore bodies such as coals and metal sulfide.

As described thoroughly in an extensive literature spanning many decades, coal, metal and other mining operations, and natural weathering fissures have allowed water, air, and microbial access to these reducing substances. These conditions promote the oxidation of the sulfidic minerals to water soluble ferrous sulfate and other metal sulfates; thereby, especially when exposed to air at the surface, producing an acidic discharge or ground water of hundreds and even often above 2000 ppm of total dissolved solids (see Tables 2A, 2B, and 2C). Such contaminated ground water is unsuitable for most uses, including municipal, industrial, residential, and farming; is foul tasting; is odorous; is toxic to aquatic ecosystems, plants, and animals; and can mobilize additional metal contaminants by acid dissolution of natural or man-made materials.

The problems of water purification and treatments of acid mine drainage and acid rock drainage, collectively referred to as acid mine drainage or AMD water, are well described in the literature. Hereinafter, when acid mine drainage is discussed, unless mentioned otherwise, the text will apply to acid rock and natural gas well brines drainage also. Conventional technologies have been found to be unsuitable for processing such waters especially where total flow rates exceed 10 gal/min and can reach 100,000 gal/min. Dissolved metal cation and counter anion concentrations in acid mine drainage can be far above the levels removable by technologies known in the art. Other conventional technologies have major disadvantages including high initial capital costs, slow reaction times, high reagent costs, reagent hazards, and/or production of waste sludges. But most importantly, they do not remove the major problematic contaminant, sulfate ion. Sulfate ion is responsible for heavy fouling or scaling during industrial use, foul tastes and odors, laxative effects, and very high level of corrosiveness to construction metals and concrete.

BRIEF DESCRIPTION OF THE INVENTION

Broadly, the invention provides for a practical, low-cost, large-scale water purification process with minimal or no waste generation, suitable for very high flow rates, even thousands of gallons per minute, provides simultaneous, very rapid anion and cation removal, including sulfate ion, which thereby reduces total dissolved solids (TDS), and features a small equipment foot print, and co-product production. The invention is particularly suitable for the purification of acid mine drainage or acid rock ground drainage waters (AMD/ARD) without the massive waste generation characteristic of prior art technologies. The new process of the invention provides recovery of non-toxic, low TDS, and useful purified water with metals and sulfate co-products.

This invention provides a means to substantially purify water, especially suited for large volumes of water in a continuous fashion, in a unique manner by the simultaneous removal of anions and cations using a process based on a particular combination of liquid-liquid extraction (LLX), oil skimming, and flotation (F) technologies. Unique attributes of the process chemistry and associated device design of the invention, referred to as flotation liquid-liquid extraction (F-LLX) (typically the floc and extractant float), are that it:

Provides for the fast removal of these ions at rates 10-100 times faster than conventional technologies, Where only 45 to 90 seconds of contact time is required, and Enables the extraction of metal ions normally not extractable or not well extracted by conventional methods, Extracts a broader spectrum of ions, and Extracts anions and cations simultaneously (TDS) to lower residual concentrations than by conventional LLX processing.

Performs these extractions at mild conditions of pH and temperature (nominally pH 7-8 and ambient temperature of 1° C. to 99° C.).

Provides the production of metal ion product concentrates, solid salts, and/or solids of oxides, hydroxides and/or carbonates.

Provides the production of sulfate ion product concentrates and/or solid salts.

Provides a low cost means to purify large volumes of water continuously and in high yield (>99%), even thousands of gallons per minute in a simple manner, and with relatively much smaller equipment size than conventional treatments.

Provides a low cost means to purify continuously large volumes of water that are contaminated with sulfate ion (300-10,000 mg/L $SO_4^{2-}$), and even thousands of gallons (0.5-10 Kgal/min) per minute.

Provides a one step, high yielding, and continuous unit operation that removes toxic cations, salinity, hardness, TSS, TDS, and/or acidity, including the very difficult species: ferric, ferrous, aluminum, nickel, cobalt, manganese, zinc and sulfate ions with acid neutralization, in a relatively small size of hardware with concomitant concentration of values to enable their use as products.

For a typical acid mine drainage stream, the process of the invention does not produce large volumes of gypsum/limestone sludge wastes, nor does it produce membrane or resin back flush wastes, which are produced by conventional technologies. The invention accomplishes waste prevention by avoiding the addition of voluminous amounts of limestone, lime, slaked lime, dolomite, etc., minerals or wetland muds and vegetation. Instead, an important attribute of the invention is that it handles the waters for only a few minutes and then releases it; while at the same time the invention simultaneously concentrates the contaminants many fold, normally 10 to 1000 or more times, while continuously recycling the water-immiscible liquid extractant phase. Note that the term extractant phase and extractant solution are used interchangeably herein. The continuous regeneration of the extractant phase results in highly-efficient use of working capital thereby requiring only a small inventory of the extractant phase. The metal and sulfate product concentrates are readily processed into useful commodities by well-known methods.

The invention includes new compositions of matter consisting of formulations of at least one cationic liquid extractant component combined with metal ions to form a colloid consisting of one or more ions selected from oxide, hydroxide carbonate and/or bicarbonate ions combined with one or more non-basic anions to form an oil soluble phase that, when combined, form a floc useful for the simultaneous separation and recovery of such solutes. It is especially useful to reduce high metal ion and sulfate ion concentrations in water, for example as are found in mining and mineral processing effluent waters, in industrial process effluent waters, livestock farm waters, and the like. TDS is reduced from high levels, for example TDS values of 700-5000 mg/L, down to levels that allow water re-use, for example to less than 600 mg/L TDS for surface water discharge, or less than 250 ppm total dissolved solids to enable re-use as drinking/potable water, and down to deionized water for industrial or non $H_2S$-forming potable water use where TDS less than about 125 ppm is needed, and with toxic metal ions removed to <1 or even <0.3 ppm. The invention can reduce sulfate ion to <250 or even to <30 ppm.

It is believed that the above-mentioned efficient deionization of water is accomplished by a unique physio-chemical process based on involving the fast formation of a new substantially hydrophobic floc material described above and where such material can be in colloidal form, particulate form, gel form, and/or floc form, and preferably also contain oil soluble non-flammable alcohol, ester and/or other oxygenated hydrocarbon modifier, with a low-viscosity, non-flammable, hydrocarbon liquid diluent, and that is less dense than water and is immiscible in water so that, left unmixed, it readily separates from water by spontaneous phase disengagement.

Production of waste is minimized in the invention by avoiding the use of conventional bulking reagents in current practice such as lime, slaked lime, limestone, dolomite, or ferric, ferrous, salts, and/or aluminum salts or coagulants and/or precipitants, that invariably result in producing hazardous, unuseable, low-density solid sludge toxic wastes that lead to dilution of the values.

New products of commerce are also provided that are new composition of matter of the formulas:

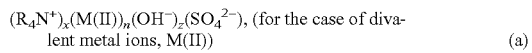

$(R_4N^+)_x(M(II))_n(OH^-)_z(SO_4^{2-})$, (for the case of divalent metal ions, M(II))    (a)

and

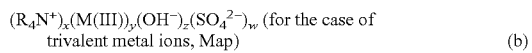

$(R_4N^+)_x(M(III))_y(OH^-)_z(SO_4^{2-})_w$ (for the case of trivalent metal ions, Map)    (b)

and consists of a combination of ferric, ferrous, aluminum, and sulfate ions in specific range of proportions. This material is formed using the invention as highly concentrated aqueous solutions ready for use and/or as a crystalline solid material. This new composition is useful for purification of potable water; purification of agricultural liquid wastes, food wastes, and municipal sewage; purification of industrial waste water, and the like.

The following disclosure contains a general description where steps of one or more processes are designated as first, second, third, and so on. This is solely to clearly differentiate process steps that may be repeated in different embodiments from each other.

Broadly the invention includes a method for purifying aqueous solutions to remove ionic components, consisting of at least one cation and one anion, comprising:
  a. mixing the aqueous solution with an extractant phase for typically up to 30 min, preferably 10 min, more preferably 3 min, and most preferably 45-90 seconds to form an unstable emulsion wherein the extractant phase comprises;
  (i). A cationic extractant that contains a basic moiety that forms a neutral to anionic floc with at least one or more of the cationic components of the aqueous solution and with at least one anionic component of the aqueous solution, wherein the extractant comprises a positively charged moiety having at least 8 carbon atoms, preferably 18 carbon atoms, and most preferably 25 carbon atoms, up to about 34 carbon atoms, wherein the carbon atoms are present as hydrocarbons, and a moiety comprising an anionic base;
  (iii). an optional nonflammable hydrocarbon diluent;
  (iv). an optional nonflammable oxygenated hydrocarbon modifier for enhancing phase disengagement rate and/or minimizing water content of the cation and anion loaded extractant portion of the unstable emulsion;
  (v) wherein the equilibrium pH of the unstable emulsion is about 2 to about 12 and is controlled by the initial phase ratio of the extractant and aqueous phases;
  b. disengaging a first treated aqueous phase and a first loaded extractant phase from the unstable emulsion, wherein a colloid and/or floc and/or water immiscible precipitate forms in the first loaded extractant phase; and
  c. separating the first loaded extractant phase and floc from the first treated aqueous phase, wherein the first treated aqueous phase comprises first purified water.

Typically the positively charged extractant component comprises a quaternary ammonium and/or phosphonium compound selected from the group consisting of $R_4N^+$, $R_4P^+$, and/or an alkylated monoguanadinium compound; where the R groups may differ and are a hydrocarbon consisting of alkyl groups, aryl groups, alkylaryl groups, any combination of these, including atoms of other elements such as N, P, O and S so that the water solubility is not significantly increased or the monocationic charge for the whole molecule is not changed, and the charge does not change with pH up until a pH of about 10, and preferably a pH of about 12, and where the minimum carbon number (CN) is >8, preferably >17, and more preferably >24 up to a total of about 34, and most preferably where at least one alkyl group in the molecule is branched and/or the whole molecule has a tripodal structure.

Typically the anionic base is selected from the group consisting of $CO_3^{2-}$, $HCO_3^-$, or $OH^-$, but, depending on the desired products produced and water contaminants present, also could include $PO_4^{3-}$, $HPO_4^{2-}$, or $H_2PO_4^-$, $HS^-$, or $S^{2-}$ The invention provides the unique ability to reduce the total dissolved solid levels of waters by simultaneously co-extracting at least one each of the anionic and cationic components present in the water, and are captured from the aqueous solution in the first loaded extractant phase and floc and the anionic components are one or more of the group consisting of sulfate, selenate, nitrate, nitrite, phosphate, arsenate, arsenite, bromate, bromide, perchlorate, iodide, chloride, chromate(VI), permanganate, bisulfide, and sulfide ions, including the protonated versions of these ions, including those protonated species that would render the ion neutral, and any combination and concentrating level of these ions.

Typically the removed cationic component is a metal ion, most often selected from one or more of the group consisting of $Ni^{+2}$, $Fe^{III}$, $Al^{+3}$, $Cu^{2+}$, $Ag^+$, $Zn^{2+}$, $Co^{2+}$, $Co^{III}$, $Fe^{2+}$, $Ca^{2+}$, $Mg^{2+}$, $Cd^{2+}$, $Mn^{2+}$, $Pb^{2+}$, $Hg_2^{2+}$, $CH_3Hg^+$, and $Cr^{III}$, wherein Roman numerals represent variable speciation and the others represent normally aqueous ions.

A further embodiment includes neutralization of the acidic component of the water simultaneously with the co-extraction of metal ions and anions into the extractant phase (E-phase).

A further embodiment includes stripping metal ions and co-extracted anions from the separated first loaded extractant phase, preferably as it exits the extraction decanter, by the steps of:

a. mixing the separated first loaded extractant phase, colloids, and floc with an aqueous acid to form a second unstable emulsion; wherein metal ions in the separated first loaded extractant phase and floc are stripped from the emulsion colloids and/or floc of loaded extractant phase making up the first unstable emulsion and dissolved into the aqueous acid phase, and b. disengaging a first loaded aqueous acid phase and a metal ion stripped extractant phase from the second unstable emulsion and where the first stripped extractant phase contains at least a portion of the anions extracted into the first loaded extractant phase.

A yet further embodiment includes mixing a metal ion stripped extractant phase with an aqueous solution of anionic base selected from the group consisting of $CO_3^{2-}$, $HCO_3^-$, $OH^-$, $PO_4^{3-}$, $HPO_4^{2-}$ or $H_2PO_4^-$, $HS^-$, or $S^{2-}$, wherein $HCO_3^-$, $CO_3^{2-}$ and $OH^-$ are most preferred, and where the bicarbonate, carbonate, and/or hydroxide ion loaded extractant phase produces a third unstable emulsion, wherein anion, sulfate ion in the case of AMD feed water, is stripped from the metal ion stripped extractant phase into an aqueous phase and producing a bicarbonate, carbonate and/or hydroxide loaded extractant solution; disengaging the loaded bicarbonate, carbonate and/or hydroxide loaded extractant phase to yield a regenerated extractant phase stripped of at least a portion of the sulfate content, and normally stripped of more than 90% of its sulfate ion content and preferably stripped of more than 98% of its sulfate ion content, and a third aqueous phase of alkali metal ion, anion solution, alkali, sulfate in the case of AMD water, and/or a slurry of alkali metal ion sulfate and/or alkaline earth metal ion sulfate solution, for the case of alkaline earth Mg, and slurry in the case of alkaline earth Ca, or a combination of these; and separating the loaded carbonate, bicarbonate and/or hydroxide regenerated extractant phase from the aqueous phase containing the sulfate ion and any remaining carbonate or hydroxide ions, where preferably most of the loaded basic ion is carbonate where the extraction pH is less than 9 and at least a portion as hydroxide ion where the extraction pH is >9, and where the bicarbonate ion component is <10% of the basic anion component.

A yet further embodiment includes a method for treating an aqueous solution to remove one or more ionic components comprising:

a. mixing at least a portion of the first treated aqueous phase from the method above with an extractant phase to form a fourth unstable emulsion wherein the extractant phase comprises;

(i). an extractant that forms a floc with one or more of the ionic components of the aqueous solution, wherein the extractant comprises a positively charged moiety having at least 8 carbon atoms, and a component comprising an anionic base;

(iii). an optional medium to low viscosity, nonflammable diluent;

(iv). an optional modifier for increasing phase disengagement rate and completeness; wherein the equilibrium pH of the unstable emulsion is about 5 to about 9.

b. disengaging a fourth treated aqueous phase and a second loaded extractant phase from the fourth unstable emulsion, wherein a floc forms in the second loaded extractant phase; and c. separating the second loaded extractant phase and floc from the second extracted aqueous phase, wherein the second extracted aqueous phase comprises second purified water.

d. the above steps are repeated twice more to produce a purified water that has been extracted four times.

Typically this method provides for optional steps where the fourth purified water is further purified in one or more of an oil/water separator, a solid/liquid separator, and/or organic odor sorbent to obtain a further fourth purified water lower in at least one ion from the ions still remaining in the first purified water, a purified water that is more neutral to slightly alkaline pH, and preferably lower in more than one ion selected from the list $Ni^{+2}$, $Cu^{+2}$, $Fe^{III}$, $Al^{+3}$, $Zn^{2+}$, $Co^{2+}$, $Co^{III}$, $Fe^{2+}$, $Ca^{2+}$, $Mg^{2+}$, $Cd^{2+}$, $Mn^{2+}$, $Pb^{2+}$, $Hg^{2+}$, $Hg_2^{2+}$, $CH_3Hg^+$, $Cr^{III}$, and the like, wherein Roman numerals represent variable speciation and the others represent normally aqueous ions.

The method also provides for removing ionic species wherein the removed ionic component is a metal ion selected from one or more of the group consisting of cations $Ni^{+2}$, $Fe^{III}$, $Al^{+3}$, $Zn^{2+}$, $Co^{2+}$, $Co^{III}$, $Fe^{2+}$, $Ca^{2+}$, $Mg^{2+}$, $Cd^{2+}$, $Mn^{2+}$, $Pb^{2+}$, $Hg^{2+}$, $Hg_2^{2+}$, $CH_3Hg^+$, $Cu^{2+}$, $Cu^{2+}$, $Cr^{III}$, Au (I and III) and the like, wherein Roman numerals represent variable speciation and the others represent normally aqueous ions, and anions including one or more of sulfate, selenate, nitrate, nitrite, phosphate, arsenate, arsenite, bromate, bromide, perchlorate, iodide, chloride, chromate(VI), permanganate, molybdate, vanadate, and sulfide ions, including the protonated versions of these ions, including those protonated species that would render the ion neutral, and any combination of these ions.

Typically the method provides for capturing at least one ionic component is captured in the second loaded extractant phase and floc (consisting of colloids, floc, and/or oil dispersible precipitate) and one or more of the group consisting of cations $Ni^{+2}$, $Fe_{III}$, $Al^{+3}$, $Zn^{2+}$, $Co^{2+}$, $Co^{III}$, $Fe^{2+}$, $Ca^{2+}$, $Mg^{2+}$, $Cd^{2+}$, $Mn^{2+}$, $Pb^{2+}$, $Hg^{2+}$, $Hg_2^{2+}$, $CH_3Hg^+$, $Ag^+$, Au(I or III), $Cu^+$, $Cu^+$, and/or $Cr^{III}$, wherein Roman numerals represent variable speciation and the others represent normally aqueous ions, and anions including one or more of sulfate, selenate, nitrate, nitrite, phosphate, organophosphonate, arsenate, arsenite, bromate, bromide, perchlorate, iodide, chloride, chromate(VI), permanganate, molybdate, vanadate, and sulfide ions, including the protonated versions of these ions, for those ions not forming strong mineral acids, including those protonated species that would render the ion neutral, and any combination of these ions.

Other embodiments provide for a method wherein the first and/or second loaded extractant phase and floc are further treated to separate residual water from the loaded extractant phase and floc using a decanter fitted with internal weirs to guide the surface flow of extractant phase with floc in a narrowing channel such that the flow of the floc is maintained as it thickens, and where the flow is maintained until it reaches and flows over an overflow weir designed to promote such flow of thickened flocs, most preferably by a about a 15 to about a 45° angle, from the vertical, approach ramp, preferably smooth lip and about a 15 to about 45° exit ramp.

Another embodiment provides for stripping metal ions from at least a portion of the separated second loaded extractant phase by the steps of:

a. mixing the separated second loaded extractant phase and floc with an aqueous acid to form a fifth unstable emulsion; wherein metal ions in the separated second loaded extractant phase and floc are stripped into the aqueous acid phase, and b. disengaging a fifth unstable emulsion with a second aqueous acid phase to form a second metal ion stripped extractant phase separated from the fifth unstable emulsion.

c. optionally recycling the second loaded aqueous strip acid phase to contact additional volumes of the second loaded extractant phase.

Another embodiment provides for treating the second loaded aqueous acid phase by one or more of an oil/water separator, a solid/liquid separator, and/or an organic odor sorbent wherein a metal ion salt product is obtained.

Another typical method provides for purifying an aqueous solution to remove one or more ionic components, especially residual manganese ion as $MnCO_3$ particulate, comprising:

a. mixing at least a portion of the second treated aqueous phase from the method above with a basic extractant phase to form a sixth unstable emulsion wherein the extractant phase comprises;
 (i). an extractant that forms a floc with one or more of the ionic components of the aqueous solution, wherein the extractant comprises a positively charged moiety having at least 8 carbon atoms, and a moiety comprising an anionic base;
 (iii). an optional diluent;
 (iv). an optional modifier for modifying phase disengagement; wherein the equilibrium pH of the unstable emulsion is about 8.5 to about 10.5.

b. disengaging a third (or more) purified aqueous phase and a third loaded extractant phase from the seventh unstable emulsion, wherein a solid suspension and/or floc forms in the third loaded extractant phase; and c. separating the third loaded extractant phase and floc from the third purified aqueous phase, wherein the third treated aqueous phase comprises a third purified water.

A yet further method includes purifying an aqueous solution at higher pH to remove one or more ionic components, especially magnesium ion as $Mg(OH)_2$ particulate, and any residual amount of sulfate ion, comprising:

a. mixing at least a portion of the third treated aqueous phase from the above with a base-loaded extractant phase to form an eighth unstable emulsion wherein the extractant phase comprises;
 (i). an extractant that forms a floc or particulate with one or more of the ionic components of the aqueous solution, wherein the extractant comprises a positively charged moiety having at least 8 carbon atoms, and a moiety comprising an anionic base, most preferably hydroxide ion;
 (iii). an optional diluent;
 (iv). an optional modifier for modifying phase disengagement;
 wherein the equilibrium pH of the unstable emulsion is about 10.5 to about 12.

b. disengaging an fourth treated aqueous phase and a fourth loaded extractant phase from the eighth unstable emulsion, wherein a floc and/or particulate slurry forms in the fourth loaded extractant phase; and c. separating the fourth loaded extractant phase and floc and/or particulate from the fourth purified aqueous phase, wherein the fourth purified aqueous phase comprises the eighth purified water.

Typically the method provides for treatment wherein the fourth purified water is further treated in one or more of an oil/water separator, a solid/liquid separator, to separate out the $Mg(OH)_3$ particulate product, to obtain a further fourth purified water low in most ions, including cations $Ni^{+2}$, $Fe^{III}$, $Al^{+3}$, $Zn^{2+}$, $Co^{2+}$, $Co^{III}$, $Fe^{2+}$, $Ca^{2+}$, $Mg^{2+}$, $Cd^{2+}$, $Mn^{2+}$, $Pb^{2+}$, $Hg^{2+}$, $CH_3Hg^+$, and/or $Cr^{III}$, wherein Roman numerals represent variable speciation and the others represent normally aqueous ions; and anions including one or more of sulfate, selenate, nitrate, nitrite, phosphate, arsenate, arsenite, bromate, bromide, perchlorate, iodide, chloride, chromate(VI), permanganate, and sulfide ions, including the protonated versions of these ions, including those protonated species that would render the ion neutral, and any combination of these ions, and a ninth separated extractant phase that is optionally sent to the mixing step of a previous step to load even higher concentrations of cation and anion values.

Another embodiment of the invention provides a method for treating an aqueous solution containing ionic components comprising:

a. mixing the aqueous solution with a first extractant phase to form a first unstable emulsion wherein the first extractant phase comprises;
 (i). one or more of a quaternary ammonium compound comprising $R_4N^+$, an alkylated guanidinium compound, or a quaternary phosphonium compound;
 (ii) a carbonate and/or hydroxide component;
 (iii). an optional diluent; and
 (iv). an optional modifier for helping the phases disengage;
 wherein the equilibrium pH of the unstable emulsion is about 2 to about 12.

b. disengaging a first treated aqueous phase and a first loaded extractant phase from the unstable emulsion, wherein a floc forms in the first loaded extractant phase; and c. separating the first loaded extractant phase and floc from the first treated aqueous phase, wherein the first treated aqueous phase is purified water.

A further embodiment provides for a floc composition comprising: an oil soluble cation, a metal ion, a hydroxide and or oxide, and an anion according to the formula,

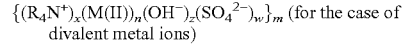
{$(R_4N^+)_x(M(II))_n(OH^-)_z(SO_4^{2-})_w$}$_m$ (for the case of divalent metal ions)

or

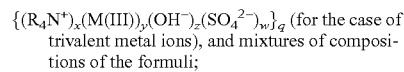
{$(R_4N^+)_x(M(III))_y(OH^-)_z(SO_4^{2-})_w$}$_q$ (for the case of trivalent metal ions), and mixtures of compositions of the formuli;

wherein x=2-4, n=0-1, Y=1-2, Z=2, and w=1-3, and wherein M(III) can be Fe(III) or Al, and M(II) can be Fe(II), Ni, Co(II), Cu, Zn, Pb, Cd, or Mn; and wherein m and q can be 1 to about 100,000.

An additional floc composition includes a floc composition comprising: an oil soluble cation, a metal ion, a hydroxide and or oxide, and an anion of the formula,

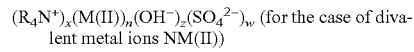
$(R_4N^+)_x(M(II))_n(OH^-)_z(SO_4^{2-})_w$ (for the case of divalent metal ions NM(II))

or

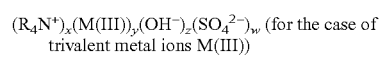
$(R_4N^+)_x(M(III))_y(OH^-)_z(SO_4^{2-})_w$ (for the case of trivalent metal ions M(III))

and mixtures of materials according to the two formuli; wherein x=2-4, n=0-1, Y=1-2, Z=2, and w=1-3, and wherein M(III) can be Fe(III) or Al, and M(II) can be Fe(II), Ni, Co(II), Cu, Zn, Pb, Cd, or Mn, and where the material is dispersed in a non water soluble liquid such that the floc represents 1 to 100% by weight of the slurry.

A yet further embodiment includes a mixture of metal sulfates of the composition $Fe^{III}_x Fe^{II}_y Al_z(SO_4)_w$ where x=0.1, y=0.8 and z=0.1, giving a value for w=(0.3+1.6+0.3)/2=1.1, or $Fe^{III}_{0.3} Fe^{II}_{1.6} Al_{0.3}(SO_4)_{1.1}$ for a formula weight of 159 g/mole; and having the range of ratios: $Fe^{III}_{0.03} Fe^{II}_{0.95} Al_{0.03}(SO_4)_{1.04}$ (FW of 155 g/mole), to $Fe^{III}_{0.95} Fe^{II}_{0.03} Al_{0.5}(SO_4)_{2.2}$ (FW of 280 g/mole). Typically the material, $Fe^{III}_x Fe^{II}_y Al_z(SO_4)_w$, produced by the process of the invention from acid mine drainage feed water is in an aqueous solution and has a dry weight of at least 0.1%, and preferably 1 to 5%, and most preferably 5 to 20%.

An additional embodiment of the invention includes an apparatus for separating floc consisting of a. a decanter or extractor compartment having an inlet for a mixture at one end of the compartment and an outlet for aqueous spaced apart from the inlet; and b. a floc weir spaced apart from the inlet, the floc weir comprising a tapered entrance ramp, a rounded lip adjacent to the tapered entrance ramp and a floc weir exit slide adjacent to and spaced beyond the rounded lip, wherein floc flows out of the compartment over the entrance ramp, rounded lip and floc weir exit slide. Typically the entrance ramp is tapered at 15 to 45 degrees from the vertical, and the exit slide is tapered at 15 to 45 degrees from the vertical. A curved drip point at the lowest point of the exit slide is typically used to provide for smooth separation of the floc from the slide. A rounded lip located between the entrance ramp and exit slide of the floc weir provides a smooth transition for floc flow over this portion of the floc weir, and is typically the highest point on the floc weir.

BRIEF DESCRIPTION OF THE DRAWINGS

FIG. 1A and FIG. 1B taken together are intended to form one large figure.

FIG. 3 also illustrates the configuration used in Example 5 (Run #7).

FIG. 5A is a schematic drawing showing a side cutaway view of Settler 526 with a plate for a flow guide.

FIG. 5C is a schematic drawing of a mixer according to the embodiment of FIG. 18.

Figure 1A:
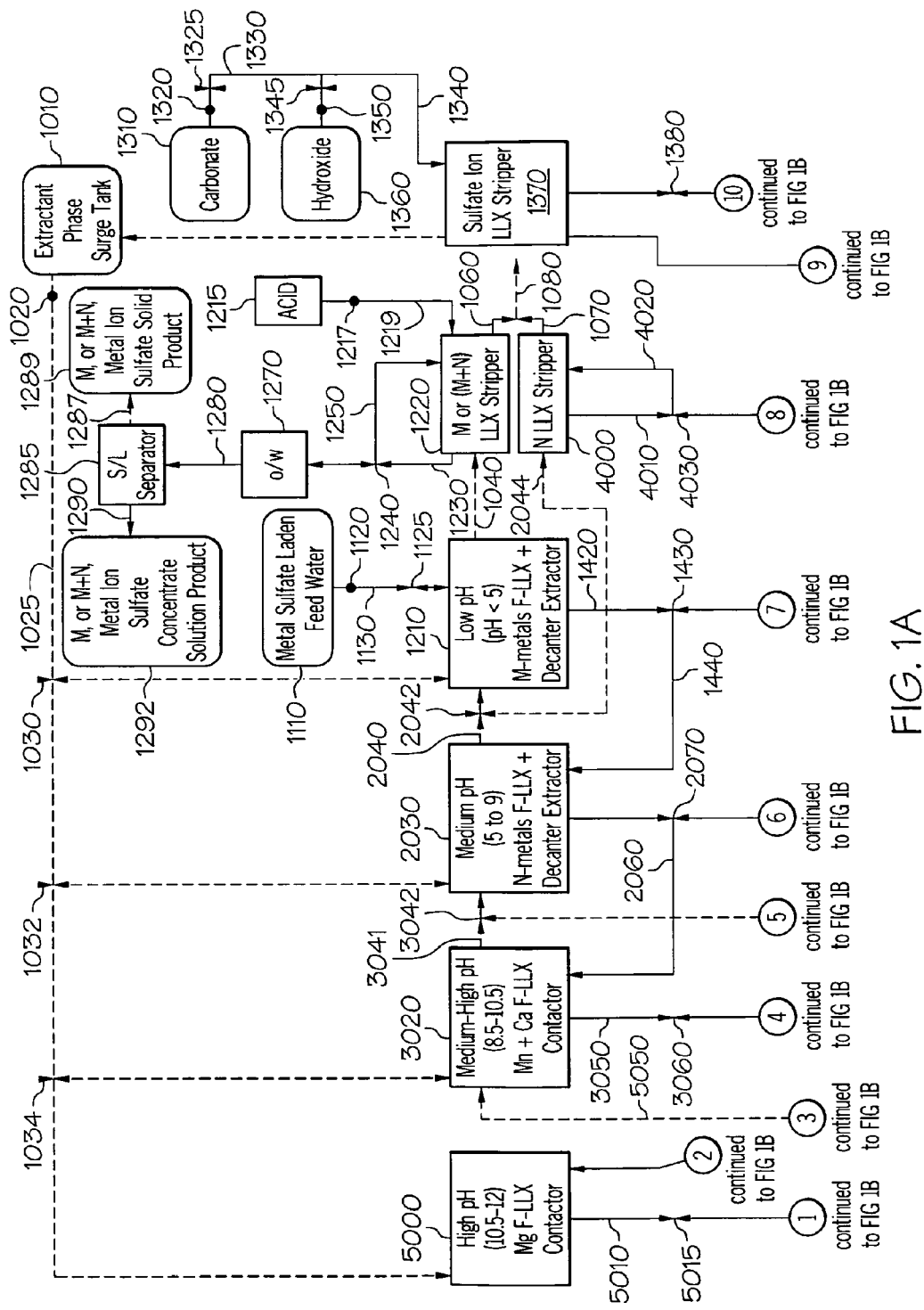
FIG. 1A is a schematic drawing illustrating one part of the overall flow of materials of one aspect of the invention.

DETAILED DESCRIPTION OF THE INVENTION
BEST MODE

Broadly, the invention provides for a method for purifying an aqueous solution by simultaneously removing both cationic and anionic components while neutralizing acidity and lowering total dissolved solids by the steps of mixing the aqueous solution with a water immiscible liquid extractant phase (E-phase) containing a basic moiety to form an unstable, high surface area emulsion during which time these components transfer from the aqueous phase to the E-phase, and acidity in the aqueous phase in neutralized by transfer of at least a portion of the basic moiety to the aqueous phase. The extractant phase is made up of one or more of an cationic extractant compound, most preferably one or more of a oil soluble quaternary ammonium compound, comprising $R_4N^+$, but also could be an alkylated guanidinium compound, $R_5CN_3H^+$, or an alkylated quaternary phosphonium compound, $R_4P^+$, or a blend of these cationic compounds; wherein the associated anion is a pH basic component. Typically the equilibrium pH of the unstable emulsion is controllable from about 2 to about 13; the equilibrium pH of the unstable emulsion is typically about 3 to about 9, or from 4 to about 11 depending on desired ionic components for removal. This pH control is achieved by varying the E/A ratio, with pH increasing with this ratio. Also, the extractant alkyl groups can also be aryl, and/or alkylaryl.

If desired, more preferably, one or more of an optional hydrocarbon diluent and/or a modifier, most preferably non-flammable, for promoting the aqueous and extractant phases to remain fluid, disengage and dewater in a following settling step, and the extractant phase homogenate, may be added as part of the extractant phase; disengaging mixture of a treated aqueous phase and a component-loaded extractant phase from the unstable emulsion, wherein a new stable emulsion of floc phase forms in the loaded extractant of a new composition of matter phase, and wherein the extractant phase and aqueous phase are at least partially separated by allowing gravity separation, optionally sped up by centrifugation and/or use with a hydrocyclone; and where the floc remains in the E-phase but may tend to settle to the interface with the aqueous phase, and separating the loaded extractant phase and floc from the aqueous phase by using a skimming weir design to ensure that the floc is removed from the aqueous phase along with the E-phase and before it thickens into a slow to non-flowing solid precipitate.

The R groups in the quaternary ammonium compound, the guanadinium compound, or the quaternary phosphonium compound can be different hydrocarbons that have a carbon atom content of at least one each and with a total carbon number for the $R_4N^+$ compound of and/or $R_4P^+$ compound 37 carbon atoms with a minimum total carbon number of nine, but preferably 25. The basic requirement is that the "R" alkyl, alkylaryl and/or aryl groups provide sufficient hydrophobic character to the extractant phase so that it remains a separate phase from the aqueous phase whether loaded with floc or basic moiety. One particularly useful quaternary ammonium compound, N-methyl N,N,N-tri(n-octyl)ammonium ion, used in the examples herein, has alkyl groups with a straight chain length of one carbon for one R group and a chain length of eight for the other three R groups. The R groups may be the same or different and be aromatic, aliphatic, or mixed aromatic/aliphatic. The R groups can contain other groups or other atoms of Si, F, Cl, Br, O, N, S, or P so long as they do not make the ionic compound too oil insoluble, too water soluble, or neutralize or change its electronic charge. Therefore, halogens such as chlorine and the like, halogenoids, ethers, esters, imines, ketones, phosphate esters, nitriles, and the like are permissible.

The extraction phase to aqueous phase ratio (E/A) is typically of about 1:20 to about 20:1 in the extraction circuit, preferably 2:1 to 1:10 and more preferably 1:3 to 1:7, and most preferably 1:4 to 1:6. The extractant concentration in the E-phase needs to be at least 0.1% and can be neat (100%), more preferably 2-30% and most preferably 3-15%.

The pH of acid mine water is typically about 4-7 while in the mine and not exposed to air. On seeping or flowing from the mine, or otherwise exposed to air, the pH typically drops to about 2 to 4 depending on the dissolved metals in the water, especially when ferrous ion, ferric ion, and aluminum ion are present in the AMD water, normally the case.

The invention provides efficient means to purify water, especially the removal of anions and cations present in the feed water contributing to the waters' total dissolved solids level, collectively referred to as total dissolved solids solutes, values and/or contaminants. Though applicable for purifying water at all scales, most preferably the invention is useful in purifying very large volumes of water of tens to ten thousand gallons per minute flow rate in a continuous-flow fashion using a unique combination of fast kinetics process chemistry that makes use of interacting thermodynamic driving forces of ion pairing, acid-base chemistry, gas evolution, and physical separation technologies based on flotation (F) and liquid-liquid extraction (LLX) technologies applied in liquid-liquid skimming configuration, and therefore, is referred to as flotation liquid-liquid extraction process technology. Flotation liquid-liquid extraction technology of the invention provides a major array of benefits including:

Fast removal of water contaminants in seconds to minutes in total or per treatment stage, rather than hours or days and weeks required by conventional approaches.

Fewer water contacting stages (where it is noted that, especially for high flow rate feed waters, the larger the number of stages required to purify the water, the more costly such treatment becomes since the same large volume of water needs to be retreated at each stage), Removal of metal ions normally not extractable or not well extracted by conventional liquid-liquid extraction (LLX) methods, and/or which foul conventional LLX processes due to in-process solids precipitation, especially Fe, Al, and Ni.

Extraction of a broader spectrum of ions, anionic and cationic, than conventional methods.

Extraction of anions including sulfate, selenate, arsenate, molybdate, vanadate, gold halo/pseudohalo complexes, chromate(VI), permanganate, and the like, and cations including Fe(III), Fe(II), Cr(III), Cu(II/I), Ni, Co(II), Co(III), Zn, Al, Mn, Mg, Ca, La, Ga, Cd, Hg, $CH_3Hg^+$, Ag(I), Au(I&III) and the like, to low residual concentrations rendering the water suitable for potable water production, agricultural use, industrial process water, and the like.

Concentration rather than dilution of contaminants with preferred separation of the extracted ions into product concentrates, without being bound by low value waste minerals, normally forming concentrates such as metal ion sulfate solutions, solid salts, and/or solids of oxides, hydroxides, bicarbonates, and/or carbonates, allowing them to be used to make useful and saleable conventional products such as metal production (iron, zinc, cobalt, nickel, copper, aluminum, and the like), sulfate-based fertilizers, especially potassium sulfate, ammonium sulfate, soil acidulants, and/or sodium sulfate, a unique composition of matter consisting of a combination of ferric, ferrous, or aluminum sulfates, and the like, with many applications.

Low-cost means to purify large volumes of water continuously, in a simple manner, with a high yield of purified water, and with a relatively small equipment size when compared to conventional technologies.

Concentration of cations and anions in one or more liquid-liquid extraction stages without formation of solid product waste sludges such as precipitants, gypsum, lime sludges, or the like.

Description of Acid Mine Waste Drainage Water Purification Process without Waste Generation and with Metals and Sulfate Product (Values) Recovery.

The invention includes a second new composition of matter material consisting of a unique formulation containing at least one liquid extractant component combined with a metal ion colloid consisting of one metal ion in neutral combination with anions of oxide, hydroxide, carbonate, sulfate and/or bicarbonate ions that, when combined, form a colloid, floc, or suspended particulate, that is useful in the simultaneous and rapid separation of metal ions and anions from very large volumes of water at low cost and without waste generation.

The water insoluble floc produced in the extractors of the F-LLX process of the invention in the pH range of 5 to 8 is known to consist of the following:

metal ions derived from the AMD water contaminants, especially Fe and Al, cationic extractant derived from the extractant phase, hydroxide ion derived from the reaction of carbonate ion with water during the extraction operation, and sulfate ion removed from the AMD water by the extractant phase.

This brown floc is less dense than water despite it containing inorganic components. It can be isolated by filtering or preferably by centrifugation after separating it from the two phase contents of the settlers and decanters. The E1D decanter is the primary apparatus and operation to prepare this new floc material since the floc generated there is in largest quantity and contains the least water and diluent. The floc solid is useful in purifying water by enabling removal of TDS from contaminated waters and as a flexible means for preparing metal ion salts and alkali salts of sulfate ion but without the introduction of other salts that is common to these synthesis methods since, with the floc, the counter ion is the extractant. Although carbonate ion loaded extractant phase is used to raise the pH of the AMD water, as an example, carbonate ion itself is not a component of the oil soluble floc previously described, rather it reacts with water by hydrolysis to generate hydroxide ions, that forms metal hydroxide colloids (see below), and it forms certain insoluble metal ion carbonate particulates that are not part of the floc (see below). Hence, since the metal ions and sulfate ions are removed from the water phase when the floc is formed at pH 5 to 9, the floc empirical formula is estimated to be, $$(R_4N^+)_x(M(II))_n(OH^-)_z(SO_4^{2-})_w \text{ (for the case of divalent metal ions, M(II))} \quad \text{(Eq. A)}$$

or $$(R_4N^+)_x(M(III))_y(OH^-)_z(SO_4^{2-})_w \text{ (for the case of trivalent metal ions, M(III))} \quad \text{(Eq. B)}$$

(Where M(III) can be Fe(III) or Al, and M(II) can be Fe(II), Ni, Co(II), Cu, Zn, Pb, Cd, or Mn)
Now, using charge balance, the following relationships hold, $$x+n=z+w, \text{ for the M case} \quad \text{(c)}$$

$$x+y=z+w, \text{ for the N case} \quad \text{(d)}$$

AMD water analytical results provided in Table 2A were used with the above observed descriptive and chemical analyses to determine the values of x, n, y, z and w. These results are given, using the Fe(II) and Fe(III) cases, as follows:

Floc Chemical Composition: $(R_4N^+)_x(Fe^{2+})_y(OH^-)_z(SO_4^{2-})_w$

For which, x=2-3, y=1-0, z=2 and w=1-2
And

Floc Chemical Composition: $(R_4N^+)_x(Fe^{3+})_y(OH^-)_z(SO_4^{2-})_w$ x=2-3, y=1-2, z=2 and w=1-2
Results in Table 2B generated the values of x, y, z, and w for the following extraction phase as follow:

$(R_4N^+)_x(Fe^{2+})_n(OH^-)_z(SO_4^{2-})_w$ x=2-4, n=1-0, z=2 and w=1-3

$(R_4N^+)_x(Fe^{3+})_y(OH^-)_z(SO_4^{2-})_w$ x=2-4, y=1-2, z=2 and w=1-3
For highest yields of these materials, it is important that the quaternary ammonium ion is used in excess or at least in charge balance as calculated using the above equations and for the AMD water composition of cations.

This material is insoluble in water and is oil phase dispersable, it can contain solvent molecules of water and/or alcohols and/or esters of carbon number of at least eight, preferably 8 to 24, and most preferably 10 to 16, so long as the quantities of solvent do not collapse the colloidal material or render in water soluble. The invention is a new composition of matter useful for the low-cost purification of acid mine or acid rock drainage or ground waters, natural gas well brines, extractive metallurgical aqueous processing waters, surface finishing process waters, agricultrual processing and waste waters, and the like. It is especially useful to reduce high metal ion and sulfate ion concentrations in water, for example as is found in mining and mineral processing effluent waters, in brackish and brine waters, in industrial process effluent waters, livestock farm waters, and the like, down from very high levels, for example total dissolved solids values of 300-5000 mg/L, down to levels that allow water re-use, for example to <500 mg/L total dissolved solids for surface water discharge, or <250 ppm to enable re-use as drinking/potable water, and/or to deionized water with total dissolved solids of <125 ppm in which most or all of the contained toxic metal ions are removed to <1 or normally <0.3 ppm, and sulfate ion to <30 ppm, phosphate ion to <10 pppm, and nitrate ion to <10 ppm. It is believed that this efficient deionization is accomplished by a unique physio-chemical process based formation of a new hydrophobic colloidal material consisting of a oil soluble quarternary ammonium compound or blend of such compounds (and/or a oil soluble phosphonium compound or blend of such compounds) combined with a blend with of at least one, and preferably more than one type of metal ions with anions selected from the list of oxide, carbonate bicarbonate, hydroxide ions, sulfate ion, phosphate ion, and/or nitrate ions, and where the colloidal material can be in suspended precipitate form, but most preferably it is in floc form, and most preferably in colloidal form. The colloid, floc, or suspended precipitate can optionally also contain up to 70% entrained water, preferably less than 25% water, and more preferrably <10% water, and most preferable <7% water. In addition, the colloid, floc, or suspended particle and/or precipitate can also contain up to 80% oil soluble alcohol, ester, alkyl phenol, and/or other modifier, and most preferably also contains a diluent. All of the organic extractant phase materials are preferred to be nonflammable compounds.

As is known in the art, sulfate ion is very difficult to remove from water regardless of purification technology selected for the important niche of medium to high flow rates when present at medium to high levels of $SO_4^=$ in the range of about 500 to 10,000 mg/L. The need is to reduce the sulfate ion concentration far enough to enable surface discharge release of the water, into the range of 0 to <600 ppm needed for surface discharge release, and preferably to enable its use for potable water (<250 ppm), and most desirable to <100 ppm needed to prevent drinking water "sulfur" odors. This difficulty in removing sulfate ion is well known in the art of water purification and is due to sulfate ion's high charge density and high water solubility of all its salts except barium ion, and barium ion is very toxic, very expensive, very difficult to recycle, and is in severely limited supply relative to the amount of water needed to be purified with respect to sulfate ion. The commercially available technologies all have the a major problem in that a substantial amount, normally 25 to 50%, of the water to be processed ends up as a waste stream carrying the contaminants from the process to regenerate the sorbent or avoiding scaling of the process hardware. Hence the technologies of the known art produce a large waste stream that is still of a very large volume, still dilute, still toxic, and still represents a severe and large disposal problem.

In the present invention, a unique "forced" ion pairing process chemistry is used to quickly remove highly soluble and/or highly charged anions, especially $SO_4^=$ to <100 mg/L residuals, and in high yield from these intermediately concentrated (about 600 to 10,000 mg/L total dissolved solids feedwaters. The invention maximizes the use of off-the-shelf hardware to help speed up the availability and widespread use of this much needed technology.

The process chemistry of the invention involves contacting (mixing) contaminated aqueous solutions with a specially formulated, nonflammable, water immiscible, oil soluble, extractant phase. The sulfate is extracted into this second liquid phase, that is also used at a volume (or flow rate) that is substantially less than that of the contaminated feedwater so that the sulfate and other ions co-extracted are pre-concentrated by the factor of the volume (flow rate) ratio. In this manner the water impurities are not only removed from the water but are simultaneously concentrated multiple times so that a concentrated metal sulfate product of saleable value is produced rather than production of wastes. To boost process efficiency and to lower process costs, an aspect of the invention is that, at the same time the sulfate ion is extracted, the toxic metal ions contained in the feed water are also removed and concentrated using the same operation. The capability of the extractant phase to extract both sulfate ions and metal ions simultaneously into a water immiscible phase is key to the invention and occurs due to the process chemistry and process operating conditions selected for the invention.

This colloid/floc process chemistry mentioned above is described further below.

The extractant chemistry discovered for the role of $SO_4^=$ removal is a formulation containing an oil soluble quaternary amine $\{R_4N^+\}$. The use of quaternary ammonium LLX extractants for anion extraction is known in the prior art. However, this art has consistently indicated that sulfate ion is only poorly extracted by these reagents and far prefers extracting mono-anions and anionic metal ion complexes instead. Therefore it was necessary to modify the process chemistry such to promote sulfate ion partitioning into the water immiscible extractant phase. This "forced" approach to the process chemistry will now be described.

Choice of Anion and Base for pH Control

Since acid mine drainage waters and the like are already very highly excessive in total dissolved solids level, simple ion exchange removal of sulfate ion, for example by using the chloride ion form of the quaternary ammonium extractant, was out of the question since any anion exchanged for the sulfate ion would then render the water still a waste too toxic for discharge to surface waters, much less be of any value for use by industry or residential. Therefore anions that can be eliminated by forming $H_2O$ and/or a gas, specifically $CO_2$ gas, were used to develop the process chemistry, that is the hydroxide ion ($OH^-$), carbonate ion ($CO_3^=$), carbonic acid ($H_2CO_3$), and/or bicarbonate ion ($HCO_3^-$) form of the quaternary ammonium extractant}. It is also important that the quaternary amine does not require protonation to possess a positive charge and is positively charged over the entire pH range. In this manner the strong base options of carbonate ion and/or hydroxide ion can be used. The process chemistry identification and selection is further developed below to explain the fundamental separation process chemistry the proposed mechanism of action.

Preferred Extractant Structure and Means of Process pH Control

A quaternary amine liquid-liquid extractant particularly suitable to practice this invention is N-methyl tri(octanyl) ammonium ion available as Aliquat®134 or Aliquat® 336 (Cognis, Inc.), or oil soluble, low water soluble quaternary ammonium compound, preferably a liquid compound, and most preferably a branched or extensive tripodal structure to discourage gelation and solidification throughout the process load, strip and storage cycle.

Description of Colloid Formation and its Impact on Separation Process Chemistry Basis One embodiment describing the invention is the general process flow diagram FIG. 1A using acid mine drainage water as the "Metal Sulfate Laden Feed Water" 1110 example for the description. The first step involves treatment of the acid mine drainage water stream with a particular Aliquat 134—based extractant phase formulation 1010 in a self-controlled pH buffer system of carbonate/bicarbonate buffer, included in the extractant phase formulation with the Aliquat 134, and controlled in the preferred range of pH 5.5 and 9.7 for at least one stage, preferably two stages, and where up to five stages is effective and 4 stages with the preferred pH range for extraction stage 2030 ranges from 7.4 to 8.2 and is preferably 7.6 to 8.0 and is most preferably about 7.8. The stages can be configured entirely counter-current, or cross-current where one or more sulfate-stripped extractant phases (see below) are blended with the acid mine drainage water as it flows serially through two or more stages, or co-current flow, cross-flow, or a combination of these flow configurations. Most preferred is to operate the extractors with the four stages separated into two sets of at least two mixer settlers each, where each set is arranged counter-current with its partner, and each set internally is piped up to be counter-current, but the two sets are configured cross-current flow with respect to each other where the extractant phase is the crossing phase and the aqueous phase is piped to flow serially from stage to stage across the first set and then across the second set, and then, if present, across the third set, and so on. However, other combinations are easily arranged and tested since piping changes are readily made as is already well appreciated in the current art of liquid-liquid extraction technology using staged devices such as mixer-settlers, centrifuges, columns, in-line static mixers, and the like and any combination of these. Most preferred is the, in this case is a combination of counter-current and cross-flow configurations, described above, while operating the strippers always with counter-current flow and internally aqueous recycled. Also, most preferred to the invention, is that the extractant phase approaches in the settlers are specially designed for floc handling by promoting simultaneous floc, mass densification, while still maintaining its continuous, or at least intermittent, flow and by promoting the flow, at least intermittent and preferably continuous, of this floc over the extractant phase exit weir, by any combination of mechanical movement and/or smooth, curved surface as, for example, is found in ore flotation cell designs, and lastly by accommodating the flow requirements of this extractant phase "floc", preferably thickened, to the next stage, where the flow can be intermittent or continuous, whether it be another extractor stage, a decanter for further dewatering, or a stripper. The receiving hardware for the floc from the flotation overflow weir can be of hopper design to send the floc to the next stage, a pipe of preferably relatively large ID, or a trough, a hydrocyclone, or any combination of these.

The most preferred case is that the following stripper uses an aqueous acid to dissolve the components of the extractant-based floc, whether it be a colloid, precipitate, slurry, liquid, emulsion, gelling mass, or any combination of these, thereby returning the system back into a liquid-only condition. Liquid-only systems are easiest to handle and process under continuous flow.

Suggested Mechanism of Action

While not wishing to be bound by theory, but acknowledging that theories are useful in understanding physical/chemical processes, the interrelationships of control parameters with process outputs, capabilities of the process, and the like, it is presently believed that contacting contaminated water, preferably containing dissolved minerals of cations and anions, with the invention extractant phase method of operation, and hardware generates a hydrophobic and variable combination of oxo and hydroxo, optionally in combination with carbonato, bicarbonato, sulfato and/or other metal on ligand components and anions present, with metal ions containing homogenous, but usually heterogenous, material with the physical consistency, depending on age, temperature and concentration, with the properties of one or more of the following: metal ion complexes, clusters, colloids, flocculated particulates, floating precipitates, liquids and/or gels, and that can have various degrees of hydration from low to high, and will be collectively referred to as a "floc" in this description. Microscopically, it is believed that this floc is essentially neutral but preferably slightly anionic so that it interacts with a positively charged hydrophobic "extractant" dissolved in a water immiscible liquid. At the molecular level, it is believed that this floc forms quickly, within a few seconds since metal ion to ligand bonds need not be broken or formed. It is believed that this capability is an important feature that makes the invention immensely useful for cheaply purifying large water flows of a broad spectrum of contaminants. The floc consists of oxo, hydroxo, with or without other anions, providing colloid forming complexes of the metal ions present, for acid mine drainage waters normally one or more of Fe(II), Fe(III), Al, Mn(II), Mn(IV), Ni, Co(II), Co(III), Zn, Mg, Cu, and Ca. As provided by the inventive formulation, simultaneously sulfated quaternary amine, $(R_4N)_2SO_4$, also forms and removes sulfate ion from the water in high yield, and, in another aspect of the inventive formulation, simultaneously neutralizing the acid present in the acid mine drainage water by the conversion of $H^+$ ions present and provided by acidic metal ions into $H_2O$ and $H_2CO_3$ molecules by neutralization with $CO_3^=$ and/or $HCO_3^-$ ions to make $H_2CO_3$, and, in another aspect of the inventive formulation, simultaneously reducing the total dissolved solids level of the water through the dissociation of $H_2CO_3$ into $CO_2$ gas and $H_2O$, thereby producing a purified aqueous phase (water). Selenate and silica/silicate are also recovered. The metals recoverable include those capable of metal hydroxide precipitations, metal carbonate solid formation, metal sulfate solid formation, or those metals that co-precipitate by inclusion in to ferric hydroxide and/or aluminum hydroxide amorphous precipitates, and/or those anions that form highly insoluble precipitates with ferric ion or aluminum ion, such as arsenate, phosphates, humic acids, other natural organic matter, and the like. This includes all the metal ions on the Periodic Table except alkali metal ions, which are reduced only a low to small amount. Alkali metal ions are typically a minor component of ground waters, surface waters, farm waters, and most industrial process waters. The low removal of alkali metal ions is not a detriment since in fact there is much allowance by water users that these ions can remain in the product purified water, especially the nutrient $K^+$ and where softened water is used (where $Na^+$ residuals exist in the treated water). For this reason also, the technology of the invention is not useful for the desalination of sea water where the main objective is the removal of high concentrations of the alkali salt NaCl is required.

Figure 2:
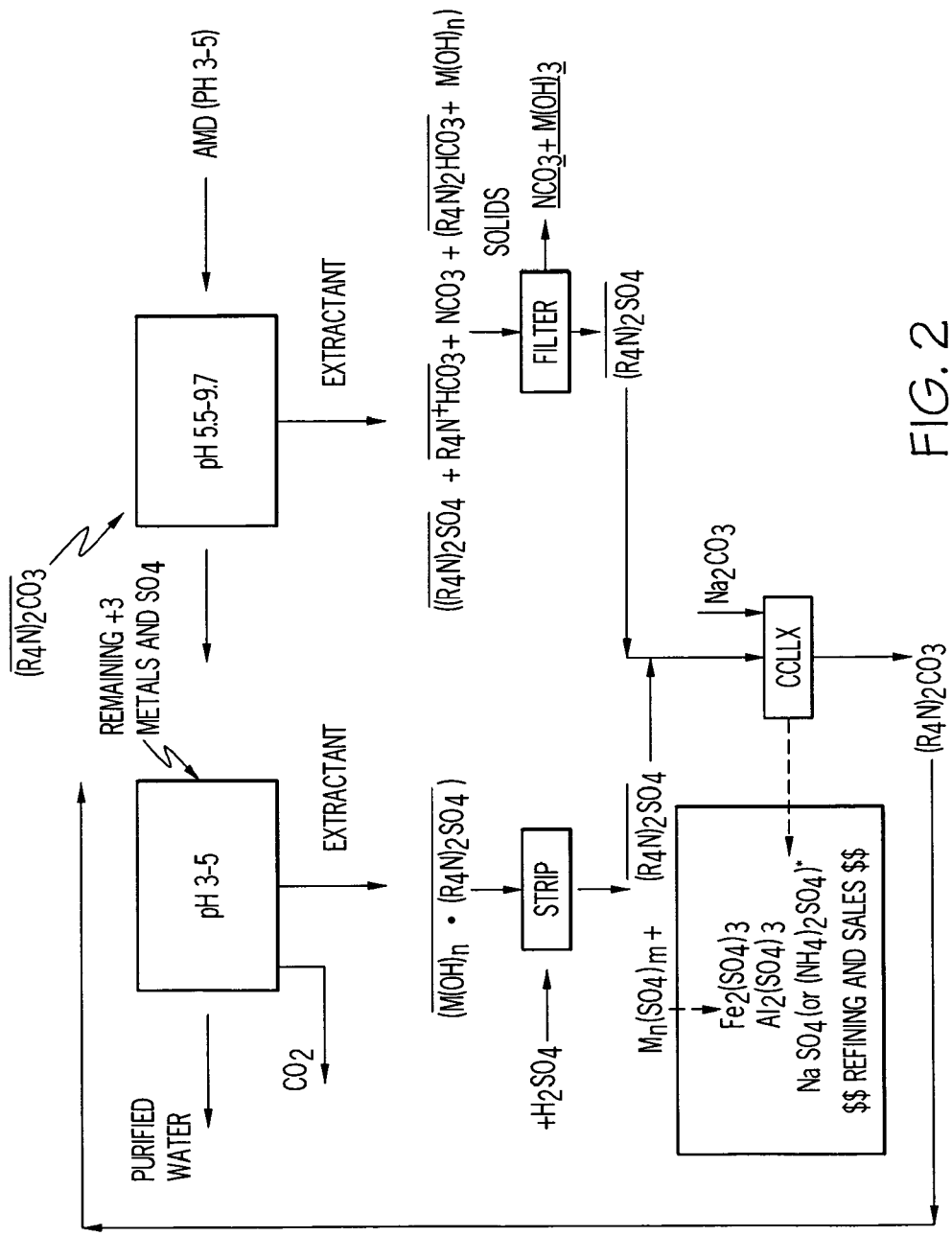
FIG. 2 is a schematic illustrating the process for one embodiment of the invention for the separation of trivalent and divalent metal ions and sulfate ions, simultaneously from contaminated water. Also see the other figures and examples illustrating more detailed aspects of the process.

Metal ions removed by the process typically constitute those metals that form oxide, hydroxide, or carbonate colloids, and those that co-precipitate with such materials (FIG. 2). Also attached is Table 3 summarizing the list of effective extractant structures. These can be used in water immiscible solution form. They can be used neat if their corresponding bicarbonate/carbonate/bisulfate or sulfate ion forms are sufficiently fluid at short mixing and settling times (see below) so to enable flow in batch or continuous liquid-liquid separation process or flotation process or oil skimming circuits. Note that the prior art teaches that all such metal hydroxide and insoluble salt composition systems will form solids which precipitate within conventional LLX hardware requiring process hardware shutdown, solids removal, repair of damaged equipment and other maintenance. The current invention avoids this serious problem. If enhanced fluidity is needed as is normally the case, then one or more of the quaternary extraction compounds are blended with a predominantly hydrocarbon diluent of eight or more carbon atoms. Suitable diluents are included in Table 3. Also included in Table 3 are candidate "modifiers" that can be added to the extraction formulation that can aid in displacing entrained water in the extractant phase carrying the sulfate ion and dispersible metal ion complexes and/or colloids of oxo, hydroxo, carbonato, and/or sulfato extractant phase flocs. Modifiers can also help the floc to solubilize in the hydrocarbon diluent.

Incorporation of Floc Filtration Option

In another embodiment of the invention, the metal ion/sulfate ion floc material, loaded onto the extractant phase during the mixing step (FIG. 1C) is filtered after the extraction operation and/or in between extraction stages, to remove the novel composition (described above) consisting of the formulas:

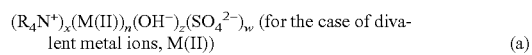
(a)

and

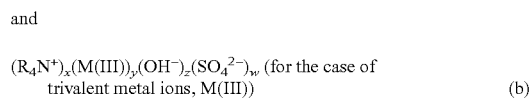
(b)

This filtration illustrates that the new material described can be produced as an isolated product. This filter step is optional and would be performed before the metal ion and sulfate ion stripping steps (see below). The filtrate, now essentially 100% liquid colloidal floc and liquid, is then processed using liquid-liquid contractors in the stripping of soluble metal ions and of sulfate as described below.

Sulfate Ion Product Production with Concomitant Regeneration of Carbonate Form of the Extractant Phase After liquid-liquid stripping and/or filtering the metal ion products from the extractant phase, as described above and in the attachments and examples below, the essentially metal ion-free extractant phase still contains the sulfate ion (and any selenate ion) recovered from the acid mine drainage feed water during the extraction operation. The chemical form of the sulfate ion on the extractant phase is believed to be as ionic compounds $(R_4N^+)_2SO_4^=$ and/or $R_4N^+ HSO_4^-$ depending on the pH of the extraction or metal ion stripping stage operation stage from whence it came, normally the former from the extraction circuit and the latter from the acidic metal ion strip circuit, is contacted in counter-current LLX configuration with 0.1-55. % $Na_2CO_3$ or 0.1-55% $K_2CO_3$ solution, or solutions of bicarbonate ion, or blends of these, with or without added NaOH or KOH up to saturated conditions and could be optionally warmed to achieve even higher extractant phase loadings of these anions. Total concentrations of carbonates than solubility limits can be used provided the resultant slurries are kept in flow motion, at least intermittently, by mechanical means of stirrers and pumps and use of troughs and large piping instead of small ID piping typical of conventional LLX technology. With use of suitable solids handling equipment, i.e. hopper with auger addition trough, solid carbonate and hydroxide solids can be added directly to the sulfate strip mixers as powders, pellets, granules, and the like. With this information, it would be obvious to others skilled in the art of conveying slurries to prepare related mechanical designs for the physical handling of the product "floc" of the invention as described above.

At the preferred counter-current arrangement of the sulfate stripper operation the "first" sulfate strip stage, "S1-SO4", generates an aqueous raffinate from the sulfate stripper stage that is the most concentrated in sulfate ion and represents the "sulfate product concentrate". Depending on relative flow rates of the extractant phase and the carbonate/hydroxide strip feed solution, the sulfate ion product concentration can be adjusted over a very wide range of approximately 2,000-650,000 mgS$_4^=$/L. Preferably the product sulfate ion concentrate is 150,000-250,000 mg/L (or about 15-25%) for the case of stripping with Na$_2$CO$_3$, and 5,000-150,000 mgSO$_4^=$/L for the case of stripping with K$_2$CO$_3$.

Although in the prior art the anion-anion liquid-liquid exchange involving sulfate ion is normally achieved with poor efficiency and incompletion in the case of extracting sulfate ion from water, the nature of the invented process disclosed herein provides sharp, fast and high yield sulfate ion recovery and stripping in stages Sy-SO4 (where y=1 to 3 stages, preferably 1 to 4 stages, and most preferably 1 to 5 stages, while 1 to 6 stages is also effective), by providing the combination of strong thermodynamic driving forces of acid/base neutralization {favorable (negative) enthalpy change} and innocuous gas (CO$_2$) formation {favorable (positive) entropy change}, and low E/A ratio, dianion exchange, and release (positive mass action effects), summarized by the following equations for sulfate ion (equivalent reactions can be written for nitrate, chloride, methane or others sulfonate(s), phosphate, acetate, and other anions that represent the conjugate base of the acid used in the metal ion strip circuit used separately or in any combination), and where Extractant Phase=E-phase, and the undesignated phase is Aqueous Phase,

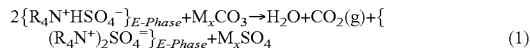
$$2\{R_4N^+HSO_4^-\}_{E\text{-}Phase}+M_xCO_3 \rightarrow H_2O+CO_2(g)+\{(R_4N^+)_2SO_4^=\}_{E\text{-}Phase}+M_xSO_4 \quad (1)$$

For example, for x=2 and SO$_4^=$ strip stage pH of ~2<pH<~7,

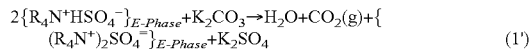
$$2\{R_4N^+HSO_4^-\}_{E\text{-}Phase}+K_2CO_3 \rightarrow H_2O+CO_2(g)+\{(R_4N^+)_2SO_4^=\}_{E\text{-}Phase}+K_2SO_4 \quad (1')$$

and/or,

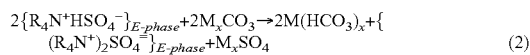
$$2\{R_4N^+HSO_4^-\}_{E\text{-}phase}+2M_xCO_3 \rightarrow 2M(HCO_3)_x+\{(R_4N^+)_2SO_4^=\}_{E\text{-}phase}+M_xSO_4 \quad (2)$$

For example for x=2 and SO$_4^=$ strip stage pH of ~8.5<pH<~10,

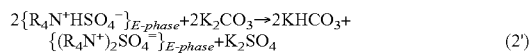
$$2\{R_4N^+HSO_4^-\}_{E\text{-}phase}+2K_2CO_3 \rightarrow 2KHCO_3+\{(R_4N^+)_2SO_4^=\}_{E\text{-}phase}+K_2SO_4 \quad (2')$$

and/or

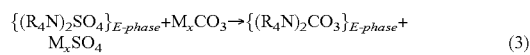
$$\{(R_4N)_2SO_4\}_{E\text{-}phase}+M_xCO_3 \rightarrow \{(R_4N)_2CO_3\}_{E\text{-}phase}+M_xSO_4 \quad (3)$$

As an example, for x=2 and SO$_4^=$ strip stage pH of >10,

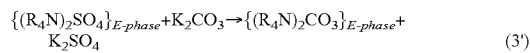
$$\{(R_4N)_2SO_4\}_{E\text{-}phase}+K_2CO_3 \rightarrow \{(R_4N)_2CO_3\}_{E\text{-}phase}+K_2SO_4 \quad (3')$$

and/or

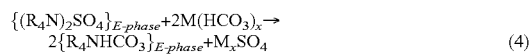
$$\{(R_4N)_2SO_4\}_{E\text{-}phase}+2M(HCO_3)_x \rightarrow 2\{R_4NHCO_3\}_{E\text{-}phase}+M_xSO_4 \quad (4)$$

Where x is 2, and where the $\{R_4N^+HSO_4^-\}_{E\text{-}Phase}$ and/or $\{(R_4N)_2SO_4\}_{E\text{-}phase}$ species flow into the sulfate ion strip circuit from the metal ion strip circuit(s) and the anion is that of the strip acid used in the metal sulfate stripping, and for acid mine drainage water feed may also contain sulfate/bisulfate ion. The relative contribution of each of the above four reactions at each stage of stripping depends upon the pH of operation of the last stage of the metal ion stripper circuit (or of optional wash stage(s)), that is, whether the anion on the extractant phase is sulfate ion, bisulfate ion, or a blend of these, and on the pH of each stage of the sulfate strip circuit. The use of pH to control the strip circuits, including more specific effective pH values, is further detailed below.

For the above, M is most preferably Na$^+$ or K$^+$ (x=2), or blends thereof. These ions can be used alone or combined with any of the following: NH$_4^+$ (x=2) provided the pH is <~9) and especially as concentrated solutions of ammonium bicarbonate (NH$_4$HCO$_3$) to produce concentrated product solutions of ammonium sulfate, ammonium nitrate, ammonium phosphate, and the like and/or blends thereof. Given the above information, it is obvious to those skilled in the art of liquid-liquid extraction that the basic anion can also be added back onto the extractant phase after the stripping of the sulfate (or other anion) by a neutral anion, e.g. sodium or potassium nitrate and/or phosphate solution, followed by a separate sequence of contactors to replace these ions with carbonate ion, or the like. This mode of operation however requires additional contactors and chemical raw materials, and is therefore less preferred.

The generation of CO$_2$ gas in this manner is a unique feature of the invention and occurs most when the last stage of metal sulfate stripping (S3M in the most preferred case), or wash stage (also in the most preferred case) operations are acidic (pH<3, and most preferably pH<1), as it is in the case where the strip acid conjugate base is a weak acid, as it is in the case of sulfuric acid (bisulfate conjugate base), orthophosphoric acid (orthophosphate, monobasic being the conjugate base). It does not occur significantly when the conjugate base of the strip acid is not a weak acid, for example when nitric acid or hydrochloric, other hydrohalic, MSA (methane sulfonic acid), and the like.

The CO$_2$ release occurs preferentially in stage the first stage of anion stripping. For the sulfate case this is stage S1-SO4 (first stage of carbonate/bicarbonate stripping of bisulfate ion) and is due to Reaction 1 where the control pH at the S1-SO4 mixer is most preferably 4.5±1, preferably 4.5±2, but control in the pH window of 2 to 7 is still effective. The CO$_2$ so released is humid, but otherwise pure if the S1-SO4 mixer is reasonably sealed against air intrusion. This CO$_2$ gas is ideal for adjusting the pH of the finished water back down to <9 when the final extraction stage is operated at pH 9-11 to remove Mg and Ca to soften the product water and to further reduce total dissolved solids (see below). Being pure, the CO$_2$ gas can be captured, pressurized and packaged as liquid or dry ice by current commercial and well established technology to produce a useable CO$_2$ product. Otherwise it can be harmlessly vented. This CO$_2$ gas does produce a rapidly breaking foam in the S1-SO4 mixer that needs to be handled such to prevent tank overflow spillage during the operation. If the E/A ratio in the stripper is insufficient in phase, that is the pH in S1-SO4 stage exceeds ~7, then some foaming may aqueous also occur in stage S2-SO4. This foaming is found to be a minor issue as the foam breaks rapidly and only a small foam head is produced. For this reason a continuous stirred mixer tank is most preferred with higher walls on the mixer and associated settler compartment of the first and second carbonate strip stages compared to conventional liquid-liquid technology (see below). Most preferred is that S1-SO4$^=$ also contains a cover that enables the capture of the CO$_2$ gas, without interfering with the mixer, to use to sparge through the purified product water (see below), if needed, to optionally adjust its pH downwards, preferably to pH≤10, and most preferably to pH≤9.

When the aqueous carbonate solution being flowed to the S1-SO4 sulfate stripper stage is derived from a sulfate ion stripper stage just up stream of the S1-SO4 stage in a counter-current operation, i.e. S2-SO4, the most preferred case, then some or most of the carbonate may already be in the bicarbonate ion form (see above chemical equations), i.e. $M_yHCO_3$, where y=1 for $M=Li^+$, $Na^+$, $K^+$ and/or $NH_4^+$, and y=0.5 for $M=Mg^{2+}$, $Ca^{2+}$ and/or $Zn^{2+}$. If $M=NH_4^+$, as is well known in the art of handling ammonia aqueous solutions, that the form of a very soluble reagent addition is $NH_4HCO_3$, prepared from a solid and/or concentrated solution, or directly from $NH_3(g)$ gas or aqueous ammoniacal solution, $NH_3(aq)$.

The extractant phase from S1-SO4 can still contain about one half of the sulfate ion from the extraction circuit depending upon the overall E/A ratio of the stripper circuit and the concentration of active quaternary ammonium concentration used in the extractant, and the E/A flow ratio used in the extraction circuit. This phase is then contacted, preferably in counter-current liquid-liquid extraction mode using suitable hardware (e.g. mixer-settlers, static in-line mixers, columns, or continuous liquid-liquid centrifuges, or hydrocyclones), at least one additional contact time, preferably two to three more, and most preferably four to six more times; that is to say using additional counter-current configured stages, for example S2-SO4, S3-SO4, and S4-SO4 for a total of four anion (sulfate) strip stages linked counter-current. Hence the extractant phase exiting the "last stage" of the sulfate ion strip circuit (normally S4-SO4, but could be S3-SO4, S5-SO4 or S6-SO4), is the carbonate ion-loaded extractant phase (i.e. the form containing $\{(R_4N^+)_2CO_3^=\}_{E\text{-}phase}$) that is recycled to the extraction circuit (e.g. see attached detailed process flow diagrams).

If hydroxide ion, $OH^-$, is to be also added to the $CO_3^=$-loaded E-phase to reduce the amount of residual total dissolved solids by forming less $HCO_3^-$ in the purified water and/or by removing hardness metal ions, then $OH^-$ is added to the $SO_4^=$ strip stage mixer (normally to stages S3-SO4, S4-SO4, S5-SO4, and/or S6-SO4 depending on the desired ($SO_4^=$) residual desired in the treated water and/or on the E/A used in the anion stripper operation).

The raffinate phase flowing from the S1-SO4 stage, either continuously or intermittently, is the useable sulfate ion product, for example concentrated solutions and/or easily crystallized solids of $(NH_4)_2SO_4$, $K_2SO_4$, and/or $Na_2SO_4$ (as a hydrate or anhydrous form). These products are in addition to the metal salt solution products or solids, for example metal sulfates produced from the S1-M metal ion strip stage circuit referred to above, or from both S1-M and S1-N stages from a dual metal ion strip circuit (see below). These products are items of commerce used in numerous industries, with the metal salt concentrate blend being of a new composition (see above).

As illustrated by the discussion above, and the Detailed Description of the Invention and Examples sections, the exact pH and E/A flow ratios of each flotation liquid-liquid extraction contactor, the added reagents and reagent concentrations, and the like, used determine the purity of the water produced and the type and amount of co-products produced. This flexibility of products help insure that the product mix and purities produced can be best tuned to meet regional municipal, industrial, agricultural, and residential market demands for the products produced in practicing the invention.

Operation of the Sulfate Recovery Circuit and Regeneration of Carbonate Form of the Extractant Phase for Continuous Recycle In a most preferred embodiment, if the feed of acidic extractant phase to S1-SO4 is in excess of the molar amount that can be handled by the above chemical reactions 1 to 4, then all of the aqueous carbonate is consumed, as desired, in S1-SO4, as given in the above chemical equation, thus insuring that no carbonate exits the process with the sulfate product and thereby insuring that all the carbonate added to the system is transferred to making sulfate concentrate product (or other anion product as listed above). In the case of some excess acid being present in S1-SO4 (indicated by a S1-SO4 mixer or raffinate pH of <4), (the acidity being supplied from the last metal ion stripper stage, normally S3M, but optionally could be S2M or S4M), and present as $\{R_4N^+HSO_4^-\}_{E\text{-}phase}$, or as $\{R_4N^+H_2PO_4^-\}_{E\text{-}phase}$ and/or $\{R_4N^+HPO_4^=\}_{E\text{-}phase}$ if phosphoric acid is the strip acid used, still exists on the extractant phase and this is easily consumed, and the associated sulfate removed, in the S2-SO4 stage, but $CO_2(g)$ does not form, as follows (shown for the sulfate ion system):

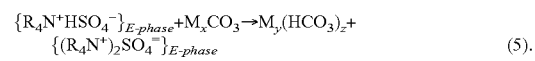

$$\{R_4N^+HSO_4^-\}_{E\text{-}phase} + M_xCO_3 \rightarrow M_y(HCO_3)_z + \{(R_4N^+)_2SO_4^=\}_{E\text{-}phase} \quad (5).$$

and in parallel,

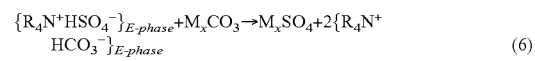

$$\{R_4N^+HSO_4^-\}_{E\text{-}phase} + M_xCO_3 \rightarrow M_xSO_4 + 2\{R_4N^+HCO_3^-\}_{E\text{-}phase} \quad (6)$$

Where the M, x, y and z definitions are as before. In this case, the extractant phase carries the $\{(R_4N^+)_2SO_4^=\}_{E\text{-}phase}$ and $\{R_4N^+HCO_3^-\}_{E\text{-}phase}$ species to the S3-SO4 and/or S4-SO4 strip stages where the $SO_4^=$ and $HCO_3^-$ extractant phase species are displaced (ion exchanged out) by the overwhelming high concentration of divalent (pH 10+) $CO_3^=$ ion. The carbonate ion concentration used is limited only by the solubility of the carbonate salt and, more preferably, also by the product of the salt solution in stage S1-SO4 (again, using the sulfate ion as the example for illustration purposes). Hence when using potassium carbonate as the strip aqueous solution, the effective concentration range is 0.1% to 50% $K_2CO_3$ at ambient temperatures; but preferably 12-35% $K_2CO_3$ so that a concentrated potassium salt is produced from S1-SO4 stage that is supersaturated with respect to $K_2SO_4$ crystallization, making recovery of a solid $K_2SO_4$ product, with recycle of supernatant/filtrate preferred; and still more preferably 6-11% $K_2CO_3$ so that the salt produced in stage S1-SO4 remains soluble so that a liquid product that is readily saleable as liquid fertilizer is made, and so to avoid the potential for hard scale to form in S1-SO4 unit when the product produced there is $K_2SO_4$, and most preferably 7.5 to 8.5% $K_2CO_3$ so that the maximum (about 10-11%) concentration of $K_2SO_4$ solution, that does not crystallize at room temperature, is produced.

Similarly, when using sodium carbonate as the strip aqueous solution being fed to the last strip stage, and optionally, although less desirably, to one or more of the others, the effective concentration range is 0.1% to 25% $Na_2CO_3$ (as anhydrous) at about 25° C. temperature, and greater at higher temperatures, but preferably 6-15% $Na_2CO_3$ so that a concentrated sodium salt of up to about 22% $Na_2SO_4$ is produced (as $Na_2SO_4 \cdot 10H_2O$ if T is <~33° C., and anhydrous if T is >~33° C.) from S1-SO4 stage, and still more preferably about 10-15% $Na_2CO_3$ so that the salt produced in stage S1-SO4 is soluble and sodium sulfate hydrate solids do not develop in S1-SO4 unit when the product produced there is $Na_2SO_4$ solution.

The $SO_4^=$ and $HCO_3^-$ ions so stripped by the carbonate ion using the solutions defined above then accompany the aqueous phase from the last strip stage (normally S4-SO4, but can also be S3-SO4, S5-SO4 or S6-SO4 depending on the initial and residual ($SO_4^=$) concentration objectives of the feed and purified product waters of the extraction circuit), to S1-SO4 to become part of the final products as given above. In chemical reaction form these reactions for stages S3-SO4 and SO4 are

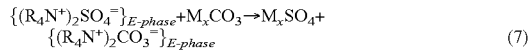 (7)

and/or,

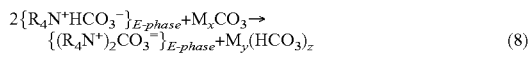 (8)

Similarly for optional stages S5-SO4 and S6-SO4 if they are used.

Extractor Configuration to Maximize Separation of Trivalent Metal Ions from Divalent Metal Ions Using the example of acid mine drainage or acid rock drainage feed water, the partially purified acid mine drainage aqueous steam generated in extraction circuit E1 (operating at pH 3-5 for trivalent metals) is directed to another extraction circuit (E2) for further processing at pH 5-10 (for any residual trivalent and especially divalent metals present in the water feed). At the lower pH, conversion of $CO_3^=$ to $CO_2$ occurs, thereby requiring the $R_4N^+$ to ion pair with any remaining anionic, especially sulfate ion in the case of acid mine drainage, not extracted in E1 stage, and to also form additional molecular metal ion complex clusters, colloids, flocs, particulates, and the like, containing hydrophobic quaternary moieties, as described above, with hydroxides and oxides of metal ions, mostly ferrous ion in the case of acid mine pool water, collectively illustrated as $\{(R_4N)_w\}\{M(OH)_n\}_w$ along with essentially separate and essentially soluble colloids of sulfate ion with the quaternary ammonium ion extractant depicted as $(\{(R_4N)_2SO_4\}_{colloid})_v$. For these species "w" is the absolute number of charges per colloid, cluster, particle, and the like, and also the absolute number of charges on the sulfate ion colloids, to within a zeta potential of 25 mV or less.

To separate the lower pH extracting metal ions from those extracting at higher pH, the extractant phase from above is then stripped with an acid (e.g. sulfuric acid or one of the other acids listed above) to remove the trivalent metal ions, and any more acidic+2 metal ions such as copper(II), as metal sulfate concentrates, as described above, to then yield $\{R_4N^+ HSO_4^-\}_{E\text{-}phase}$, depicted as $\{(R_4N^+)_2SO_4\}_{E\text{-}phase}$. Trivalent and certain divalent metal sulfates are recovered and are useful as chemical specialties and commodities (see above). When the trivalent metals present are ferric ion and aluminum ion, and also when the ferrous ion is co extracted and stripped with these ions, then a unique ferric aluminum ferrous sulfate product aqueous concentrate is so produced and represents a unique composition of matter of value in large scale water purification applications that provide many beneficial advantages over the separate components of ferric sulfate, ferrous sulfate and alum. There are many other uses for this new composition of matter product (listed above).

One new composition of matter was discovered and produced using the invention and consists of a blend of $Al^{3+}$, $Fe^{3+}$, $HSO_4^-$, and $SO_4^=$ ions, with a second formulation of these ions and $Fe^{2+}$ ions at concentrations and ratios that maximize municipal and industrial waste water treatment, municipal potable water, and/or industrial process water purification processes. Conventional treatments involve the use of only one of the following for these applications and at higher costs: ferric chloride, ferrous sulfate or alum. However, although these reagents are functional in removing dissolved toxic metal ions from water and coagulating suspended solids and biologically derived biomass (from anaerobic digesters), they all have serious shortcomings. First, though ferric ion is preferred for the above properties, the chloride content of ferric chloride promotes corrosive ion water distribution tankage and piping, leading to serious corrosion of copper plumbing and to Pb-based solders in the water distribution system causing serious birth defect negative health effects. Hence ferric chloride coagulate has been reduced in use for potable water production. A second problem with ferric chloride is that ferric ion too rapidly hydrolyzes to FeOOH precipitate, thus preventing it from dispersing well enough in the treated water to enable its efficient use in removing other pollutants of concern, especially arsenic As and phosphate ions ($PO_4^{3-}$). Alum (an aluminum sulfate hydrate) is desirable in water treatment due to ease of dewatering but suffers from the deficiencies of narrow operating pH range and especially in forming excessively voluminous sludge, some ten times or more that formed by ferric salts. Ferrous sulfate avoids the problem with the use of chloride ion and is water soluble around neutral pH enabling it to be thoroughly dispersed so to more effectively precipitate toxic contaminants such as As and $PO_4^{3-}$. However, ferrous ion is a poor coagulant and flocculent and must be air or chemically oxidized to provide coagulation and flocculation, a slow or costly process, respectively.

The new composition of matter now provided by this invention avoids the above problems while maintaining all of their benefits. The metal sulfate concentrate product is thus unique for purifying a broad spectrum of waters for many needs. It does not contain the corrosive chloride ion, it does contain ferric ion in abundance for fast coagulation and flocculation, it does contain ferrous ion that provides a fully soluble form of iron to effectively precipitate As and $PO_4^{3-}$, and lastly, it does contain a low amount of aluminum ion that is sufficient to both perform coagulation and flocculation with a "filter aid" effect on the result and sludge filtration and dewatering steps, and yet the precipitate is dense due to the ferric content that collapses the otherwise voluminous AlOOH precipitate.

This new composition of matter is formulated $Fe^{III}_x Fe^{II}_y Al_z(SO_4)_w \cdot H_2O$ and is provided in both aqueous solution and solid forms. The equivalent ratios (dry conditions where $q=\emptyset$), based on charge balance, are, $$(X \times 3)+(y \times 2)+(z \times 3)=2 \qquad (9)$$

As an example, for x=1, y=1 and z=1, then the value of "w" is (3+2+3)/2=w=4, provides the empirical formula of $Fe^{III}Fe^{II}Al(SO_4)_4 \cdot qH_2O$ with a nonhydrous formula weight of 523 g/mole. Another example, based on acid mine drainage water feed is x=0.1, y=0.8 and z=0.1, giving a value for w=(0.3+1.6+0.3)/2=1.1, or $Fe^{III}_{0.3}Fe^{II}_{1.6}Al_{0.3}(SO_4)_{1.1}$ for a formula weight of 159 g/mole. Specifically, this new material consists of the range of ratios: $Fe^{III}_{0.03}Fe^{II}_{0.95}Al_{0.03}(SO_4)_{1.04}$ (FW of 155 g/mole), to $Fe^{III}_{0.95}Fe^{II}_{0.03}Al_{0.5}(SO_4)_{2.2}$ (FW of 280 g/mole). The total composition of the aqueous solution of the new material, $Fe^{III}_x Fe^{II}_y Al_z(SO_4)_w$, produced by the process of the invention from acid mine drainage feed water is (dry weight) at least 0.1%, and preferably 1 to 5%, and most preferably 5 to 20%. All percentages are by weight in aqueous solution. The solid material is prepared by taking the metal sulfate concentrate from the process of the invention and either cooling it to 0 to 5° C. and allowing the material to crystallize, or by drying the material using heat, evaporative cooling, or the like, until sufficient water has been removed to enable crystallization of at least a part of the originally dissolved, and preferably precipitating at least 90% of the dissolved solids, where upon a substantially amorphous, granular, air sensitive material is produced. Up to 50% of moisture is left in the solid to retain the materials reactivity and water solubility. Oven drying the material, especially in the air or other source of oxygen gas, is not recommended since at least a portion of the material then would form amorphous mixed oxides of iron and aluminum, a portion would darken to magnetite (mixed ferric and ferrous particulate) would be produced, and the sulfate would be converted back to sulfuric acid making the material hazardous to handle. This new and unique material is made by selecting a strip acid, specifically sulfuric acid in this case, that is used to strip the Fe(II), Fe(III) and sulfate ion components of a metal-loaded extraction concentrate at an E/A ratio such to provide substantial concentration enhancement, at least 10 fold, preferably 50 fold, and more preferably 100 fold. In addition to these parameters the product concentration of this unique material produced is determined also by the number of acid strip stages used and the number of internal recycles achieved. The S1-M strip stage is the most influential on metal ion concentrate. At the minimum, stripping must be sufficient to strip a substantial portion of the metal ion content of the colloid loaded extractant phase while mixing for up to 30 min, preferably 15 min, and most preferred up to 6 minutes. Normally more than 99% of the metal ions of the colloidal floc are stripped into the mixed metal sulfate concentrate due to the multi-stage counter-current liquid-liquid stripper design of preferably three contact stages.

An important and unique provision of this invention is that, in one unit operation with a relatively small size it provides:
1) Removal of toxic cations, including the very slow reacting ferric, ferrous, nickel, and aluminum ions, and the like, even present at very high levels, to levels compliant for surface water discharge, potable water, and other regulated requirements,
2) Neutralization of the acidity that characterizes many waste streams, including acid mine drainage, acid rock drainage, natural gas well, and the like, discharge waters,
3) Removal of the very difficult to remove sulfate ions and lowering of sulfate-based salinity by 90 to 99% or more,
4) Lowering of water total dissolved solids,
5) Achieving the above separations simultaneously and quickly, thereby achieving a process with a relatively very small size footprint for high flow rate systems,
6) Significantly, by means of this invention, highly toxic contaminants such as Pb, As, Se, Hg, Cd, and the like; and many radioisotopes/radioactive contaminants such as Tc, I, and the like can be effectively removed from the water,
7) Purification even of waters contaminated with extremely problematic, complex mixtures of contamination ions in waters containing slowly-reacting ions, colloids, highly-toxic metal ions, and up to thousands of mg/L (ppm) of dissolved salts.

A particularly problematic example is that of mining, especially that of coal mining, where the mining activity has exposed gangue minerals left in the mine and mine tailings to erosion by air, water, and microbial action. Sulfidic minerals, such as pyrite, $FeS_2$, are commonly found in many geological strata, and especially in reducing ores such as coals and metal sulfide ore bodies. As described thoroughly in the literature review spanning many decades, coal, metal and other mining operations, and natural weathering fissures have allowed water, air and microbial access to these reducing substances. These conditions promote the oxidation of the sulfidic minerals to water soluble metal sulfates, especially ferrous sulfate solution, as shown by the series of chemical equations below. In the specific case of iron, a complex series of reactions can occur (J. Skousen, et al, Jun. 1, 1998, "Acid Drainage Technology Initiative (ADTI)," Published by The National Mine Land Reclamation Center located at West Virginia University in Morgantown, W.V., *Handbook of Technologies for Avoidance and Remediation of Acid Mine Drainage*) with the net total dissolved solids level and acidity increasing result as follows (aided by microbial action):

$$2FeS_2 + 7O_2 + 2H_2O \rightarrow 2Fe^{2+} + 4SO_4^{2-} + 4H^+ \qquad (10)$$

$$4Fe^{2+} + O_2 + 4H^+ \rightarrow 4Fe^{3+} + 2H_2O \qquad (11)$$

$$4Fe^{3+} + 12H_2O \rightarrow 4Fe(OH)_3* + 12H^+ \qquad (12)$$

$$FeS_2 + 14\ Fe^{3+} + 8\ H_2O \rightarrow 15Fe^{2+} + 2SO_4^{2-} + 16H^+ \qquad (13)$$

$$4FeS_2 + 15O_2 + 14H_2O \rightarrow 4Fe(OH)_3* + 8H_2SO_4 \qquad (14)$$

* solid at pH>2.5

These reactions produce an acidic ground water of primarily ferrous sulfate, the main soluble metal ion product, containing very high levels (often above 1000 mg/L) of total dissolved solids, being largely a contribution of acid attack on dolomite and limestone carbonate-based minerals (Reaction 15 and 16 respectively) which contribute Mg, Mn and Ca, which also report to the water in sulfate form. Though bicarbonate ion can also be present in some alkaline acid mine drainage waters, waters of pH less than about 6 will have converted most of the carbonate of these minerals into gaseous $CO_2$ and so little alkalinity will is found.

$$2H_2SO_4 + \underset{\substack{\text{From dolomite} \\ \text{Eq. 14}}}{MgCa(CO_3)_2} \rightarrow 2H_2O + 2CO_2(g) + Ca^{2+} + Mg^{2+} + 2SO_4^- \qquad (15)$$

$$H_2SO_4 + \underset{\substack{\text{From limestone} \\ \text{Eq. 14}}}{CaCO_3} \rightarrow H_2O + CO_2(g) + Ca^{2+} + SO_4^- \qquad (16)$$

Hence, due to Reactions 12 and 14, acid mine drainage, acid rock drainage, natural gas well brine, and the like, waters will tend to have far more dissolved sulfate ion than dissolved iron, the pH will be higher than Reactions 10 to 14 would predict alone, and would be low in ferric ion content. Hence, for the maximum benefit, the technology of this invention is best applied to the acid mine drainage water drawn directly from the mine pool and not from the discharged surface waters in that much more of the metal ions can be recovered instead of lost to FeOOH precipitation in the affected natural stream or other water body.

These drainages and associated ground and surface waters contain one or, more often, many of the toxic or highly concentrated contaminants listed in Tables 2A, 2B, and 2C which provide an analysis of a representative samples of acid mine drainage.

Conventional technologies have been found to be unsuitable for purifying such waters as acid mine drainage, many mineral processing waters, gas well brines, and the like. Typical concentrations of the contaminants of concern in such waters are several fold above the 1000 mg/L removable by such prior art technologies and the ferrous ion rapidly air oxidizes to FeOOH precipitate rapidly plug alternative technologies. The flow rates of such ground waters, especially as they seep to the surface and contaminate ground water for wells, streams and rivers far exceed the practical treatment maximum of these alternatives.

Industrial processing of metals (surface finishing). These plating and painting shop rinse waters contain one or more of the toxic or highly concentrated contaminants listed in Tables 2A, 2B, and 2C and also toxics such as hexavalent chrome, cyanide ion, lead, cadmium, nickel, copper, iron and others.

Discharges of agricultural water from concentrated animal feeding operations, CAFOS, and the like. These drainages and associated ground and surface waters contain one or more of the toxic or highly concentrated contaminants listed in Tables 2A, 2B, and 2C, and more particularly also contain problematic macronutrients, especially phosphorus (P) and nitrogen (N) containing organic and inorganic compounds. P and N nutrients are the bane of agricultural runoff waters because they stimulate plant algal, and then bacterial, growth that far exceed natural waters' ability to handle it, resulting in deoxygenated zones ("anoxic" zones) in natural bodies of waters extending from the farm, such as streams and creeks, leading to ponds, lakes and rivers, and then to large lakes, like Lake Erie, gulfs, like the Gulf of Mexico, and bays, like Pamlico Sound (all in the USA). These dissolved oxygen "dead zones" are lethal to aquatic fish and thereby render these streams and agricultural practices problematic to the public recreational, fishing industry, and government regulatory bodies.

Most phosphorus and nitrogen containing compounds in fresh manure and urine animal waste, or from animal feed decomposition processes taking place in storage bins, occur as oxidized phosphate in the case of P but reduced amines in the case of N, the later some inorganic, primarily ammonium ion, and the rest as well known biochemical organo amine compounds. It is also well known that the P component in agricultural runoff water is by far the most impactful micronutrient on algal blooms. Since the present invention readily extracts anions, like phosphates that are present in these problem waters, a substantial improvement in water quality emanating from farms can be made using the invention. Likewise, after operating the residual organic and ammonical nitrogen components oxidatively using established physical chemical and/or biological operations to convert the nitrogen to the nitrate anion, then the nitrogen component could also be so removed from the water and concentrated for fertilizer use, for example as needed by international grain grower farms. In this manner, agricultural waters can be purified to enable their problem-free discharge to surface waters without the negative impacts described above due to the payload of nutrients. Most preferred is to first filter out any suspended solids by conventional filtration prior to treatment according to the present invention.

Method (Operation of Process)

Figure 1B:
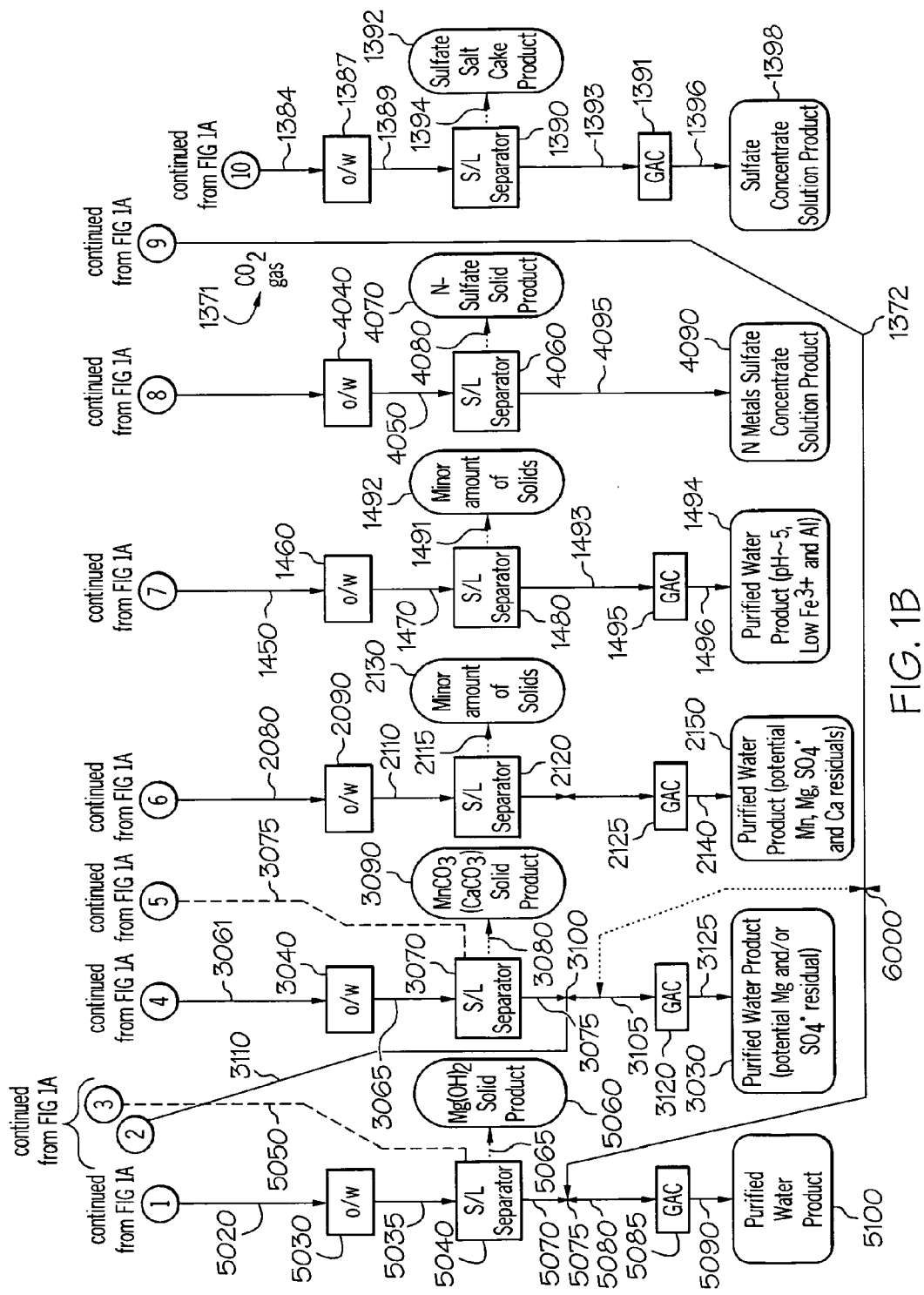
FIG. 1B is a schematic drawing illustrating a second part of the overall flow of materials one aspect of the invention.
Figure 1C:
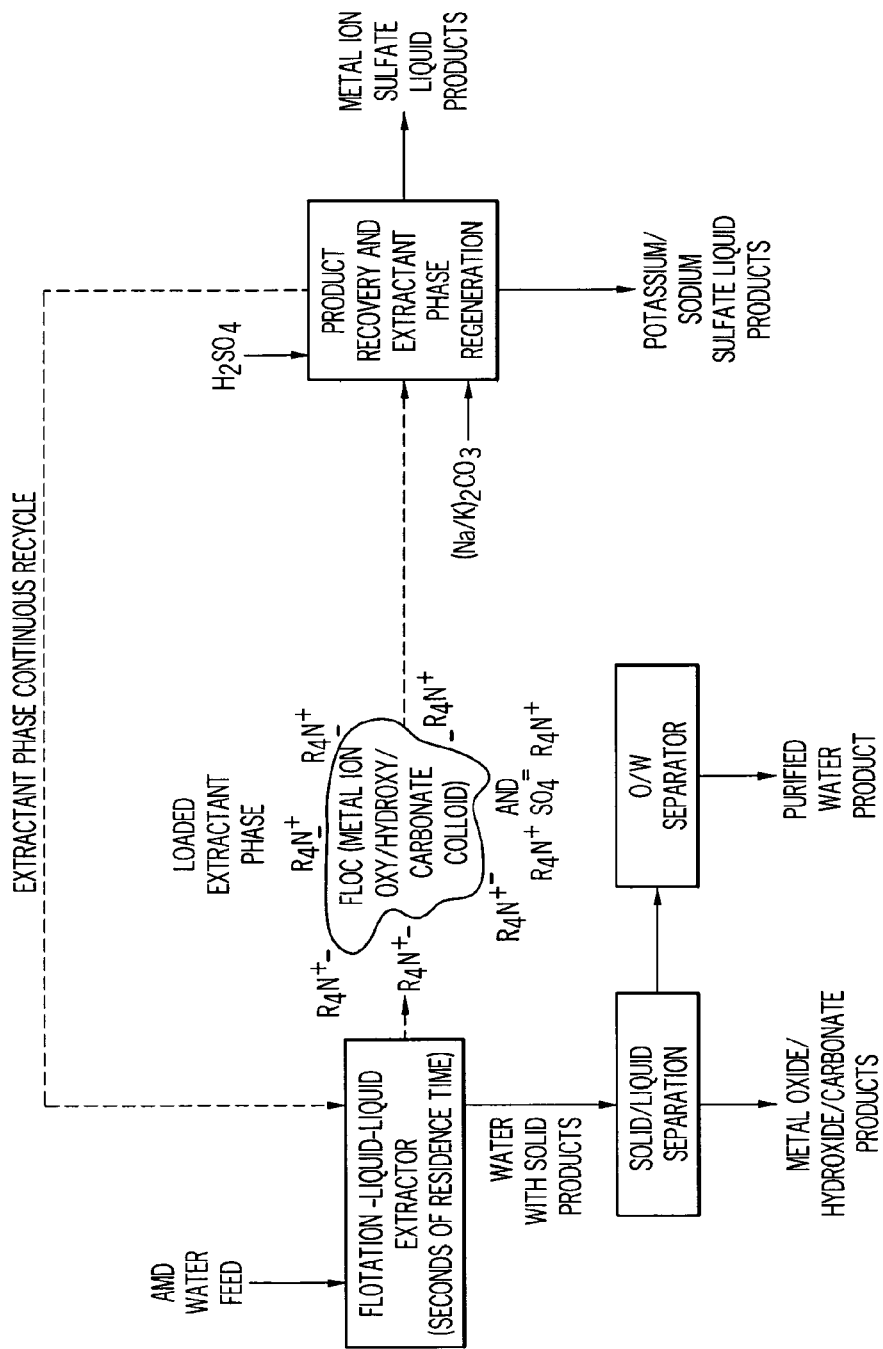
FIG. 1C is a schematic showing the general process steps involved in a broad embodiment of the invention.

Acid mine drainage/acid rock drainage feed water is used to illustrate application of the preferred operation of the invention. Coal mine acid mine drainage water (Tables 2A, 2B, and 2C) is typically most contaminated with the metal ions: ("M" Series) $Fe(III)$, Al, Cu; ("N" Series) $Fe(II)$, Ni, Co, Zn, Mn, Ca and Mg and highly contaminated in sulfate anion. Sulfate ion is a notoriously difficult anion to remove from water, and especially in a practical manner for the cases of unmet need involving high to very high flow rates (e.g. 10 to 10,000 gal/min). Typical acid mine drainage water contamination and flow rate levels vary broadly by source, season, and physical characteristics of the aquifer involved. This invention enables the removal of most or all of these contaminants to levels low enough to allow widespread use of the water no matter the variations in inlet contamination and flow rate levels. Contaminant levels can usually be reduced to below maximum permissible dischargeable levels in one treatment, and even routinely to levels allowed by primary and secondary government drinking water standards. Therefore the product water is safe for aquatic life promoting tourism involving such river and stream systems. Even more, such purity levels would enable the product water of the invention to be used for potable water, feed for potable water production plants, farm water use, and/or for industrial process water. As described below, the ability for this high level of purification is provided by the invention via a novel combination of new process chemistry, newly designed simultaneous floc/liquid/liquid contactor devices, and the newly discovered process operations needed to deploy these technologies. Referring now to FIGS. 1A and 1B, a detailed description of this integrated invention follows.

As used herein the term ionic ions species includes one or more of an anionic and/or a cationic ions.

A broadly applicable and detailed version of the invention is given in FIGS. 1A and 1B. This water purification process provides new and useful process chemistry, water purification devices, and methods. The major features of the invention, the operation of which is detailed in the example below, include a novel flocculation-liquid-liquid extraction device that possesses a unique design for floc and slurry handling hardware to enable metal hydroxide/sulfate colloids and flocs to be handled in modified liquid-liquid contacting devices. Such flocs and slurries rapidly shutdown conventional and other prior art liquid-liquid extraction apparati. In one embodiment, this unique hardware consists of a liquid-liquid contacting device fitted with a extractant phase flow control consisting of gradually narrowing channeling gates feeding it to a smooth, preferably about 30 degrees sloped-surface, that feeds it to a smooth and broadly rounded over-flow type weir called a floc weir fitted with a sloped discharge ramp of most preferably about 30 degrees from the vertical. These features enable the colloids but especially flocs and slurries produced by the unique process chemistry of the invention to be separated from the water phase being purified in the process. The unique separation process chemistry of the invention is normal very difficult to process but is required to achieve very short water residence times in the equipment which in turn provide the enormous advantage of purifying very large volumes (10 to at least 10,000 gal/min) of water practically and at much lower cost than conventional technologies.

Referring to FIGS. 1A and 1B the detailed description of the invention is as follows. Acid mine drainage water 1110, containing anionic and cationic components, is fed by gravity or by pump 1120 through valve 1125 and line 1130 to one or more floc/slurry liquid-liquid extractors 1210 fitted with specially designed floc/slurry handling decanters as described elsewhere in this application. The level of contamination and the degree of water purification desired determines the number of such extractors deployed. Normally the selection of the number of stages and flow rate ratios used is made by the level of purity desired for the product water, especially the residual sulfate ion and toxic metal residuals needed. Most preferably the arrangement of such extractors is counter-current, but can be preferably cross-current, or least preferably co-current. If more than one contactor is provided, they are most preferably arranged in counter-current liquid-liquid extraction configuration. This water is contacted only for a short period of time in each extractor, 30 seconds to 30 minutes are effective, however, preferably only 30 to 200 seconds, and most preferably about 45-90 seconds, and still me preferably 60 seconds, and still more preferably 60 seconds, with extractant phase (defined elsewhere in this application), supplied from tank 1010 via pump 1020 and valves 1030, 1032 and 1034.

Water Purification Using Only One Extraction Operation

In the simplest case, where only mostly $Fe(III)$, (including $Fe(II)$ converted to $Fe(III)$ during processing), Al, Cu, ("M" Series of metal ions) and a substantial amount of sulfate ion needs to be removed from the water to accomplish the purification objective, then only the Low pH flotation liquid-liquid extractor process arrangement is used. In this case at least one flotation liquid-liquid extraction extractor set 1210, containing at least one mixing stage forming at least one water immiscible heterogeneous fluid consisting of liquid (at least two phases consisting of an aqueous and water immiscible extractant phase (E-phase), and also a floc and/or colloidal emulsion, and/or optionally a solid/liquid slurry. Also included is at least one settling compartment, optionally, but not preferably, fitted with "picket fence" fluid flow disrupter gates, and where the settler compartment necessarily contains a flow constrictor positioned to guide the top phase (organic emulsion containing colloidal floc and/or slurry) towards the specially designed floc/extractant phase overflow weir at the back of the settler. In this manner extraction of at least a portion of the above contaminants from the acid mine drainage (or other) feed water is accomplished using the extraction process chemistry described elsewhere in this application.

The metal ion and sulfate ion "loaded" extractant phase from 1210 exits the settler as a water insoluble floc and/or slurry commingled with liquid extractant phase optionally, but most preferably, to a decanter. The construction of the decanter (for FIG. 1A is to be presumed to be a component of F-LLX Extractor 1210) is similar to the settler and includes the floc handling overflow weirs described above. However, the most preferred operation of the Extraction 1210 settler and associated decanter in that the E/A interface of the settler is set high in the extractor settler to promote exiting of the E-phase and its contents as quickly as possible to the decanter, and low in the decanter to facilitate releasing the bulk of the water from the extractor settler as fast as possible but releasing the extract with floc slowly from the decanter to maximize its dewatering. This short residence time is valuable since the acid mine drainage water flow rate is by far the fastest flowing fluid in the system (at least 5 to 10 times any of the other flows) and therefore dictates the size of the hardware need to make the purification.

The E-phase with floc is dewatered maximally in the decanter prior to metal product production. This further dewatering is achieved by setting the E/A interface at a medium position in the decanter, normally in the 1/3 to 2/3 range level of the total fluid depth of the decanter. This interface positioning allows a very clean/sharp separation of the water from the floc material in the decanter. It also allows the E-phase to thicken as it releases water of entrainment, chemically formed water from the dehydration of metal hydroxide colloids, chemical displacement of hydration water by the modifier (normally oil soluble isodecanol or other oil soluble yet polar component of the E-phase, such as esters and/or alkyl phenols). Critically, the fluid dynamic design of the decanter internals provide the necessary promotion of continuous thickened E-phase floc fluid flow in the decanter which, if such devices were not present, would result in settler and decanter plugging by heavy precipitates causing stoppage of flow. However, with such newly-discovered devices, the E-phase emulsion thickens, but does not collect at the interface (known as "CRUD" in the conventional technology and prior art, resulting in the requirement for maintenance and even shutdown/cleanout), but instead flows smoothly and continuously to the E-phase exit chamber 1040, which can be a line, a chute, or the like, as described elsewhere in this application, thereby transferring it to the metal ion stripper 1220 operation.

The acid stripper operation 1220 consists of one or more, most preferably counter-currently arranged liquid-liquid contactors, which can be of conventional design, but which most preferably is designed capable of accepting flow of floc/slurry impregnated E-phase to the mixer compartment via 1040. In the case where more than one stripper contactor exists in counter-current arrangement, this modification is only needed for the first mixing compartment as the floc or slurry is rapidly dissolved in the first strip mixer operation.

In the strip mixer operation, the floc/slurry loaded E-phase is contacted with aqueous acid solution 1215. This acid is delivered to the stripper contactor via pump 1217 and valve 1219. Most preferably, the strip acid is continuously internally recycled within each striper liquid-liquid contactor used in order to achieve both efficient use of the acid, by consuming it as completely as possible, and the maximization metal ion concentration in the metal sulfate product solution. The greater the metal ion concentration of the aqueous strip solutions the more useful and valuable is the metal sulfate product and the more cost effectively it can be processed into items of commerce. With the invention, the extracted metals (and later sulfate, see below) can be concentrated many factors, for example from 2× to 200,000 times, and often to saturation points for the metal sulfate, carbonate or hydroxide solids produced (see below). It will be appreciated that the lower the concentration of solute in the acid mine drainage feed water, the greater the concentration factors that are theoretically possible. For example, 2000 ppm sulfate ion present in feed water 1110 can be concentrated by the invention to a sulfate solution concentrate in operation 1370 of 200,000 ppm, representing a concentration factor of 100×. However, 200 ppm sulfate ion present in feed water 1110 can also be concentrated by the invention to a sulfate solution concentrate of 200,000 ppm, representing a concentration factor of 1000×. In this manner, valuable metal ions, for example Co or Ni, that are present at sub-economic concentrations, for example 0.1-1 ppm, can be concentrated to 1000 ppm in operation 1220, a 1,000-10,000× concentration factor, making these metals now economically and practically available for commercial use. The invention achieves these attractively high concentration factors by using a combination of sharp separation process chemistry both for extraction and stripping, low E/A ratios in the extraction stages, and then high E/A ratios with aqueous internal recycle in the strip stages, in the stripper stages 1220 and 1250. The amount of recycle acidic metal sulfate is maximized and controlled by valve 1240.

The aqueous acid, now carrying the metal extracted from 1210 and representing metal sulfate concentrate exits the metal ion stripper 1220 via line 1230. If the metal concentrate is concentrated sufficiently for harvesting and/or there is a need to drain aqueous phase from stripper 1220 to prevent excessive aqueous phase volume accumulation in the stripper settler compartment, then this product metal sulfate aqueous concentrate is harvested via valve 3-way valve 1240 to allow flow of this metal sulfate concentrate to optional oil/water separator 1270. Any recovered extractant phase from oil/water separator 1270 is returned to the extractant phase exiting the metal ion stripper circuit 1060. In this manner, especially preferred to be a counter-current multi-stage design, the E-phase is rendered devoid of most of the metal ions extracted above in the extraction operation and now proceeds to the sulfate stripping operation via line 1060. The metal sulfate concentrate exits optional o/w separator 1270 via line 1280 and proceeds to optional solid/liquid separator 1285, for example a crystallizer, in-line filter, or other solids/liquid separator, the liquid proceeds to M metal sulfate concentrate through line 1290 to metal sulfate product collection vessel 1292. The optionally crystallized product or filter cake is collected via line 1287 to receiving vessel 1289. The extractor and stripper can be one contactor each or more than one. If more than one, then they are most preferably configured counter-current or cross current. The concept of counter-current, cross-current and co-current are already well known to those skilled in the art of industrial scale liquid-liquid extraction. For the invention, one or two stages of flotation liquid-liquid extraction each, with decanter is most preferred when the objective is to remove only ferric ion, aluminum, and/or copper with two, or preferably three, stages of metal ion stripping operated with internal recycle in the mixer E/A range of 1/20 to 20/1, and with the aqueous acid feed fed most preferably counter-current or cross-current to the strippers and while the aqueous phase from the third metal sulfate strip (S3M) stage is being sent to the second metal sulfate strip (S2M) stage, then being sent to the first strip stage (S1M) as aqueous phase of metal ion sulfate concentrate from the first stage (S1M) is harvested. Decanters are not needed for the strip stage so long as the settler volumes are sufficient as is normally the case. Most preferred is that at least 15-30 min of metal sulfate stripper settler time is supplied. Although a third phase can form in the S2M stripper settler, this can be alleviated by altering the composition of the extractant phase or most preferably by lowering the concentration of the strip acid to about 25%, though 2%-30% acid concentrations are effective.

After metal sulfate stripping operation, the extractant phase 1060, now loaded with bisulfate ion and devoid of at least a portion of the transition metal and light metal ion content, and preferably devoid of >90% of the transition metal and light metal ion content, and more preferably devoid of >99% of the transition metal and light metal ion content, and most preferably devoid of >99.9% of the transition and light metal ion contents, flows preferably by gravity through line 1080 to the sulfate stripper operation 1370 where it is stripped of its anion content, sulfate ion in this example of acid mine drainage water purification, using one, or preferably 4 to 6 counter current, internally aqueous recycled, stages. Sulfate stripping is accomplished in operation 1370 by contacting it counter-currently with an aqueous solution of carbonate ion, hydroxide ion, a combination of the two, and/or bicarbonate solution, carbonate ion solution, or a combination of the two. Suitable cations for these anions are most preferably sodium, potassium or ammonium ions, or less preferably, lithium ion, or any combination of these. Sodium cations and/or potassium solutions are the most preferred, i.e. $Na_2CO_3$ solution, and/or $K_2CO_3$, with or without KOH or NaOH. Although one mixer-settler is functional, preferably three to six mixer-settlers arranged in counter-current flow is more preferred, and five is most preferred. The criteria for the number of stages to use are the amount of sulfate ion in the feed water, the E/A ration in the sulfate strip circuit, and the target low level of residual sulfate ion sought in the finished water. Any residual sulfate ion left on the E-phase after sulfate ion stripping operation is carried back into the extraction operation with the acid mine drainage feed water and hence may reduce the sulfate ion removal efficiency of the extraction operation and therefore the residual sulfate ion concentration left in the purified water product.

For illustration, using the sodium cation case for the carbonate aqueous feed 1310 to the sulfate ion stripper 1370, and the case of no NaOH feed 1360, fed to the sulfate stripping operation 1370 via pumps 1320 and 1350 via valves 1325 and 1345, the sulfate ion is removed from the extractant phase into the aqueous phase where it forms a sodium sulfate salt concentrate at a ratio depending on what was fed via lines 1330 and 1340 via pumps 1320 and 1350 from reagent feed tanks 1310 and/or 1360. During this operation, the extractant phase becomes loaded with carbonate ion, bicarbonate ion, and/or hydroxide ion, depending on the E/A flow ratio in the strip circuit and the setting of valves 1325 and 1345 and the speed of pumps 1320 and 1350. For removing the above listed acid mine drainage metals from the extractant phase, other than Mn, Ca, or Mg, preferably only carbonate ion, is used to strip the sulfate ion from the E-phase 1060 and/or 1080 (see below), and is fed from tank 1310 with pump 1320 via valve 1325 and line 1330.

Note, that with bisulfate ion, $HSO_4^-$ loaded onto the E-phase flowing from the M metal sulfate stripper as described above, the first stage of sulfate stripping involves converting extracted bisulfate ion into extracted sulfate dianion as follows,

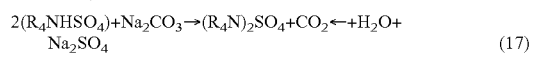

$$2(R_4NHSO_4)+Na_2CO_3 \rightarrow (R_4N)_2SO_4+CO_2\leftarrow+H_2O+Na_2SO_4 \quad (17)$$

Where, the second stage of sulfate stripping, and any additional stages supplied, accomplishes essentially complete sulfate ion removal by ion exchange, i.e.

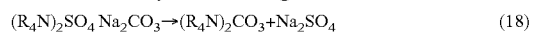

$$(R_4N)_2SO_4\,Na_2CO_3 \rightarrow (R_4N)_2CO_3+Na_2SO_4 \quad (18)$$

Where maintaining low E/A ratios in the stripper mixers enables the build up of very high sodium sulfate concentrations (e.g., 40,000 to 650,000 ppm as $SO_4^=$ where 150,000-250,000 ppm is preferred for the case of a $Na_2SO_4$ product, at 10,000-100,000 ppm, and, preferably 40,000-60,000 ppm, for the case of a $K_2SO_4$ product. Higher concentrations are possible if preparations are made to harvest the resultant slurries of crystals formed.). Complete (efficient) usage of the carbonate is achieved. Notice that the humid 1371 $CO_2(g)$ product produced above can optionally be collected from the headspace of the sulfate strippers (especially from the first stage of stripping, S1-SO4, in a multi-stage operation). This $CO_2$ gas is a weak acid with natural buffering tendency for the pH range of about 6-9 and so, if needed, can be used to bring the pH of the product water from pH>9 into this pH range (see below) before discharging it to natural streams, used in agricultural operations, used as feed to potable water plants, used in industrial operations, and the like. As will be shown below, high (>9) pH product water is produced only when >90% or the Mn, Ca and/or Mg are to be removed by the invention where pH values of the treated water can be above 9, and as high as 12.

Once harvested, the high concentration of the sodium (or potassium) sulfate product stream exits line 1384 to optional O/W separator 1387 through optional valve 1380. Valve 1380's main purpose is to prevent premature harvest (aqueous flow) to help insure full conversion of bisulfate to sulfate dianion in S1-SO4 stage. Any E-phase captured by the O/W is returned to stage S2-SO4 in the usual manner (O/W E-phase flows are not shown in FIG. 2 to minimize clutter diagram, since their role and function are well known in the art, and because they normally carry very little flow). The extractant phase return to the extractors/strippers is always to the next stage downstream of the stage where it was generated.

Exiting the O/W separator the sulfate concentrate flows to an optional solid/liquid separator 1390 via line 1389 if it is desired to remove sodium sulfate crystals, potassium sulfate, or other solids such as metal oxides and/or metal from the concentrate. Such crystals are collected in product vessel 1392. The mother liquor then can be collected as liquid concentrate in tank 1398. Alternatively, both products could be collected as slurry in tank 1398 by by-passing the solids/liquid separator 1390, thereby obviating the need for line 1394 and vessel 1392. After exiting the solid/liquid separator via line 1393, the sulfate concentrate flows through an optional trace E-phase sorbent, such as granular activated carbon (GAC) 1391 and/or other hydrophobic sorbent materials, then exits via line 1396 and is collected in tank 1398.

As the sulfate concentrate has a very high ionic strength, little if any E-phase contamination of it should occur. And then, any entrained E-phase should have been captured by the O/W separator 1387. Hence the use of (GAC) 1391 is not expected to be needed in most instances but if used, then GAC use rate is minor and is used to remove any E-phase odor from the sulfate product.

The pH<5 raffinate exits extractor circuit 1210 via line 1420. Before releasing this water, it is most preferred to pass the water through O/W separator 1460 via valve 1430 and line 1450. The O/W separator effluent 1470 can optionally be filtered and deodorized via solid/liquid separator 1480 and GAC 1495 to produce clear, colorless and odorless water in line 1496 that is used immediately or collected in a storage/surge vessel 1494. The minor amount of particulates collected 1492, normally of a rust-like character, via line 1491 are nontoxic and can be discarded.

Water Purification Using Two Extraction Operations

In certain cases, depending on the requirement targets for the purified water, it may be desirable to remove trace metal ion contaminants of the mostly divalent metal ions, for example Ni, Co, Zn, Fe(II) as well as $Mn^{(2+)}$, (the "N" series of metal ions of FIG. 1A) and/or to achieve even greater removal of sulfate ions. Additionally, it may be desired to separate these metals from those collected in the pH<5 extraction operation described above. In these cases two extraction operations, each with one or more liquid-liquid contactors, are recommended and provided. This second operation is now described with the two variants mentioned.

The first operation is as given above and results in an extractor mixer pH and raffinate pH of about 5. Adding a second extractor circuit 2030, which receives ~pH 5 water from the first contactor circuit 1210 via the combined settler and decanter aqueous overflow line 1440. The E-phase is fed to the second extraction operation from the common E-phase surge tank via line 1025 and pump 1020 and opening valve 1032. To operate cross-current, valve 1030 is open three way such than E-phase simultaneously flows to both extraction operations 1210 and 2030. Alternatively, 1030 can be closed to 1210 and open to 2030, so that now first extraction circuit 1210 receives extractant phase from second extraction circuit 2030, i.e., a counter-current arrangement.

If ferrous ion is included in the acid mine drainage water feed 1110 then it is normally present in large amounts relative to ferric ion. Hence extraction operation 2030 can again form a large amount of floc of divalent metal ions and so this contactor circuit is also of the specially designed flotation liquid-liquid extraction type of the invention, described in detail above, and is accompanied by a flotation liquid-liquid extraction decanter, also of the invention and previously described.

The operation of the second unit is as follows. Depending on the E/A ratio, number of contactors per circuit, the concentration of extractant in the extractant, and/or the number of equivalents of the above metals present, the final pH of the extraction can be about 7.5 to 9. This condition efficiently removes divalent metals which can be only partially removed by the first pH ~5 extraction. The attainment of pH 9 helps Mn removal to about 90% and this higher pH can be promoted by including some hydroxide ion on the extractant that can be provided from supply tank 1360 via pump 1350 and valve 1345 through line 1340. It is one important aspect of this invention that basicity is brought into the extraction process without the accompaniment of water soluble cations. This accomplishment is made possible by using the water insoluble cationic quaternary ammonium ion salt of basic anions. This feature enables the substantial decrease of the total dissolved solids of the product water relative to the feed water.

The pH 7.5-9 raffinate, now clear of substantial contamination can represent very desirable product water. Before releasing this water, it is optionally, but most desirable, to pass the water through O/W separator 2090 via optional valve 2070 and line 2080. (Valve 2070 is only needed when is additional extraction stages are added as described below). The O/W separator effluent 2110 can optionally be filtered and deodorized via solid/liquid separator 2120 and GAC 2125 to produce the clear, colorless and odorless product water in line 2140 that is used immediately or collected in a storage/surge vessel 2150. The minor amount of particulates collected 2130 via line 2115 are nontoxic and can be discarded. Due to the scale of some of the acid mine drainage water streams, the filters used could be sand filters, clarifiers, simple in-line filters such as plate and frame, drum or belt filters, centrifuges, and the like. The GAC is again for odor control of clear water product and so is optional and represents a small use rate.

The metal and sulfate ion loaded extractant phase can be process either of two ways according to the invention (for convenience the two options will be referred to as options AA and AB). These can be operated simultaneously, alternated with acid mine drainage feed content, economic conditions for the products produced, and so on.

In option AA, the loaded extractant is merely sent forward to the first extraction phase via line 2040 and where valve 2042 is open to flow to the pH 5 Extraction operation but closed to line 2044. In this mode, valve 1030 is optionally closed so that the entire extractant phase flow is through valve 1032 to the pH 7.5-9 Extraction operation. In this manner all the metals extracted report to the metal sulfate extractor forming a combined "M+N"-Sulfate concentrate 1292 in the identical fashion described above for the M-Sulfate product. After stripping of the metals, the sulfate is stripped in a fashion also identical to that described above previously.

Option AB differs in that it provides separation of M-sulfate and N-sulfate products using cross-flow contacting of E-phase with the acid mine drainage water and stripping the two loaded phases separately forming two concentrate products, M-SO4 and N—SO4. In this case pH 5 Extraction operation is performed exactly as described above including receiving E-phase feed via valve 1030 and producing M-SO4 product 1292. However, the N-loaded E-phase formed in 2030 is sent to a separate acid stripper 4000 via line 2044 by diverting the flow from 2030 using valve 2042. In this case a N-Sulfate concentrate is produced in a fashion identical to M-Sulfate and using equivalent process hardware, including internally recycle aqueous via line 4020 and with the stripped extractant phase flowing forward to sulfate stripping 1370 via lines 1070 and 1080. Hence the N-Sulfate concentrate, when harvested, is sent via line 4010 and valve 4030 (which again can just be an overflow weir), through an optional O/W separator 4040 to an optional solid/liquid crystallizer 4060 via line 4050 if solid product crystals are to be separated from liquid product concentration (not preferred). The solid crystals can be collected in vessel 4070 via line 4080 and the liquid concentrate in tank 4090 via line 4095. Most preferred is just to collect one product slurry into tank 4090. Deodorizing is again optional (and not normally needed or preferred), for example by GAC treatment.

Whether option AA or AB is preferred can depend upon the level of Fe(II) in the acid mine drainage water relative to Fe(III). If a high level of Fe(II) exists (this is often the case when acid mine drainage feed water is derived directly from wells or abandon coal mine shafts), then this Fe(II) will be extracted in pH 7.5-9 Extraction operation and therefore the more valuable but dilute "N" metals, i.e. Ni, Co, Zn and Mn, will be collected with the large volume of Fe(II)-sulfate concentrate produced (if air oxidation of Fe(II)→Fe(III) is prevented by limiting air access to the extractor mixers, this is easily accomplished by simple tank covers and by not sucking air into the feed lines to the mixers). Hence if there is very little Fe(III), Al and Cu present ("M" metals) then there is no motivation for operating two separate stripper circuits and collecting all the metal sulfates in one product as a "concentrate" that can be further refined into saleable products in a side and much smaller operation is preferred. Hence the acid mine drainage feed water composition determines the most preferred mode of operation.

It is noted that in the above pH 7.5-9 operation, the Mn is only about 90% removed. Hence, depending on the fate of the product water (discharge or feed to potable water production plant, etc.) it may be desirable to add a third water purification operation (see below).

Water Purification Using Three Extraction Operations

The need can arise for a third purification extraction operation in some situations where the water is to be used rather than discharged. In acid mine drainage this arises where the intended use for the purified water is for feed to a potable water production plant, and industrial operation, and the like, where hardness metal ions, still lower TDS, lower alkalinity and/or less Mn contamination levels reduction is desired.

For example, to reduce Mn levels to below secondary drinking water standards of 0.05 ppm for the case where the acid mine drainage feed water level is sufficiently high that this Mn residual level is not attained in the raffinate from the first two extraction operations 1210 and 2030 despite removing 90% of it. In this case, the pH of the water needs to be adjusted to higher pH to convert the Mn to MnCa(CO$_3$)$_2$ particulate that can be filtered out. As the acid mine drainage feed water is already far excessively contaminated in total dissolved solids, e.g. several to ten times the level permissible for drinking water. It is needed to make this pH increase adjustment without the addition or formation of additional salts in the water. The invention provides this unexpected capability as will be described below.

In addition, if the acid mine drainage feed water was initially very high in sulfate ion concentration, there may be a need to remove the sulfate ion concentration to still lower levels to enable use, rather than discharge, of the water.

Due to additional floating floc formation involving the Mn, Ca and/or the residual sulfate ion, the third extraction step is also most preferably performed as another flotation liquid-liquid extraction operation (see above for description of the first two flotation liquid-liquid extraction operations). The preferred configuration for these additional two steps is the flotation liquid-liquid extraction operation but without a decanter. Decanters are no longer needed since floc formation is substantially reduced in the subsequent contacts relative to the first two extractions. However, instead, particulates form and the low ionic strength and higher pH of the water product after a third extraction operation still higher pH results in at least a portion of the contacted fluid exiting the mixer compartment of 3020 via line 3050 and valve 3060 to be a emulsion that requires additional processing to separate (FIG. 1A and FIG. 1B). This unstable emulsion is an ionic colloidal complex between the MnCa(CO$_3$)$_2$ solid particulates and the Aliquat-SO$_4$$^=$ species. Hence a solid/liquid (S/L) and liquid/liquid separation is needed. Such separator can be a filter, a semi-continuous centrifuge, hydrocyclone or other solid/liquid (S/L) separating device. The extractant phase formulation can also be adjusted to encourage separation of these emulsion components for example by increasing modifier concentration change diluent, blend diluents, and the like.

Freshly prepared extractant phase can also produce a "milk" colored aqueous phase that is believed to arise from hydrophobic tertiary amine complexes that form from E-phase manufacturer impurities at the higher pH of the third extraction due to deprotonation of the amine. This milk does not contain significant amounts of Mn and can be discarded. The extractant can also be purified of tertiary amine impurities prior to using the extractant in the first place by acid washing, washing with copper sulfate solution, and the like. How these process features are performed is described below.

This third extraction operation is accomplished by sending the pretreated water from the second purification operation described above (using either options AA and/or AB) via valve 2070 to line 2060 to flotation liquid-liquid extraction (or conventional LLX) contactor 3020.

The pH of the third extraction is in the 8.5 to 10.5 range. This higher pH is accomplished by including hydroxide ion in the extractant regeneration operation of sulfate stripping. Most preferably, NaOH is used since it forms the far more soluble Na2SO4 product 1398, but KOH can also be used if more dilute sulfate product is acceptable. The hydroxide is fed to the sulfate stripper from tank 1360 via pump 1350 and valve 1345 through line 1340.

At the higher pH, the concentration of carbonate ion becomes significant causing the particulates of MnCO$_3$ to form; with any Ca present forming CaCO$_3$. Mg is not removed at these conditions requiring higher pH (see below). Particulate formation is desirable as it allows the removal of these Mn and Ca contaminants with a corresponding decrease in total dissolved solids since the OH— can be introduced from via the cationic E-phase. The overall reaction is,

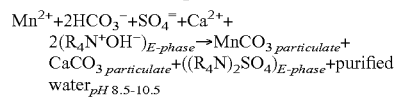

$$Mn^{2+}+2HCO_3^-+SO_4^=+Ca^{2+}+$$
$$2(R_4N^+OH^-)_{E\text{-}phase} \rightarrow MnCO_{3\,particulate}+$$
$$CaCO_{3\,particulate}+((R_4N)_2SO_4)_{E\text{-}phase}+\text{purified}$$
$$water_{pH\,8.5\text{-}10.5}$$

This product mixture forms an extractant with floc and an aqueous phase low in Mn, Ca and SO$_4$$^=$ content that exits contactor 3020 via line 3050 and valve mixture exits the O/W separator 3040 via line 3065 and enters the solid/liquid separator 3070. In the solid/liquid separator 3070, the Mn(CO)$_3$ and Ca(CO)$_3$ solids 3090 are separated from the mixture via line 3080. The extractant phase is sent via line 3075 to the second extraction operation 2030 for additional stripping and regeneration. Although most of the E-phase separates from most of the aqueous phase, the low ionic strength of the product mixture, and the high ionic character of the quat: sulfate ion cluster results in some formation of a micro emulsion milky white product water. Analysis of this micro emulsion shows it to be low in Mn and SO$_4$$^=$. The micro emulsion is believed to be caused of surface active impurities in the Aliquat 134, and these are known to wash out from the system over time, and so is a non-issue.

The extractant phase floc, a brown emulsion, contains the extracted Mn, Ca and sulfate ion. This floc is dewatered and thickened in the decanter as was done in the first two extraction operations. The E-phase floc then could be stripped of metals using acid as before, filtered, centrifuged, or other solid/liquid separation 3070 to gather the Mn and Ca in particulate form 3090 via line 3080. The extractant 3075 is then sent to sulfate stripping directly (preferred) or to the second extraction operation, or to a fourth extraction operation (see below). The stability of this emulsion could also be reduced using a weaker (particulate) or stronger ion pair solvating E-phase formulation.

The pH 8.5-10.5 raffinate exits the solid/liquid separator 3070 via line 3075 and valve 3100. The pH of the purified water can be reduced to the pH 6-9 range by sparging inline 3105 with the $CO_2$ gas 1371 via line 1372 and valve 6000. In addition, clarified raffinate 3110 can be sent to contractor 5000 for Mg removal. The pH 6-9 raffinate exits valve 3100 via line 3105 and enters GAC 3120 for deodorization. The deodorized and purified water exists GAC 3120 via line 3125 is collected in a storage vessel 3030.

Water Purification Using Four Extraction Operations

The purified water from the above-described four extraction stages is fairly pure. However, if Mg levels are significant then dissolved Mg sulfate and carbonate salts still would be present in the water. In the case of acid mine drainage this can represent hardness levels in the range of about 400-900 ppm, too high for certain end use applications. For example for the case of acid mine drainage water with 140 ppm and 1600 ppm $SO_4^=$, 130 ppm Mg and 135 ppm sulfate can still exist in the water giving rise to high total dissolved solids residuals.

Although Mg is not removed efficiently in any of the above-described flotation liquid-liquid extraction operations, it was discovered that Mg can be removed without employing conventional water softening by using a flotation liquid-liquid extraction operation 5000 at still higher pH where the hydroxide ion is again introduced by the E-phase via valve 1034. It was discovered that in a flotation liquid-liquid extraction operation, hydroxide ion can be effectively brought in with the extractant phase (added at the 1370 via 1360) where the pH is raised to 10.5-12, preferably 11-11.5. In addition, clarified raffinate 3110 can be sent to contractor 5000 for Mg removal. The process chemistry is believed to be as follows:

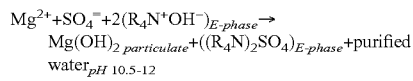

An emulsion comprised of $Mg(OH)_2$ particulates, aqueous phase, and extractant phase exits contractor 5000 via line 5010 and valve 5015 to line 5020 where the emulsion enters the optional O/W separator 5030. The emulsion exits O/W separator 5030 via line 5035 and enters the solid/liquid separator 5040. In the solid/liquid separator 5040, the $Mg(OH)_2$ solids 5060 are separated from the emulsion via line 5065. The extractant phase is sent via line 5050 to the third extraction operation 3020 for additional stripping and regeneration. The pH 10.5-12 raffinate exits the solid/liquid separator 5040 via line 5070. The pH of the purified water can be reduced to the pH 6-9 range by sparging inline 5070 via valve 5075 with the $CO_2$ gas 1371 via line 1372 and valve 6000. The pH 6-9 raffinate exits valve 5075 via line 5080 and enters GAC 5085 for deodorization. The deodorized and purified water exits GAC 5085 via line 5090 and is collected in a storage vessel 5100. The product water is very pure, now being depleted of both M and N metals, Mn, Ca and Mg, and with a $SO_4^=$ residual <20 ppm. This product water is of sufficient quality as feed for most potable, industrial, and agricultural applications.

Table 1 lists examples of the water contaminants removed simultaneously by the invention. Such contaminated water streams are often so highly contaminated that no one technology is effective, or the contacting element becomes fouled with other components of the mixture, or the water is not sufficiently purified for release or reuse and must be treated again. Such waters may contain many contaminants of concern under EPA regulations. Such waters often include sulfate ion, a severe problem, in concentrations of 150-2500 ppm and even higher.

TABLE 1

Typical water contaminants that can be removed by the invention

| Class of Contaminants | Typical Contaminant Species Removed |
|---|---|
| ANIONS | Sulfate and bisulfate, selenate, tellurate, phosphates and hydrogen phosphates, organophosphates, organophosphonates, organophosphinics, polyphosphate (esp. ATP, ADP and AMP), arsenic (especially arsenate, organo arsenates, and arsenite), chloride, bromide, iodide, and pseudohalogen ions. Nitrate, nitrite, cyanide ion, sulfide ion ($H_2S$ in equilibrium with $HS^-$, $H_2S$ and $S^=$), oxometal ionic complexes including single ion and molecular clusters and colloids of molybdates (based on $MoO_4^{2-}$), tungstates (based on $WO_4^{2-}$), vanadates (based on $VO_3^{2-}$), chromates (based on $HCrO_4^-$, $Cr_2O_7^=$, $CrO_4^{2-}$), and the like, including their protonated weak acid species, and particulate ion. |
| CATIONS | Cations capable of forming oxide or hydroxide ion colloids and precipitates ("oxohydroxo clusters or colloids") including nickel, copper, chromium(III), ferric, ferrous, aluminum, manganese, cobalt, cadmium, zinc, Pb, Hg, Cd, and the like; and many radioisotopes/radioactive contaminants such as U, Th, Pu, and the like hardness metal ions (Ca, Mg), and the like contaminants such as Tc. |
| ORGANICS | Oil-soluble organics, natural organic matter and the like. |

Below are analyzed samples of acid mine drainage from sites in Pennsylvania (Tables 2A and 2B) and Ohio (Table 2C).

The Tables show chemical analysis of a actual representative Pennsylvania acid mine drainage water samples to illustrate the extreme contamination level that is not practically treated by any other known technology. The stream in Table 2B is known to flow at about 10,000 gal/min or more year after year resulting in many thousands of tons of metals and sulfate contamination of the environment. It is unsuitable for potable water production, for industrial process water use, for agricultural use, or for providing aqua-tourism, or to support mountain stream life.

TABLE 2A

Analysis of Sugar Camp, PA Acid Mine Drainage Water

| Analysis Name | | 4841218/4841219 AMD Sample | |
|---|---|---|---|
| | | Result | MDL |
| | Units | | |
| Aluminum | mg/l | 2.73 | 0.0802 |
| Calcium | mg/l | 128 | 0.104 |
| Iron | mg/l | 204 | 0.0522 |
| Magnesium | mg/l | 135 | 0.0135 |
| Potassium | mg/l | 5.41 | 0.0503 |
| Sodium | mg/l | 2.85 | 0.433 |
| Cobalt | mg/l | 0.873 | 0.0021 |
| Manganese | mg/l | 71.5 | 0.0036 |
| Zinc | mg/l | 1.26 | 0.0081 |
| pH | | 3.2 | 0.01 |
| | Std. Units | | |
| Alkalinity to pH 8.3 | mg/l as CaCO3 | N.D. | 0.46 |
| Alkalinity to pH 4.5 | mg/l as CaCO3 | N.D. | 0.46 |
| Total Dissolved Solids | mg/l | 2050 | 38.8 |
| Sulfate | mg/l | 1620 | 60.0 |
| Specific Conductance | umhos/cm | 2440 | 1.7 |
| Acidity to pH 3.7 | mg/l as CaCO3 | 83.8 | 2.0 |
| Acidity to pH 8.3 | mg/l as CaCO3 | 413 | 2.0 |

TABLE 2B

St. Michael, PA Acid Mine Drainage Water Analysis

St. Michaels AMD Feed Water 51944-01-18

| Analysis Name | Units | Result | MDL |
|---|---|---|---|
| Aluminum | mg/l | 4.16 | 0.0802 |
| Calcium | mg/l | 158. | 0.0632 |
| Iron | mg/l | 169. | 0.0522 |
| Magnesium | mg/l | 160. | 0.0135 |
| Potassium | mg/l | 5.56 | 0.0503 |
| Sodium | mg/l | 2.50 | 0.433 |
| Cobalt | mg/l | 1.03 | 0.0021 |
| Manganese | mg/l | 77.5 | 0.0042 |
| Zinc | mg/l | 1.69 | 0.0081 |
| pH | | 2.9 | 0.010 |
| | Std. Units | | |
| Alkalinity to pH 8.3 | mg/l as CaCO3 | N.D. | 0.46 |
| Alkalinity to pH 4.5 | mg/l as CaCO3 | N.D. | 0.46 |
| Total Dissolved Solids | mg/l | 2,310. | 38.8 |
| Sulfate | mg/l | 1,760. | 60.0 |
| Specific Conductance | umhos/cm | 2,720. | 1.7 |
| Acidity to pH 3.7 | mg/l as CaCO3 | N.D. | 10.0 |
| Acidity to pH 8.3 | mg/l as CaCO3 | 481. | 10.0 |

TABLE 2C

Rush Creek, OH High Al Acid Mine Drainage Water Analysis

High Aluminum AMD Feed Water 51944-24-06

| Analysis Name | Units | Result | MDL |
|---|---|---|---|
| Aluminum | mg/l | 133. | 0.0802 |
| Calcium | mg/l | 398. | 0.0632 |
| Iron | mg/l | 1,130. | 0.261 |
| Magnesium | mg/l | 151. | 0.0135 |
| Potassium | mg/l | 37.1 | 0.0503 |
| Sodium | mg/l | 23.2 | 0.433 |
| Cobalt | mg/l | 0.0758 | 0.0021 |
| Manganese | mg/l | 28.7 | 0.0042 |
| Zinc | mg/l | 0.970 | 0.0081 |
| pH | | 3.0 | 0.010 |
| | Std. Units | | |
| Alkalinity to pH 8.3 | mg/l as CaCO3 | N.D. | 0.46 |
| Alkalinity to pH 4.5 | mg/l as CaCO3 | N.D. | 0.46 |
| Total Dissolved Solids | mg/l | 7,350. | 77.6 |
| Sulfate | mg/l | 5,200. | 150. |
| Specific Conductance | umhos/cm | 5,560. | 1.7 |
| Acidity to pH 3.7 | mg/l as CaCO3 | N.D. | 20.0 |
| Acidity to pH 8.3 | mg/l as CaCO3 | 2,290. | 20.0 |

N.D. = not detected

The invention is preferably used to treat the above mentioned waters and the like before and/or instead of conventional waste water treatment to obtain the maximum beneficial impact by Preventing the contamination of the environment and/or Pre-treating contaminated waters before these waters are treated in a manner that generates large solid and/or liquid wastes thereby reducing the total amount of solid and/or liquid waste produced.

This invention is particularly useful because it provides a broad spectrum water purification capability for a wide range of water flow rates, preferably flow rates of less than 1 to more than 10,000 gal/min.

Such extractant/co-extractant system is used alone or in combination with one or more modifiers to improve extractant solubility in the diluent, and/or with one or more water-immiscible diluents. Specific examples are given in Table 3.

Suitable modifiers are water-immiscible terminal aliphatic alcohols or mixtures thereof. Preferred diluents are alcohols that are classified nonflammable (flash point>140° F.), nonhalogenated, low-odor, aliphatic, either linear or branched, with a carbon number of 8-16, most preferably 9-13, or mixtures thereof. Specific examples are given in Table 3.

Suitable diluents can be water-immiscible aliphatic, aromatic solvents or blends of such solvents. Most preferred are solvents that are classified nonflammable (flash point>140° F.), nonhalogenated, low-odor aliphatic, aromatic, or a blend of aliphatic and aromatic solvents. The aliphatic diluent(s) can be linear but are preferably branched. The aromatic diluent(s) can be unsubstituted aromatic liquids but are preferably aliphatically-substituted aromatic liquid compounds. Extractant mixtures suitable for the invention contain at least 25% diluent (v/v), preferably 60% (v/v), and most preferably 85% (v/v). Specific examples of suitable diluents are shown in Table 3.

For a further embodiment of the invention suitable reagents for stripping of metal ions, regeneration, solute concentration, and/or pH adjustment include mineral acids that do not cause decomposition of the extractant. Suitable strip acids are preferably selected from hydrochloric, sulfuric, phosphoric, blends of these and the like. Acid strength is 2-50% in the feed solution and the S2M mixture is preferably maintained at ~pH 1-2 or less. S1 mixer pH is preferably maintained at pH 2-4, or less. Sulfate ions are subsequently stripped by basic reagents that do not cause decomposition of the extractant preferably selected from alkali and alkali metal hydroxides, and/or alkali carbonates. Base strength for sulfate ion stripping is preferably ~pH 10-11 or greater. Specific examples of suitable of reagents for stripping and regenerating, and pH adjustment of the extractant are listed elsewhere herein.

TABLE 3

Typical Compounds Useful for the Extractant Phase

| Extractant Formulation Component | Chemical Class (used alone or in combination with any other extractant) | Specific Compounds | Level of Preference |
|---|---|---|---|
| Extractant | Quaternary Amines | N-methyl tri-(n-octyl)ammonium ion | Most preferred |
| | | N-methyl tri-(n-decyl)ammonium ion | Most preferred |
| | | N-methyl tri-(n-dodecyl)ammonium ion | Most preferred |
| | | Aliquat ® 134 | Most preferred |
| | | Aliquat ® 336 | Most preferred |
| | | Tri-octyl methylammonium ions | Most preferred |
| | | Mixture of tridecyl- and trioctyl-methylammonium ions | Most preferred |

TABLE 3-continued

Typical Compounds Useful for the Extractant Phase

| Extractant Formulation Component | Chemical Class (used alone or in combination with any other extractant) | Specific Compounds | Level of Preference |
|---|---|---|---|
| | | HOE S 2706 | Most preferred |
| | | Adogen ® 464 | Most preferred |
| | | Tri($C_8$-$C_{10}$) methylammonium ions | Most preferred |
| | | $R^1R^2R^3N^+CH_3$  $R^1=R^2=R^3=CH_3(CH_2)_9$— | Most preferred |
| | | $R^1=R^2=R^3=CH_3(CH_2)_7$— | Most preferred |
| | | and | Most preferred |
| | | $R^1=R^2=R^3=CH_3(CH_2)_9$— | |
| | | Blends of the above quaternary ammonium ions in any proportion | Most preferred |
| | Mono guanadinium | e.g. LIX-79 ® | Most preferred |
| | Quaternary phosphonium | N-methyl tri(n-octyl) phosphonium | Functional |
| Modifier | b-isodecanol (or decyl alcohol, or Exxal ® 10) | | Most preferred |
| | Isotridecanol (or b-Tridecyl alcohol | | Most preferred |
| | Nonyl phenol | aromatic | Functional |
| | Dodecyl phenol | aromatic | Functional |
| Diluent | Aromatic ® 150 | | Functional |
| | Aromatic ® 200 | | Functional |
| | Calumet ® 400-500 | | Most Preferred |
| | Conoco ® 170 | | Preferred |
| | Isopar ® M | | Preferred |

Referring to Table 3, effective "Type extractant phase" extract compounds of the invention. All of the components of the E-phase are oil soluble with a total carbon number of at least eight (8), can be charged or neutral, and can have additional functional groups such a halogens, ether linkages, ester linkages, alkyl phenolic, and the like, so long as the extraction chemistry and the oil solubility of the reagent is not adversely effected relative to the descriptions herein.

Effective extractant compounds of the invention are all oil soluble with a total carbon number of at least eight (8), but preferably about 16, and most preferably about 25 or more, and can have additional functional groups such a halogens, ether linkages, ester linkages, aromatic groups, be linear or branched, blends of these, and the like, so long as the extraction chemistry and the oil solubility of the reagent is not adversely effected.

Referring now to FIG. 1A and FIG. 1B, a general overview of the process is shown. The figure shows extractant phase continuous recycle and operation at pH up to about 11.0-12.0 (Mn and Mg recovery). Thus contaminated water (e.g. acid mine drainage) is treated with extractant phase and within a short time water, together with solid products, is moved to a solid/liquid separation apparatus where metal oxide/hydroxide carbonate products {e.g. $MnCO_3(Ca\ CO_3)$, $Mg(OH)_2$} are removed. The water then flows to an oil/water separator that provides a purified water product. Other contaminants are removed with LLX extraction in a loaded extractant phase that produces a floc. In addition to LLX extraction, product recovery and extractant phase regeneration, stripping is used to remove other metal oxide/hydroxide/carbonate products (e.g. $Fe^{II}$, $Fe^{III}$, Al, Al Ni, Co, and Zn) that were separated in the additional floc using $H_2SO_4$ and $(Na/K)_2CO_3$, typically enables these metal sulfate products to be recovered.

Alternate liquid-liquid contacting apparatus can be provided as mixer-settler, columns, in-line mixers, contacting centrifuges, and the like.

Figure 3:
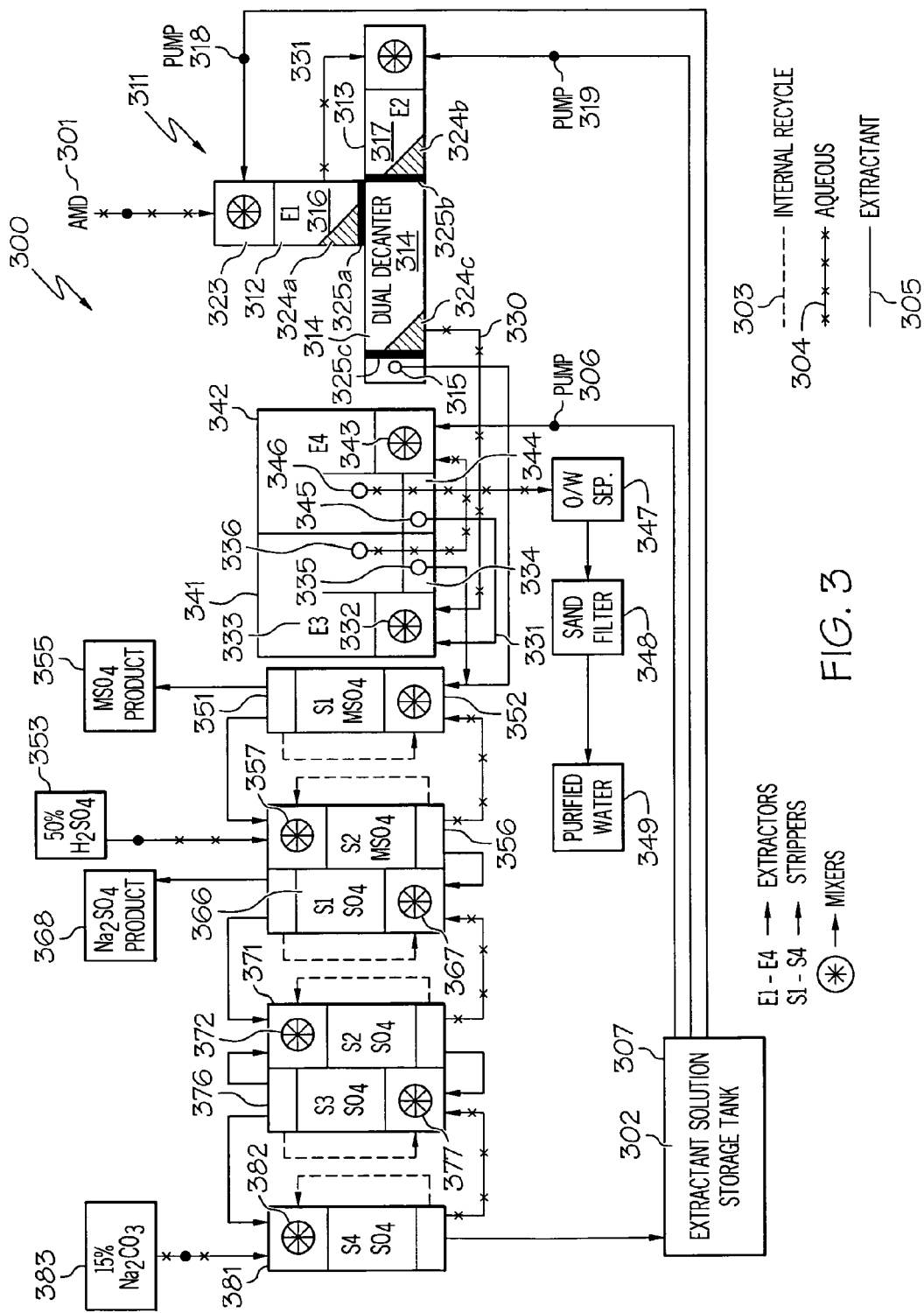
FIG. 3 is schematic diagram showing one typical LLX process flow diagram of the invention illustrating a most preferred apparatus and process for treatment of acid mine drainage.

Referring now to FIG. 3, one embodiment comprises four (4) extraction stages for metal cation and sulfate anion co-extraction, two (2) or four (4) acid stripping stages for metal stripping (depending on whether metals are to be separated during production of metal concentrates), and four (4) stripping stages for sulfate stripping and extractant regeneration. The overall process flow diagram using a combination of conventional and uniquely designed mixer-settlers is shown in FIG. 3.

The flow configuration of the device of FIG. 3 enabled the steady flow of heavy floc that was produced in E1 settler 316 to flow to the S1-M 351 (shown as S1-$MSO_4$) stripper, where the floc is converted back to a two phase liquid form manageable by conventional LLX hardware. The floc flow in E1 312, E2 313, and the associated decanter 314 is accomplished by the "T" shaped configuration along with the floc flow handling weirs contained in the settlers and at the overflow point. These weirs are described elsewhere in this application. Note that with the "T" design, the E-phase overflow from E2 settler 317, representing 325b, the more flowable floc shears off the heavy floc exiting from E1 settler 316, and hence insures that the floc from E1 settler 316 flows steadily. The E-phase flow rates to E1 and E2 are adjustable and are used to optimize floc flow continuity, extraction yield, and reagent consumption minimization.

Also FIG. 3 illustrates the wraparound (space saving) means to increase the residence time in the settlers of E3 341 and E4 342. Enhanced residence time in these settlers is desirable as the total dissolved solids level in the purified water decreases and becomes slower to phase separate. As before, all of the strippers of the "T" configuration of FIG. 3 are preferably operated counter-current with most preferred internal recycle of aqueous. Note that the extractors were operated cross-current with respect to the E-phase flow, and where the E3 341 and E4 342 stages are operated counter-current. Each loaded E-phase could have been stripped separately, but they are shown recombined in FIG. 3. Keeping these three loaded E-phases separate during stripping would allow production of three separate metal ion products (see Detailed Description of the Invention).

Referring again to FIG. 3, the disclosed process uses a floc liquid-liquid extraction system to extract metal ions and sulfate ions. This typically is useful for cleaning up a contaminated and environmentally harmful acid mine water discharge stream. Due to the unique nature of the acid mine drainage stream and the floc-based process chemistry, the extraction system apparatus has design requirements that differ from conventional liquid-liquid mixer-settler systems.

Conventional mixer-settler based LLX systems have the advantage of self-regulating and low maintenance and labor cost. However, the conventional mixer-settler system performs poorly when dealing with metal oxide colloids and/or floc, and would easily completely fail in minutes with the acid mine drainage feed water discussed here. A driving force for one aspect of the present invention is to change the conventional LLX contactor design to create a new way of dealing with the metal oxides/hydroxide colloids, flocs, particulates or slurry while retaining the advantages of conventional mixer-settler systems. This new design handles flocs along with liquid-liquid processing, or flotation liquid-liquid extraction.

Referring again to FIG. 3 that illustrates one embodiment according to the invention as applied to acid mine drainage water cleanup using the simultaneous extraction process of the invention in a specially designed apparatus 300. This apparatus 300 typically has a acid mine drainage (AMD) water inlet 301 and various interconnections for liquid flow referred to as internal recycle lines 303, aqueous lines 304, and extractant lines 305. The water 301 flows into a T shaped extraction decanter apparatus 311 made up of a first extractor E1 312, a second extractor E2 313, and a dual decanter 314. The extractor E1 312 has a mixer 323 which receives the incoming water 301 via an aqueous line. Here the water 301 is mixed with extractant solution 302 (the extractant solution is loaded with an anionic base—in this case sodium carbonate) from the extractant solution storage tank 307 via an extractant line and pump 318. The mixture flows into the settler section 316 of extractor E1 312 where the extractant 302 and water 301 interact to form a floc. The floc is allowed to separate typically by being allowed to float to the surface, a flow guide 324a helps the floc to flow over a floc weir 325a. The floc containing extractant, some water and captured ions flows over the floc weir 325a into the dual decanter 314. The aqueous portion of the material left behind in E1 settler 316 flows via an aqueous line to the mixer 331 of extractor E2 313. Additional extractant solution 302 from tank 307 flows via an extractant line and pump 319 to mixer 331 where the water from E1 settler 316 is mixed with the additional extractant solution 302 which then flows into the settler section 317 of extractor E2 313. After also being allowed to form a floc and separate from most of the aqueous the floc is guided by flow guide 324b over the floc weir 325b and into the dual decanter 314. The flocs from E1 settler 316 and E2 settler 317 typically mix and are allowed to separate from entrained aqueous. The newly formed and/or reformed floc in the dual decanter 314 is guided by a flow guide 324c to flow over the floc weir 325c into a collector where the floc flows to the first stripper S1-MS04 351.

Aqueous depleted in ions in dual decanter 314 is typically withdrawn from the bottom and flows via aqueous line 330 to extractor E3 341 where it enters at mixer 332, here extractant from an extractant line 331 from extractor E4 342 also enters the mixer 332. After mixing the aqueous and extractant phases, the mixture enters the settler 333 of extractor E3 341. The mixture is allowed to separate into an aqueous phase and an extractant phase. The extractant phase is withdrawn by an overflow weir into a collector 334 having an outlet 335 and then flows via an extractant line into the mixer 352 of S1-MSO4 stripper 351. Aqueous flows to outlet 336 and via an aqueous line to the mixer 343 of extractor E4 342. In addition extractant solution 302 is pumped via pump 306 to mixer 343. After mixing with aqueous from outlet 336 of extractor E3, the mixture flows through the settler 345 of the extractor E4 342. The mixture is allowed to separate into an aqueous phase and an extractant phase. The extractant phase is withdrawn by an overflow weir into a collector 344 having an outlet 345 and then flows via an extractant line into the mixer 332 of extractor E3 341. Aqueous leaves extractor E4 342 via outlet 346 to an oil water separator 347 and then to a sand filter 348 to obtain purified water 349.

Sulfate is stripped from the extractant in strippers 366, 371, 376, 381. Strippers 351 and 356 serve to remove metal ions with a charge of about +3 as metal sulfate product 355. Extractant, floc and entrained aqueous also flow to the mixer 352 of stripper 351 from the outlet 315 of dual decanter 314. Inflow of extractant to mixer 352 mixes with aqueous inflow from stripper 356 and the mixture in stripper 351 is separated into an aqueous MSO4 product 355 and an extractant that flows to a mixer 357 in stripper 356. Note that all the strippers have internal recycle lines 303 for aqueous recycle flow. The incoming extractant from stripper 351 is mixed in mixer 357 with sulfuric acid 353 (in this example about 50%) to make the mixture have a very low pH so that the metal is stripped from the extractant and driven into the aqueous phase. Extractant leaves stripper 356 and flows via an extractant line 305 to mixer 367 of sulfate stripper 366. In mixer 367 aqueous flow from stripper 371 mixes with the incoming extractant from stripper 356. Sodium sulfate 368 that is a very useful product flows from the outlet of stripper 366. An extractant line 305 from stripper 366 provides for flow of extractant to the mixer 372 of stripper 371. Aqueous from stripper 376 flows to the mixer 372 and is mixed with the incoming extractant from stripper 366. Extractant further stripped of sulfates exits stripper 371 and flows to the mixer 377 of stripper 376, here it is mixed with incoming aqueous from stripper 381. Extractant further stripped of sulfates exits stripper 376 and flows to the mixer 382 of stripper 381, here it is mixed with incoming carbonate 383 and the like. The extractant essentially stripped of metals and sulfates flows from stripper 381 to an extraction solution storage tank 303.

Figure 4:
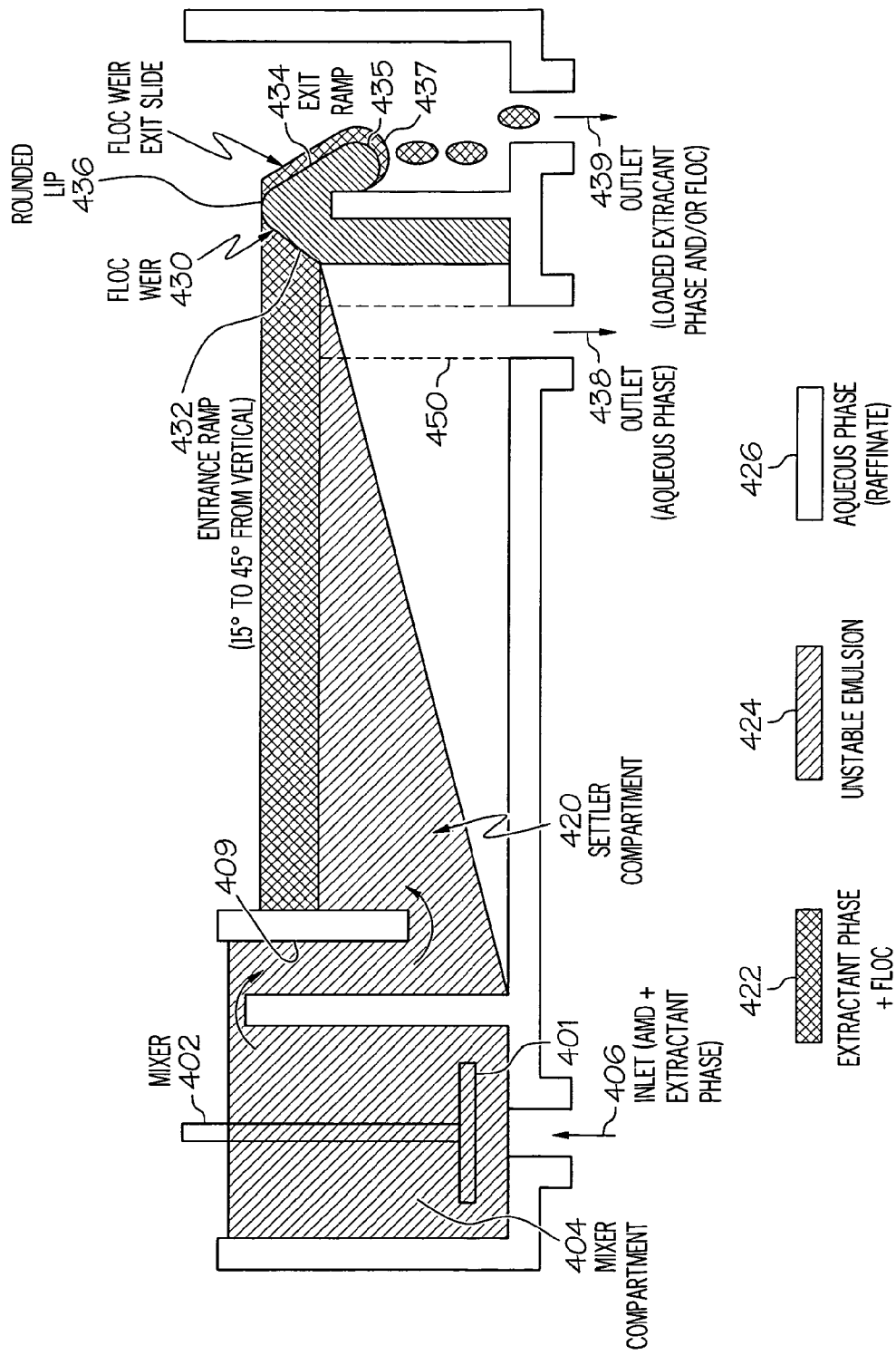
FIG. 4 is a schematic illustrating various aspects of a typical flotation weir device according to one aspect of the invention.

Referring now to FIG. 4, the present invention provides some designed features that are specific to assist flowing and maintaining the flow of the metal oxide/hydroxide colloids, flocs and particulate slurries. The detailed schematic of FIG. 4 shows certain elements of the designed flotation device to assist in maintaining the flow of extractant phase over the settler overflow weir while not interfering with aqueous phase clarification. The flotation device flow pattern is also illustrated to visualize the movement of the metal ion colloids, flocs and/or particulate slurry.

The apparatus shown in FIG. 4 represents a typical mixer-settler configuration. The apparatus has a mixer compartment 404 that has a rotating mixer impeller 402 which creates a suction that pulls the AMD water and extractant phase 406 into the mixer compartment 404 where it mixes the AMD water and extractant phase 406 thoroughly. The mixing forces the newly formed aqueous-extractant phase emulsion 424 over the top of the mixer compartment 404 and under the underflow weir 409 into the settler compartment 420. Here the mixed phase emulsion 424 is allowed sufficient time to break and split into 2 separate phases. The upper layer of the settler compartment 420 contains the extractant phase with floc and ions 422. The lower layer contains the aqueous phase 426 that has been treated and depleted of ions. The bottom of the settler compartment 420 contains an outlet 438 for the aqueous phase.

At the end of the settler compartment 420, there is a floc weir 430 that facilitates the extractant-floc phase movement.

This weir contains a floc or slurry entrance surface positioned at typically about 30° from the vertical angle. The smooth entrance ramp 432 and exit ramp 434 provide the least resistance for the extractant phase-floc phase to move over the surface of the floc weir 430. And what is more, this angle of floc approach and exit, combined with the length of the ramps to use the inherent internal colligative property of the floc, which is gel-like in consistency, to enable the exiting floc to literally pull the entering floc over the smooth weir. In this manner, floc flow is maintained continuous or semi-continuous. Literally, the weight of the falling floc film and associated extractant phase pulls the entering extractant-floc phase layer to and over the weir. The stronger the internal colligative strength the shorter the ramp can be for a given fluid viscosity. Both an entrance angle and an exit angle are important design parameters as shown in the figure. Typically both of the angles can be the same or different and can be from about 10° to about 80°, more preferably from about 15° to about 45°. At the right hand side of the figure, the rounded lip 436 of the floc weir 430 enables efficient flow over the weir while the rounded bottom 435 of the floc weir 430 enables reliable gravity-driven break-off of the exiting floc containing extractant phase liquid film that creates a flow pattern that allows the overflowing extractant phase to be dripped into the extractant solution where it exits the device via the extractant trough or launderer to the next stage. Since the controls are typically performed via gravitational force, the drip point 437 is at the lowest point of the floc weir exit slide and the metal ion colloid thickened phase will not linger or attach to the sides of the weir or the tank.

An optional standpipe 450 that may be adjustable in height may be used to control the outflow of aqueous. The standpipe 450 may be internal to the settler compartment 420 as shown in FIG. 4 may be external as is known in the art (not shown).

Figure 5:
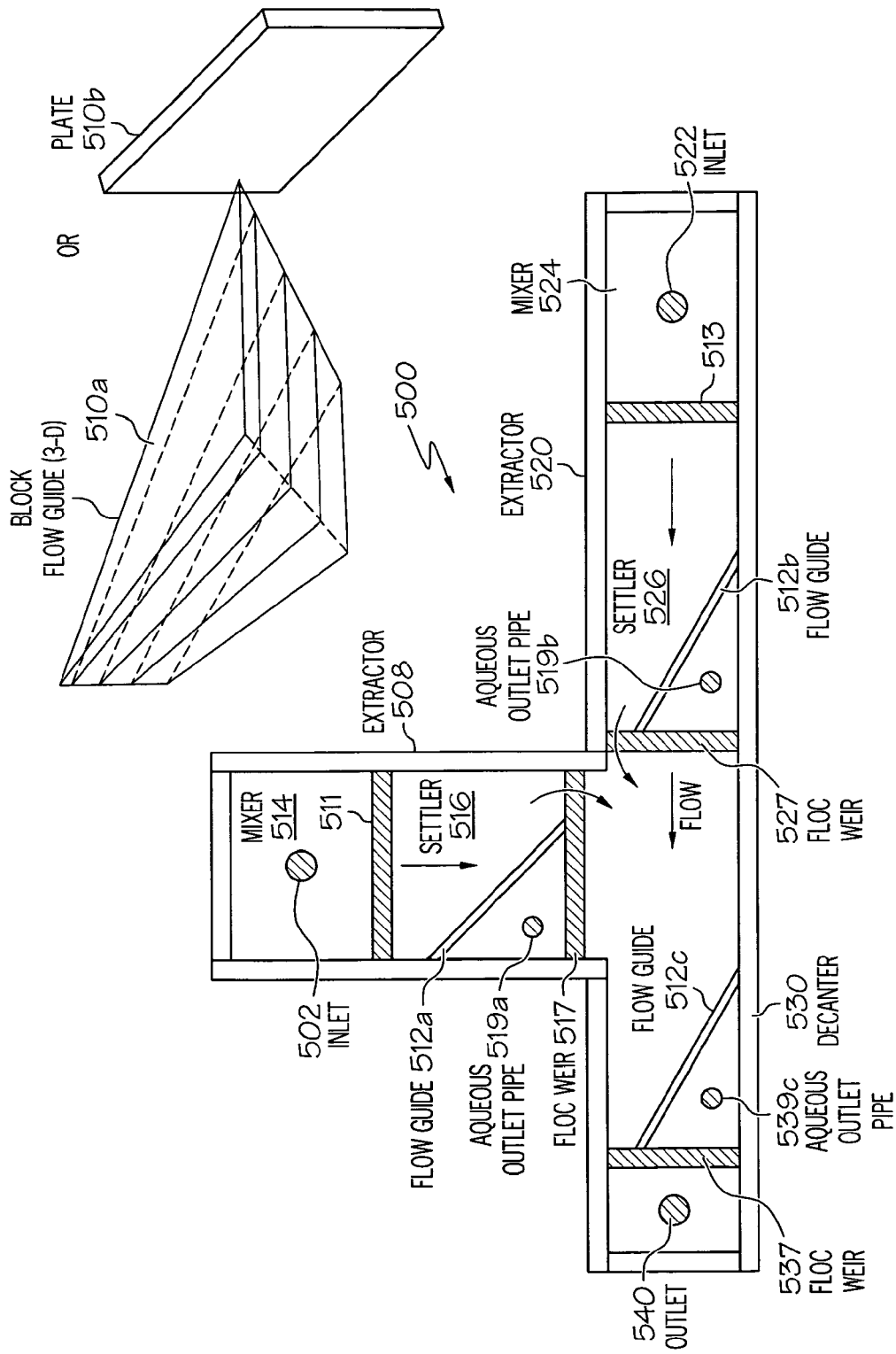
FIG. 5 is a schematic of a flow guide that guides and facilitates the flow of floc and extractant over a weir including details of its use in the invention.

Referring now to FIG. 5, a further component of the invention is a extractant phase floc flow guide for the settler and/or decanter. The upper right hand corner of the drawing shows a 3-dimensional view of a block shaped flow guide that is also adjustable, it may be made of different layers of flat stock fixed on top of each other for thickness tunability of the block to allow optional flow control for different types and thicknesses of floc or may be a solid block. The device is hereinafter called a flow guide. The flow guide may be in the form of a block shaped flow guide 510a or as a plate shaped flow guide 510b. For further discussion below, the designation flow guides 512a, 512b, 512c will be used.

FIG. 5 also shows an expanded version of the extractor decanter system from FIG. 3 but the larger scale showing more detail. The view is from the top and shows the flow guides installed into the "T" designed mixer-settler described above (FIG. 3). When acid mine drainage water enters inlet 502 of mixer 514 in extractor 508 it is mixed with extractant solution and flows over or through a weir 511 to a settler 516. The flow guide 512a aids in maintaining the flow of extractant phase-floc (typically metal ion, hydroxide, sulfide containing) as it thickens during its travel along the settler 516 and over a floc weir 517 where the floc exits the settler 516 and flows into a decanter 530. Aqueous and extractant entering the inlet of mixer 524 of extractor 520 is mixed and flows over or through a weir 513 into a settler 526. The flow guide 512b aids in maintaining the flow of extractant phase-floc (typically metal ion, hydroxide, sulfide containing) as it thickens during its travel along the settler 526 and over a floc weir 527 where the floc exits the settler 526 and flows into a decanter 530. The inflowing floc from floc weir 517 and floc weir 527 combine in decanter 530 further separating into an extractant phase containing floc and aqueous phase. The flow guide 512c aids in guiding and maintaining the flow of the relatively thick floc over the floc weir 537 to outlet 540. The aqueous outlet pipes 519a, 519b, and 519c provide individual control of aqueous phase level and floc thickness in settler 516, settler 526 and decanter 530 typically by adjustment of the height of the respective pipe. The flow guides 512a, 513b, 513c are placed to have an underflow channel not visible in this top view, see FIG. 5A for a side view. Thus the aqueous phase flows under the flow guides that simultaneously block the flow of extractant phase and floc to the aqueous outlet pipes 519a, 519b, 519c. The arrows show typical liquid flow directions.

FIG. 5 shows the geometry of the flow guides and where the flow guide is located in the settler or decanter. The flow guide is designed to narrow the settler liquid flow channel most preferably only near the top surface of the settler so that it only increases the velocity in the floc-loaded extractant phase and thus help in moving and for thickening the metal oxide colloids that are the floc and are located above the water phase. The flow guide combines with the flotation overflow weir device described above, to dramatically increase the flow of metal colloids floc particulates extractant phase into the next mixing chamber. The flow guide, which can also be constructed as just as an internal wall or partition that is raised at the bottom to allow the aqueous phase to under-flow it to allow continuous removal of aqueous layer via a suitable weir sump or stand pipe. Alternatively the flow guide can be substituted with a thin plate of material as shown.

FIG. 5A shows a side view of the mixer 524 and settler 526 of FIG. 5. It shows the geometry and location of the flow guide 512b in settler 526. The extractant phase and AMD water 522a are pulled into the mixing compartment 524 by the suction of the rotating mixer impeller 524. In the mixer compartment 524, the AMD water and extractant phase 522a mix thoroughly. The mixing forces the newly formed aqueous-extractant phase emulsion 527a over the top of the mixer compartment 524 (in some embodiments the flow is under a weir 513) into the settler 526. In the settler 526, there is a flow guide 512b which moves the extractant phase and floc 525 along to the next mixing chamber. The figure shows the flow guide 512b constructed as an internal wall partition that is raised at the bottom to allow space 512b3 for the aqueous phase 522c to underflow the flow guide 512b to allow continuous removal of aqueous phase 522c via a stand pipe 519. Floc 522b flows out under the floc weir 527

Figure 5B:
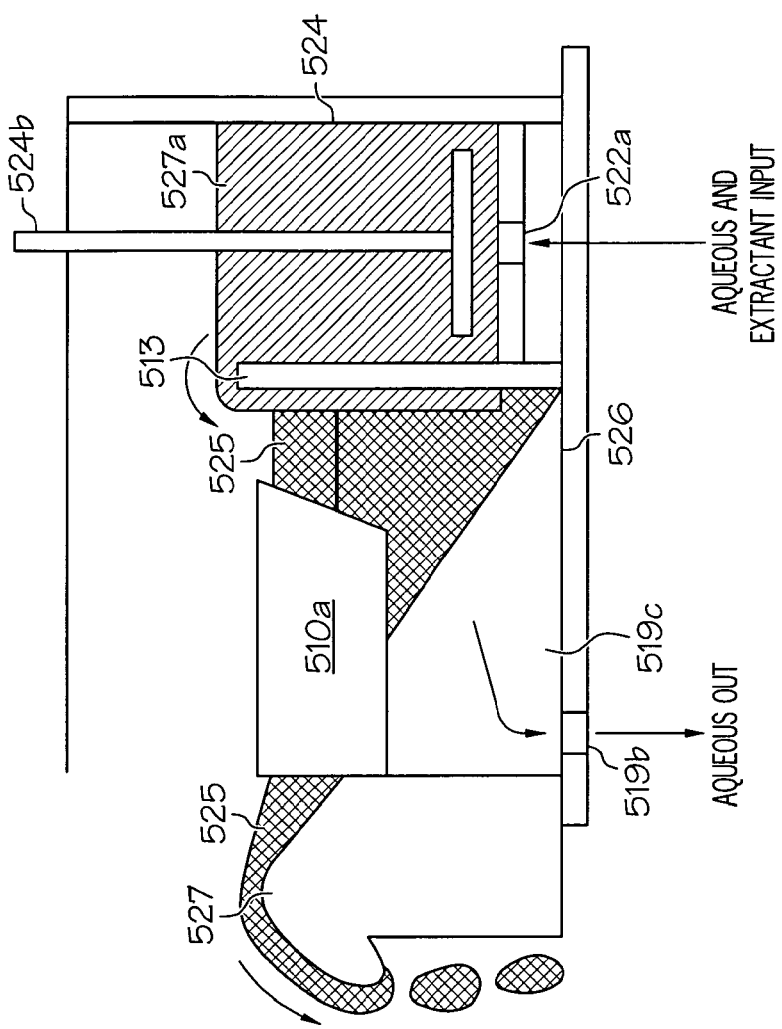
FIG. 5B is a schematic drawing showing a side cutaway view of Settler 526 with a block for a flow guide.

FIG. 5B shows an alternative version of FIG. 5A using a block 510a as a flow guide. In this embodiment, the flow guide 512b consists of an upper channel narrowing block located in the settler 526. The block shaped flow guide 512b is adjustable and it may be made of different layers of flat stock fixed on top of each other for thickness tunability of the block 510a to allow optional flow control for different types and thicknesses of floc or may be a solid block. In this figure, there is an opening 519b at the bottom of settler 526 which allows for the removal of aqueous phase 519c. Floc 522b flows over the floc weir 527.

Figure 17:
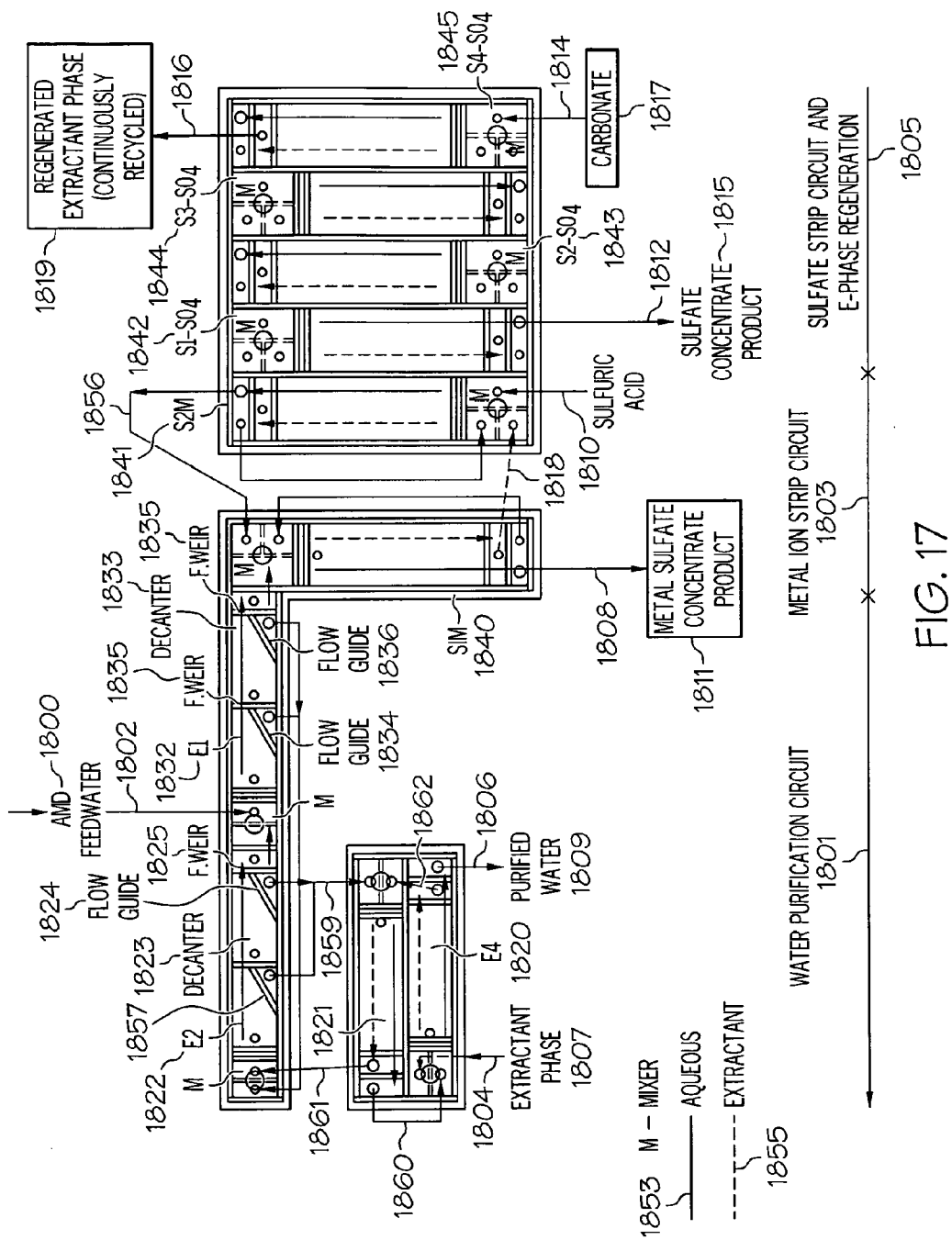
FIG. 17 is a schematic drawing illustrating a presently preferred configuration.

FIG. 5C shows the flow configuration of the E1 mixer compartment of FIG. 17. The extractant phase and floc 541 from E2 decanter flow over the floc weir 540 into the extractant trough or launderer 542. The extractant phase and floc 541 are pulled into the mixing compartment 544 along with the incoming AMD water 543 by the suction of the rotating mixer impeller 545. In the mixer compartment 544, the AMD water 543 and extractant phase 541 mix thoroughly. The mixing forces the newly formed aqueous-extractant phase emulsion 547 over the top of the mixer compartment 544 and under the underflow weir into the E1 settler compartment 546.

Gravity Benefits

Depending on the geographical location of the process unit, the water treatment process according to the invention could be arranged in series to take advantage of the slope of a hill and make the gravitational flow more efficient by providing steeper descents and deeper extractant phase liquid thickener at over-flow weirs without the need to construct such gradients.

Stage-to-Stage Loaded Extractant Phase Transfer Designs

When the unit extraction contactors configurations are in series, there is an advantage to introduce the extractant solution without passing the floc through piping to the mixer from the bottom. Though both floc-loaded modes work, most preferred is to avoid sending the floc through smaller I.D. piping to accomplish stage to stage transfers. This feature avoids having the thickened extractant phase slurry or floc flow through piping and thereby run the risk of pipe or drain pluggage. However, when the extract material is introduced into a mixer (e.g. S1-M from E1D) from the top, prevention of extractant flowing over into the stripper settler without proper mixing is critical to prevent short circuiting of the extractant phase flow. Sufficient mixing time of the floc in the strip mixer is required to allow enough time and access to aqueous strip acid to dissolve the colloid/floc back into a conventional metal ion sulfate solution. Only enough time is needed to break the flocs affiliation with E-phase as continued hydrolysis reactions can continue in the internally recycled aqueous phase. This short circuiting is prevented by the trough or hopper feeding of the floc feed into the manifold beneath the mixer which feeds flocks, slurries, and fluids to the mixing compartment by suction from the impeller. These designs that are discussed below are readily implemented and do not require complex parts.

Figure 6:
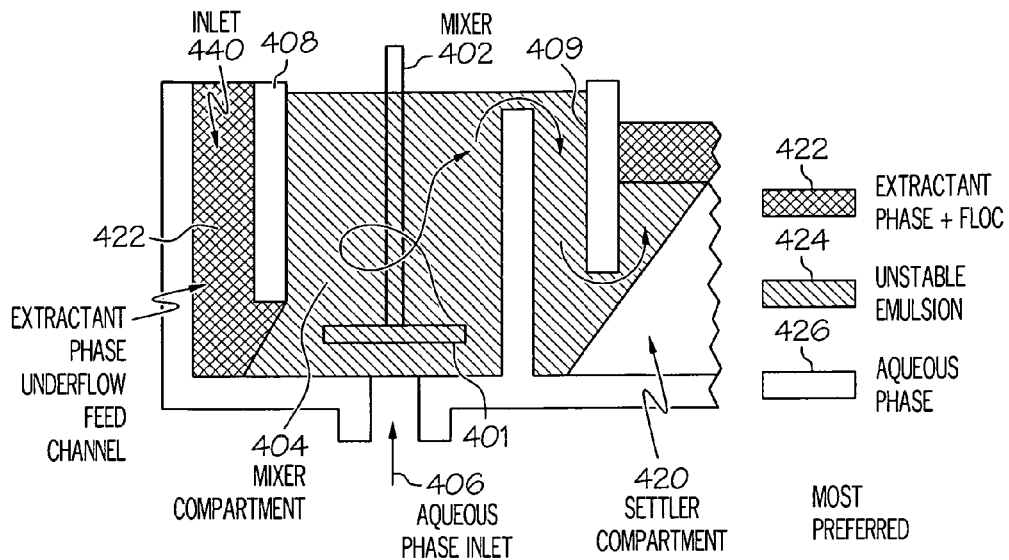
FIG. 6 is a schematic illustrating a typical underflow weir for extractant introduction.

Referring now to FIG. 6, the most preferred design for stage-to-stage floc transfer is to utilize an underflow weir 409 similar to the one that is separating the mixer compartment 404 and settler compartment 420. FIG. 6 shows the underflow inlet weir 408 position for introducing extractant floc solution 422 from the top of the mixer compartment 404 and without piping. The rotating mixer impeller 402, while in action, creates a suction that pulls freshly added floc-loaded E-phase 422 to the mixer 402, where it mixes the extractant solution 422 and inlet aqueous phase 426 thoroughly while the underflow weir 409 prevent premature exit of the extractant 422 across the top of the mixer compartment 404 without first being thoroughly mixed with the inlet aqueous phase 426.

Figure 7:
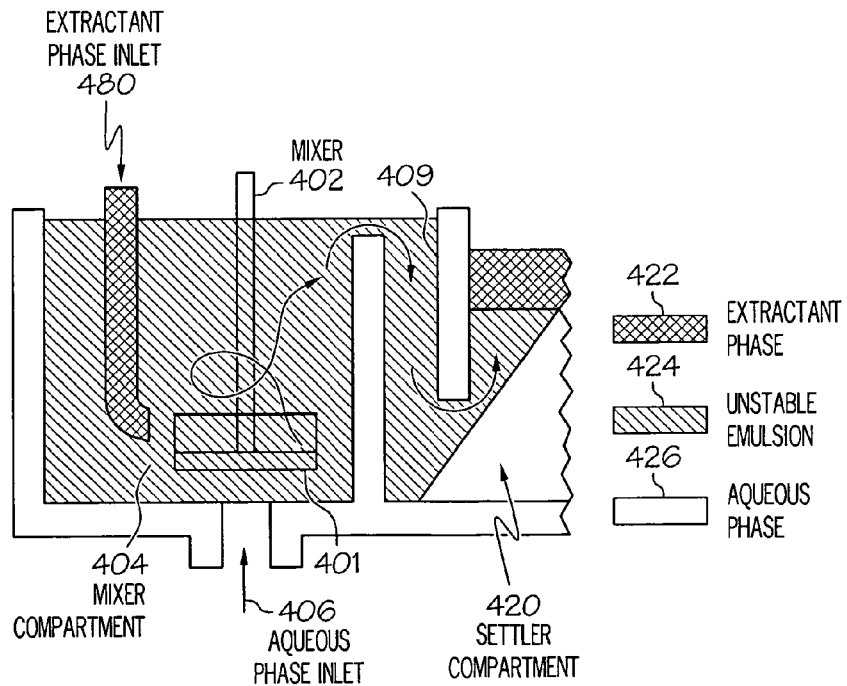
FIG. 7 is a schematic illustrating a typical design having extractant solution introduction by tubing that is inside the mixing chamber.

Referring now to FIG. 7, another design, according to another aspect of the invention, is to place an extractant solution introduction inlet 480 located inside the mixer compartment 404. The inlet 480 achieves a similar effect as the underflow weir 409 by insuring thorough extractant solution 422 and aqueous phase 426 mixing and reactor residence time. In addition, the bend elbow design on the bottom of the extractant phase inlet line 480 (piping or tube) prevents feed water 426 back-flowing into the tube which can avoid problems due to solids formation and potential pluggage. The rotating mixer impeller 402 is most preferably designed to create a suction that brings the extractant solution 422 to the bottom of the mixing compartment 404 and thereby promotes thorough mixing with feed water 426.

Figure 8:
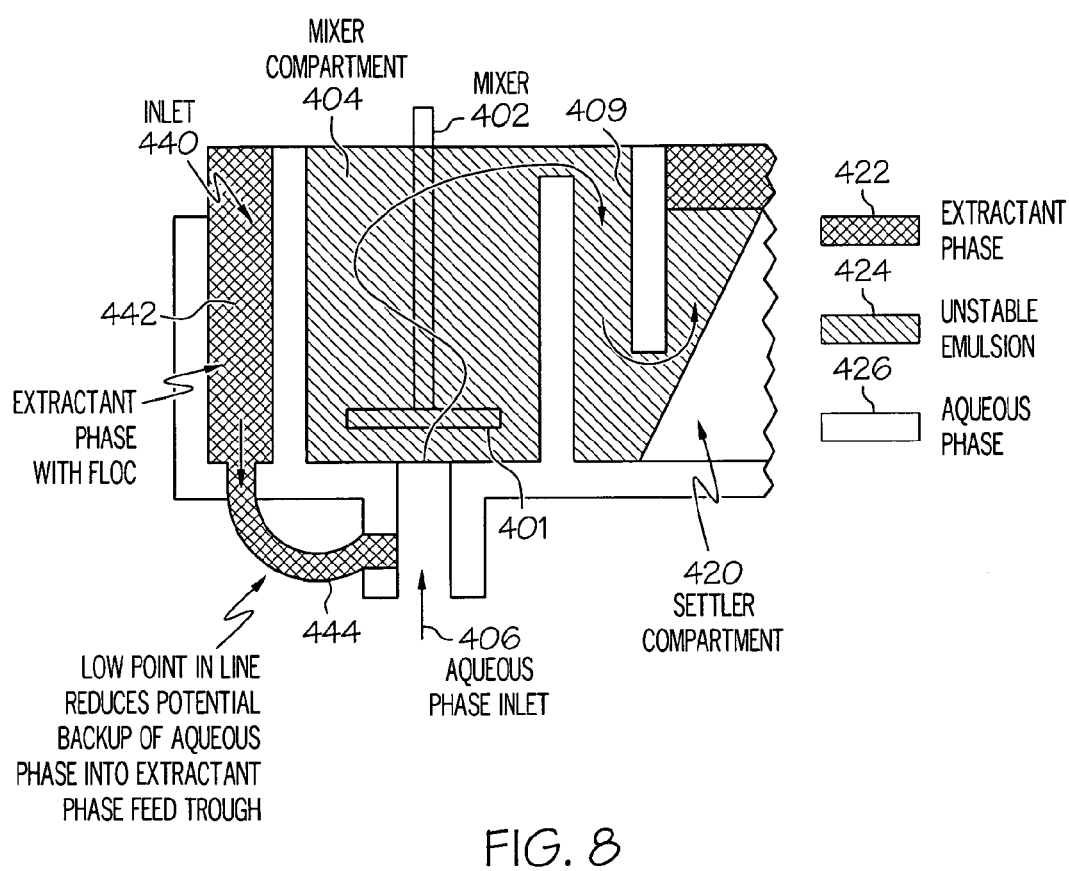
FIG. 8 is a schematic drawing illustrating a typical design for an extractant storage chamber and the path of introducing extractant into the mixing.

Referring now to FIG. 8, another preferred design useful to enable processing of extractant phase flocs and slurries when introducing extractant solution with minimum piping is to include a storage chamber 442 before the mixing compartment 404 and to introduce the extractant solution 422 from the bottom of the mixing compartment 404 instead of from the top. The inverted "y" shaped design feature at the bottom of the storage chamber 442 minimized aqueous phase 426 back-flowing into the extractant storage chamber 442 and thereby avoids slurry pluggage of the extractant phase inlet line. This design also provides some inline contact between extractant 422 phase and aqueous phase 426.

FIGS. 9, 10, 11, and 12 provide typical extraction and stripping McCabe-Thiele diagrams that were measured experimentally for candidate extractant formulations. These plots enable the user to determine the best mode of operation of the invention with respect to the optimal E/A ratios and the number of stages needed for both the extraction and stripping of sulfate ions. These plots also identify the concentration of the sulfate product produced and the level of residual sulfate remaining in the purified water at a selected set of operating conditions.

Figure 13:
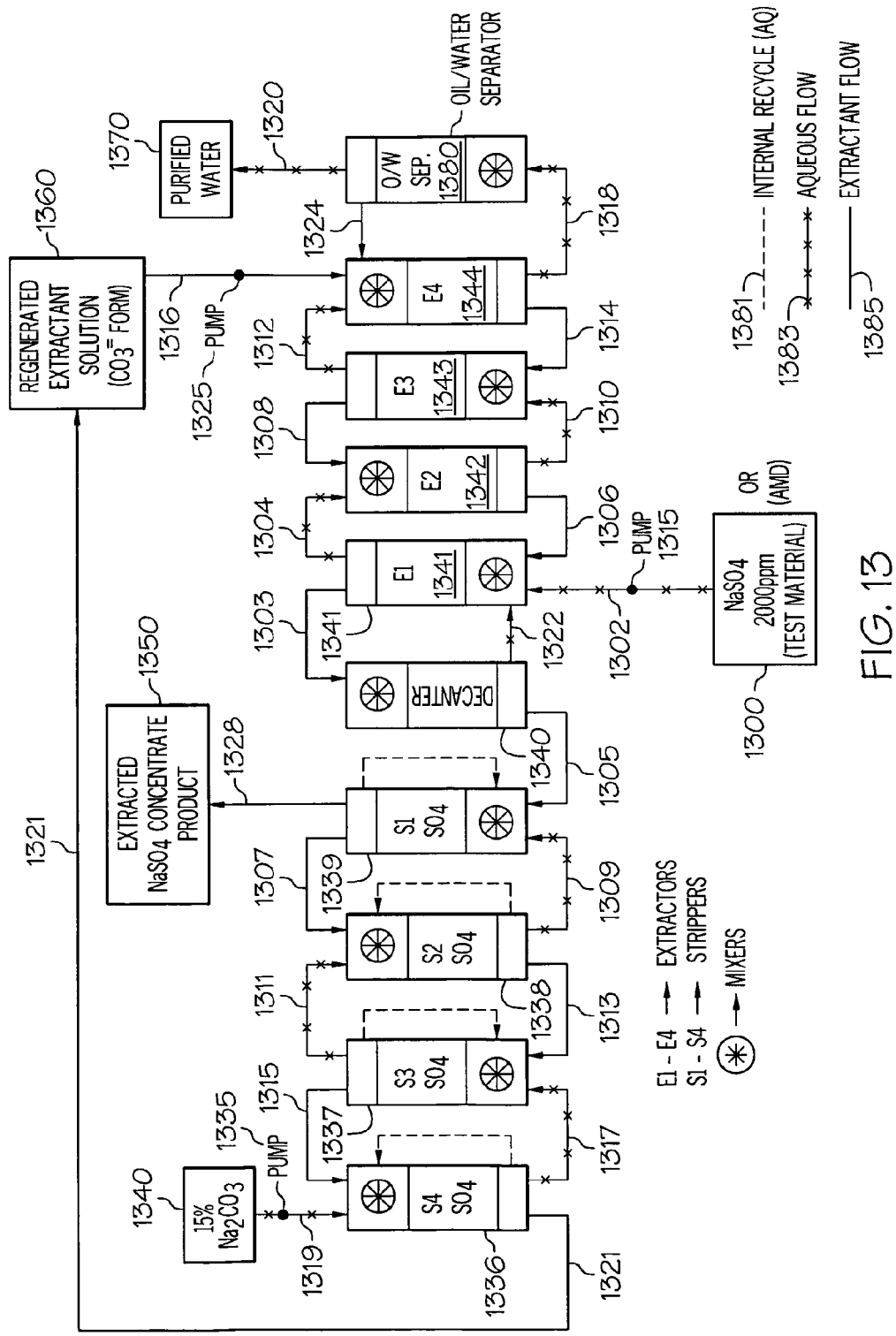
FIG. 13 is a schematic diagram illustrating a sulfate circuit process flow scheme according to one aspect of the invention.

Referring now to FIG. 13, the embodiment of the sulfate circuit comprises four extraction stages for metal cation and sulfate anion co-extraction and four stripping stages for sulfate stripping and extractant regeneration. The overall process flow diagram is shown in FIG. 13. The apparatus has a $Na_2SO_4$ solution (2000 ppm) inlet 1300 and various interconnections for aqueous flow referred to as internal recycle lines 1381, aqueous lines 1383, and extractant lines 1385. Sulfate is stripped from the extractant in strippers S1-SO4 1339, S2-SO4 1338, S3-SO4 1337, and S4-SO4 1336. In addition, the extractant phase is regenerated in the strippers. Note that all the strippers have internal recycle lines 1381 for aqueous recycle flow. Aqueous phase is depleted of ions in E1 decanter 1340 and extractors E1 1341, E2 1341, E3 1343, and E4 1343.

The $Na_2SO_4$ solution flows via pump 1315 and line 1302 to the mixing compartment of the first extractor E1 1341. In addition, extractant phase and emulsion from extractor E2 1342 flows to extractor E1 1341 via line 1306. The extractant phase and emulsion exits extractor E1 1341 via line 1303 and enters E1 decanter 1340. In the decanter, the emulsion is allowed enough time to break and separate into an aqueous and extractant phase. The extractant phase flows to S1-SO4 1339 via line 1305 while the aqueous is withdrawn and sent to extractor E1 1341 via line 1322. The extractant phase flows into S1-SO4 1339, exits via line 1307, and enters S2-SO4 1338. The aqueous phase exits S1-SO4 1339 as the $Na_2SO_4$ concentrate product 1350 via line 1328. The extractant phase flows into S2-SO4 1338, exits via line 1313, and enters S3-SO4 1337. The aqueous phase exits S2-SO4 via line 1309 and flows into S1-SO4 1339. The extractant phase flows into S3-SO4 1337, exits via line 1315, and enters S4-SO4 1336 along with the incoming carbonate solution 1340 which flows via pump 1335 and line 1319. The aqueous phase exits S3-SO4 via line 1311 and flows into S2-SO4 1338. The extractant phase flows through S4-SO4 1336, exits via line 1321, and returns to the regenerated extractant solution tank 1360. The aqueous phase leaving S4-SO4 1336 exits via line 1317 and flows into S3-SO4 1337.

The aqueous phase withdrawn from E1 decanter 1340 flows into extractor E1 1341 via line 1322. The extractant phase leaving E1 decanter 1340 exits via line 1305 and flows into S1-SO4 1339. The aqueous phase flows through E1 1341, exits via line 1304, and flows into extractor E2 1342. The extractant phase exits E1 1341 via line 1303 and flow into E1 decanter 1340. The aqueous phase flows through E2 1342, exits via line 1310, and flows into extractor E3 1343. The extractant phase leaving E2 exits via line 1306 and flows into E1 1341. The aqueous phase flows through E3 1343, exits via line 1312, and flows into extractor E4 1344. The extractant phase exits E3 1343 via line 1310 and flows into E2 1342. The aqueous phase flows through E4 1344, exits via line 1318, and flows into the O/W separator 1380. The extractant phase exits E4 1344 via line 1314 and flows into E3 1343. The purified water 1370 exits the O/W separator 1380 via line 1320. The extractant phase in the O/W separator 1380 exits via line 1324 and flows into E4 1344 along with aqueous phase from E3 1343 which flows via line 1312 and additional extractant phase 1360 which flows via pump 1325 and line 1316.

Figure 14:
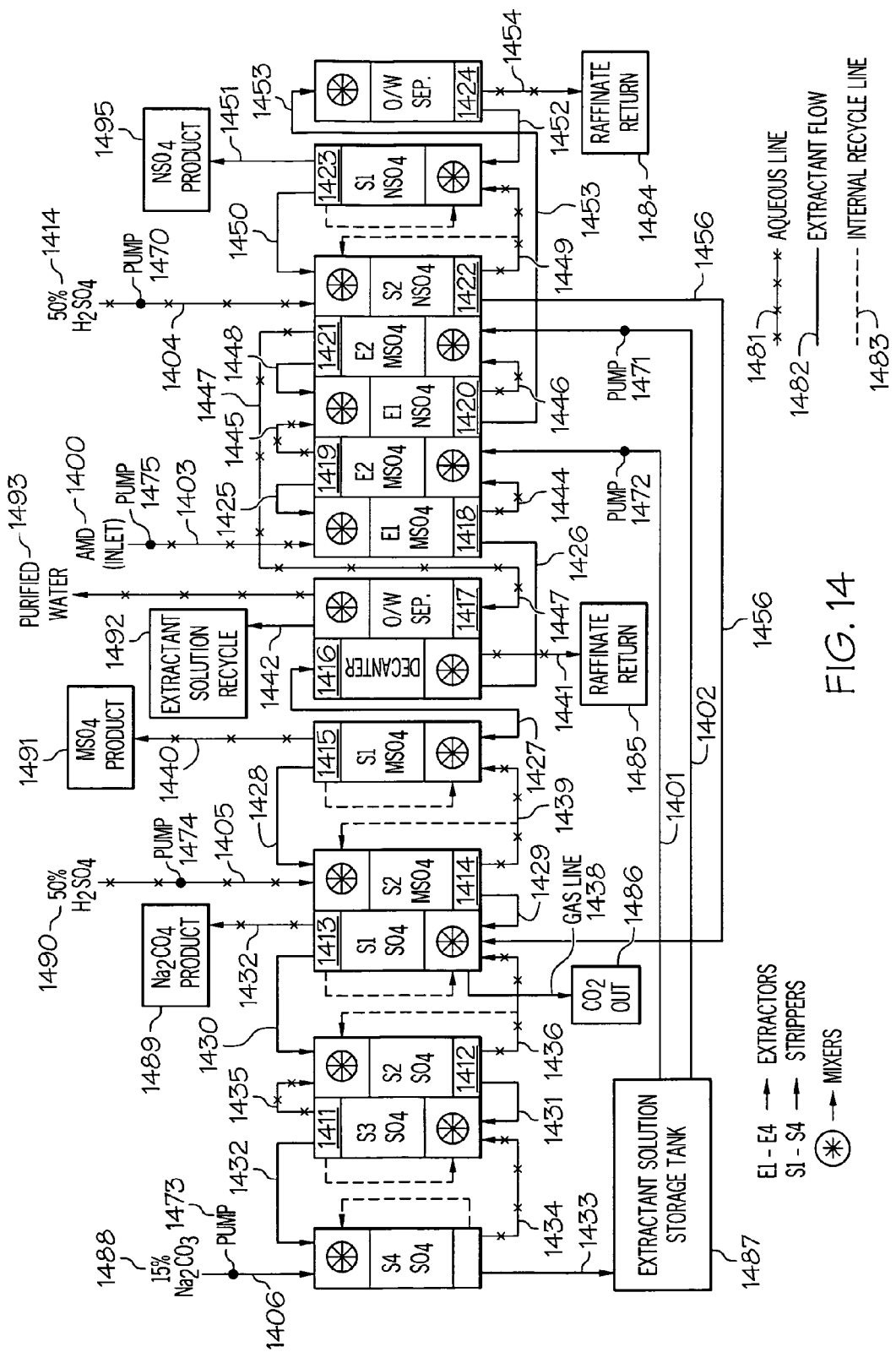
FIG. 14 is a schematic diagram illustrating acid mine drainage process flow scheme 1.

Referring now to FIG. 14, this figure illustrates acid mine drainage water purification process flow Sheme 1. Process flow Scheme 1 provides the ability to separate the metal ion components of the acid mine waters into separate products as desired. FIG. 14 illustrates how this is accomplished for two groups of metal ions, M and N. Given this information, one skilled in the art would be readily able to proform more that two separations by adding additional extraction or metal ion strip circuits. This capability is described as follows using FIG. 14 which deploys process flow scheme 1. More than two extraction stages could be used for each extraction or strip circuit, but two were found sufficiently effective in the current invention for most needs, however three or four stages are preferred for each extraction or strip circuit.

FIG. 14 illustrates Scheme 1 and comprises two extraction stages for M metal cation and sulfate anion co-extraction, two extraction stages linked in series to the first two stages for N metal cation and further sulfate anion co-extraction, two (preferably three) acid stripping stages for M-metal stripping and two (preferably three) acid stripping stages for N-metal stripping, and four (preferably 4 to 6) stripping stages for sulfate stripping with simultaneous extractant regeneration.

The apparatus has an AMD feed water inlet 1400 and various interconnections for aqueous flow referred to as internal recycle lines 1483, aqueous lines 1481, and extractant lines 1482. Sulfate is stripped from the extractant in strippers S1-SO4 1413, S2-SO4 1412, S3-SO4 1411 and S4-SO4 1410. In addition, the extractant phase is regenerated in the strippers. Note that the metal and sulfate strippers have internal recycle lines 1483 for aqueous recycle flow. Aqueous phase is depleted of ions in E1-MSO4 Decanter (D) 1416, E1-NSO4 Decanter (D) 1424, and extractors E1-MSO4 1418, E2-MSO4 1419, E1-NSO4 1420, and E2-NSO4 1422.

The AMD feed water 1400 flows via pump 1475 and line 1403 into E1-MSO4 mixer 1418 along with extractant phase and floc from E2-MSO4 via line 1425. The aqueous phase (raffinate) exits E1-MSO4 1418 via line 1444 and flows into E2-MSO4 1419. The extractant phase exits E1-MSO4 1418 via line 1426 and flows into E1-MSO4 Decanter (D) 1416. The aqueous phase leaving E1-MSO4 Decanter (D) 1416 flows into the raffinate return 1485 via line 1441. Raffinate Return from any Decanter of the invention represents a relatively small amount of aqueous phase flow that corresponds to that volume of physically entrained aqueous phase that accompanied the extractant phase flow as the latter exited its extractor (in this case E1-MSO4). It is an important and unique feature of the floc based liquid liquid extraction technology that such physically entrained aqueous flows exist. These small aqueous flows exist due to the requirement that the floc not be allowed to thicken excessively in the extracter to avoid it thickening too much there and eventually solidify and plug up the setter and thereby becoming retained by the extractor. This problem is avoided by the technology by operating such to keep the extractant phase layer thin in each extracter so as to reduce the residence time of the extract layer short. The thin nature of the extractant phase then allows some co-flow of aqueous layer as the mixture approaches the floc over flow weir. This aqueous flow is easily collected in the decanter and recycled as shown in the figures.

The extractant phase leaving E1-MSO4 Decanter (D) 1416 flows into S1-MSO4 mixer 1415 via line 1427. The aqueous phase exits S1-MSO4 1415 as the M-metal sulfate product (MSO4) 1491 via line 1440. The extractant phase exits S1-MSO4 1415 via line 1428 and flows into S2-MSO4 mixer 1414 along with the 50 wt % sulfuric acid solution 1490, (or other strip acid feed which is 2-70% in concentration, and preferably 15 to 50% concentration), which flows via pump 1474 and line 1405. The aqueous phase leaving S2-MSO4 1414 flows into S1-MSO4 1415 via line 1439. The extractant phase leaving S2-MSO4 1414 flows into S1-SO4 1413 via line 1429 along with aqueous phase from S2-SO4 1412 which flows via line 1436 and extractant phase from S2-NSO4 1422 which flows via line 1456. The aqueous phase exits S1-SO4 1413 as the $Na_2SO_4$ product 1489 via line 1437. The extractant phase exits S1-SO4 1413 via line 1430 and flows into S2-SO4 mixer 1412 along with aqueous phase from S3-SO4 via line 1435. Carbon dioxide ($CO_2$) 1486 exits S1-SO4 1413 via line 1438, which is optionally captured and used as a co-product or vented. The aqueous phase leaving S2-SO4 1412 flows into S1-SO4 mixer 1413 via line 1436. The extractant phase leaving S2-SO4 1412 flows into S3-SO4 mixer 1411 via line 1431 along with aqueous phase from S4-SO4 1410 which flows via line 1434. The aqueous phase exits S3-SO4 1411 and flows into S2-SO4 mixer 1412 via line 1435. The extractant phase exits S3-SO4 1411 and flows into S4-SO4 mixer 1410 via line 1432 along with 1 to 25% $Na_2CO_3$ solution, preferably the 10 to 20% $Na_2CO_3$, and most preferably 13-17% $Na_2CO_3$ solution 1488 which flows via pump 1473 and line 1406. The aqueous phase leaving S4-SO4 1410 flows into S3-SO4 mixer 1411 via line 1434. The extractant phase leaving S4-SO4 1410 returns to the extractant solution storage tank 1487 via line 1433.

The aqueous phase leaving E1-MSO4 1418 flows into E2-MSO4 mixer 1419 via line 1444 along with extractant phase from the extractant storage tank 1487 which flows via pump 1472 and line 1401. The extractant phase leaving E1-MSO4 1418 flows into E1-MSO4 Decanter (D) 1416 via line 1426. The aqueous phase exits E2-MSO4 1419 and, for the case of using only two "M" extraction stages, flows into E1-NSO4 stage 1420 via line 1445 along with extractant phase from E2-NSO4 1421 which flows via line 1448. The extractant phase exits E2-MSO4 1419 and flows into E1-MSO4 1418 via line 1425. The aqueous phase leaving E1-NSO4 1420 flows into E2-NSO4 mixer 1421 via line 1446. The extractant phase leaving E1-NSO4 1420 flows into Decanter (D) 1424 via line 1453. The aqueous phase exits E2-NSO4 1421 via line 1447 and flows into O/W separator 1417. The O/W separator 1417 effluent exits via line 1443 as the purified water product 1493. Depending on the requirements for use or environmental release of this water it can be released, deodorized, and/or filtered for solid particulate removal. The recovered low flow of extractant phase exits the O/W separator 1417 via line 1442 and flows into the extractant solution recycle tank 1492. The aqueous phase leaving Decanter (D) 1424 flows to the raffinate return 1484 (see above for definition of Raffinate Return) via line 1454. The extractant phase leaving Decanter (D) 1424 flows into S1-NSO4 1423 via line 1452 along with aqueous phase from S2-NSO4 1422 which flows via line 1449. The aqueous phase exits S1-NSO4 1423 via line 1451 as the N-metal sulfate product 1495. The extractant phase exits S1-NSO4 1423 via line 1450 and flows into the S2-NSO4 mixer 1422. The stripped extractant phase from S2-NSO4 1422 settler and flows to the S1-SO4 sulfate stripper 1413 via line 1456.

Figure 15:
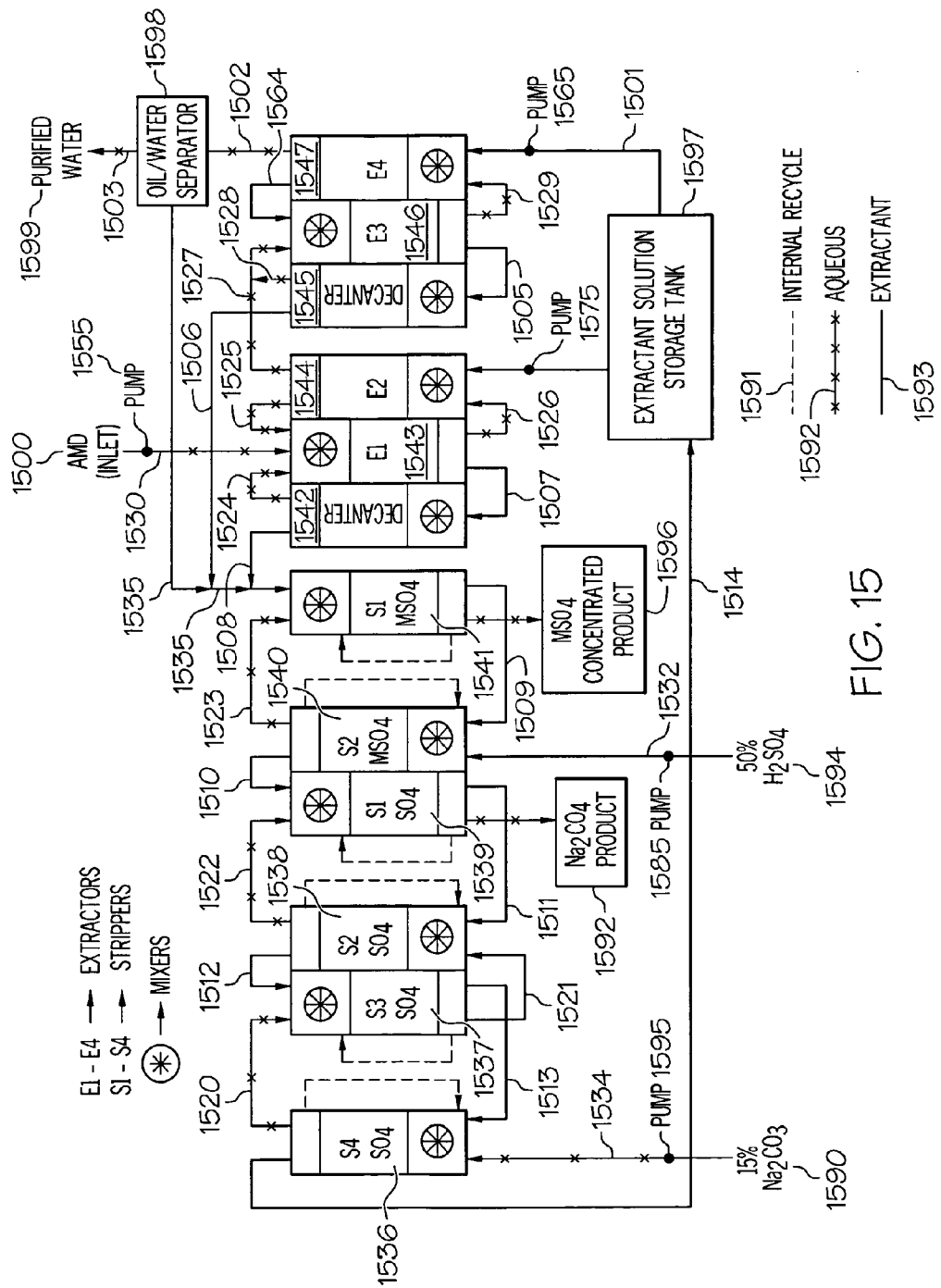
FIG. 15 is a schematic diagram illustrating an acid mine drainage process flow scheme 2.

Referring now to FIG. 15, this figure illustrates acid mine drainage process flow scheme 2. Process flow scheme 2 comprises four extraction stages for metal cation and sulfate anion co-extraction, two acid stripping stages for metal stripping, and four stripping stages for sulfate stripping and extractant regeneration. The overall process flow diagram is shown in FIG. 15.

The apparatus has an AMD feed water inlet 1500 and various interconnections for aqueous flow referred to as internal recycle lines 1591, aqueous lines 1592, and extractant lines 1593. Sulfate is stripped from the extractant in strippers S1-SO4 1539, S2-SO4 1538, S3-SO4 1537, and S4-SO4 1536. In addition, the extractant phase is regenerated in the strippers. Note that the metal and sulfate strippers have internal recycle lines 1591 for aqueous recycle flow. Aqueous phase is depleted of ions in E1 Decanter (D) 1542 and extractors E1 1543, E2 1544, E2 Decanter (D) 1545, E3 1546, and E4 1547.

The AMD feed water 1500 flows via pump 1555 and line 1530 into E1 mixer 1543 along with extractant phase and floc from E2 1544 via line 1525 and aqueous phase from E1D 1542 via line 1524. The aqueous phase exits E1 1543 via line 1526 and flows into E2 mixer 1544. The extractant phase exits E1 1543 and flows into E1D mixer 1542 via line 1507. The aqueous phase leaving E1D 1542 flows back to E1 mixer 1543 via line 1524. The extractant phase leaving E1D 1542 flows to S1-MSO4 mixer 1541 via line 1508 to line 1535 along with extractant phase from E2D 1545 via line 1506 and extractant phase from O/W separator 1598. The aqueous phase exits S1-MSO4 1541 as the metal sulfate concentrate product 1596 via line 1548. The extractant phase exits S1-MSO4 1541 via line 1509 and flows into S2-MSO4 mixer 1540 along with the 50 wt % sulfuric acid solution which flows via pump 1585 and line 1532. The aqueous phase leaving S2-MSO4 1540 flows to S1-MSO4 mixer 1541 via line 1523. The extractant phase leaving S2-MSO4 1540 flows to S1-SO4 mixer 1539 via line 1510. The aqueous phase exits S1-SO4 1539 as the Na$_2$SO$_4$ product 1592 via line 1533. The extractant phase exits S1-SO4 1539 and flows into S2-SO4 mixer 1538 via line 1511. The aqueous phase leaving S2-SO4 1538 flows into S1-SO4 mixer 1539 via line 1522. The extractant phase leaving S2-SO4 1538 flows into S3-SO4 mixer 1537 via line 1512. The aqueous phase exits S3-SO4 1537 and flows into S2-SO4 mixer 1538 via line 1521. The extractant phase exits S3-SO4 1537 and flows into S4-SO4 mixer 1536 via line 1513 along with the 15 wt % Na$_2$CO$_3$ solution which flows via pump 1595 and line 1534. The aqueous phase leaving S4-SO4 1536 flows to S3-SO4 mixer 1537 via line 1520. The extractant phase leaving S4-SO4 1536 is regenerated and returns to the extractant solution storage tank 1597 via line 1514.

The aqueous phase withdrawn from E1D 1542 via line 1524 flows into the E1 mixer 1543. The aqueous phase exits E1 1543 via line 1526 and flows into E2 mixer 1544 along with the extractant solution from the storage tank 1597 which flows via pump 1575 and line 1531. The extractant phase exits E1 via line 1507 and flows into E1D mixer 1542. The aqueous phase leaving E2 1544 flows into E3 mixer 1546 via line 1527 along with aqueous phase from E2D 1545 via line 1528 and extractant phase from E4 1547 via line 1504. The extractant phase leaving E2 1544 flows into E1 mixer 1543 via line 1525. The aqueous phase exits E3 1546 via line 1529 and flows into the E4 mixer 1547 along with extractant phase from the storage tank 1597 which flows via pump 1565 and line 1501. The extractant phase exits E3 1546 via line 1505 and flows into E2D mixer 1545. The aqueous phase leaving E4 1547 flows to the O/W separator 1598 via line 1502. The extractant phase leaving E4 1547 flows to E3 1546 via line 1504. The O/W effluent exits via line 1503 as the purified water 1599. The extractant phase in the O/W separator 1598 exits via line 1535 and flows into S1-MSO4 mixer 1541.

Referring now to FIG. 17, this figure illustrates a presently preferred configuration: M are mixers, E1 to E4 are extractor units with associated decanters and weirs having flow control guides, and S1-SO4 to S4-SO4 are the sulfate strippers. Typically, the extractor floc weirs have entrance and exit ramps with a rounded lip and bottom. The configuration shows a water purification circuit 1801$m$, a metal strip circuit 1803, and a sulfate strip circuit and extractant phase regeneration 1805. Metal recovery is in metal stripper S1M where a metal sulfate concentrate product is obtained. Note that the metal and sulfate strippers have internal recycle lines for aqueous recycle flow.

The apparatus has an AMD feed water inlet 1800 and various interconnections for flow referred to as aqueous lines 1853 and extractant lines 1855. The AMD feed water 1800 flows via line 1802 into E1 mixer (M) 1832 along with extractant phase and floc from E2 decanter 1823. The mixture flows past flow guide 1834 and over weir 1835 into E1 decanter 1833. In E1 decanter 1833, the floc thickens and maintains continuous flow due to flow guide 1836 and floc weir 1835. The aqueous phase flows under flow guides 1834 and 1836 and returns to E2 M 1822 via two standpipes and line 1858 in E1 decanter 1833. The extractant phase and floc enters S1-M mixer (M) 1840 along with the acidic aqueous phase via line 1856 from S2-M 1841. The floc is disintegrated by the acidic aqueous phase and forms acidic aqueous and extractant phases. The aqueous phase leaving S1-M 1840 is the metal sulfate concentrate product 1811 and can be collected via line 1808 in a storage vessel. The extractant phase leaving S1-M 1840 flows into S2-M mixer (M) 1841 via line 1818 along with the sulfuric acid solution 1813 which flows via line 1810. The acidic aqueous phase exits S2-M 1841 via line 1856 and flows into S1-M mixer (M) 1840. The extractant phase leaving S2-M 1841 flows into S1-SO4 mixer (M) 1842 with aqueous phase from S2-SO4 1843. The aqueous phase exits S1-SO4 1842 as the sulfate concentrate product 1815 and is collected via line 1812. The extractant phase leaving S1-SO4 1842 flows into S2-SO4 mixer (M) 1843 with aqueous phase from S3-SO4 1844. The aqueous phase exits S2-SO4 1843 and flows into S1-SO4 mixer (M) 1842. The extractant phase exits S2-SO4 1843 and flows into S3-SO4 mixer (M) 1844. The aqueous phase leaving S3-SO4 1844 flows into S2-SO4 mixer (M) 1843. The extractant phase leaving S3-SO4 1844 flows into S4-SO4 mixer (M) 1845 along with the carbonate solution 1817 which flows via line 1814. The aqueous phase leaving S4-SO4 1845 flows into S3-SO4 mixer (M) 1844. The extractant phase exits S4-SO4 via line 1816 as the regenerated extractant solution 1819 and is collected in a storage vessel.

The aqueous phase withdrawn from E1 decanter 1833 via line 1858 and two standpipes flows into extractor E2 mixer (M) 1822. The extractant phase in E1 decanter 1833 flows over flow weir 1835 and flows into S1-M 1840. The aqueous phase flows through E2 1822 and exits via flow guides 1824 and 1857 and two standpipes to line 1859. The extractant phase and floc leaving E2D 1823 flows into E1 mixer (M) 1832 along with AMD feed water 1800 which flows via line 1802. The aqueous phase flows into E3 mixer (M) 1821 via line 1859 with extractant phase from E4 1820. The aqueous leaving E3 1821 flows into E4 mixer (M) 1820 via line 1860 with fresh extractant phase 1807 which flows via line 1804. The extractant phase leaving E3 flows into extractor E2 mixer (M) 1822 via line 1861. The aqueous phase flows through E4 1820 and exits via line 1806 as the purified water product 1809. The extractant phase leaving E4 1820 flows into E3 mixer (M) 1821 via line 1862.

To demonstrate that the selected process of the invention was scaleable, a field demonstrating unit was constructed with process flow diagram similar to that of FIG. 15 but sized to be operable at 5 to 40 gal/min, and optimal at 12 to 30 gal/min acid mine drainage water feed rate. The field unit was the size of two tractor trailer beds and located on an abandoned mine site at St. Michael, Pa. where a continuous acid mine discharge water is flowing at a rate of 10,000 gallons/min so that sufficient feed water was available for 24/7 operation. These trials lasted for 3 months where the water purification process chemistry previously described was confirmed at this larger scale. The E/A ratio was varied in this three months of testing over the range of 1/2 to 1/10 and where the preferred ratio was 1/3 to 1/8, and most preferred ratio was the same as was found for the laboratory and pilot testing, or 1/4 to 1/6. This testing demonstrated the robustness of the technology, its good economics, ease of operation, and water purification capability.

EXAMPLES

The following examples illustrate various aspects of the invention and are not intended to limit the scope of the invention in any way.

Example 1

The objective of this test was to determine the key parameters and ranges necessary for a successful removal of contaminants from acid mine drainage water and accomplishing the separation of the recovered components while forming them into concentrates. The process configuration in FIG. 13 was constructed using clear chemical resistant PVC(CPVC) for the mixer-settler tanks, which had had an internal mixer volume of 186.7 $cm^3$ and an internal settler volume of 401.5 $cm^3$. The flow rate used resulted in a 333.6 second residence time. Clear Tygon tubing (0.25" I.D.) was used for the piping. Cole-Parmer Instrument Company Master-flex L/S Peristaltic pumps and Dayton AC-DC series motor mixers were used. The extractant solution formulation was prepared using 15% Aliquat 134, 15% Exxon 10 (Isodecanol), and Calumet 400-500. All test conditions are given in the LLX Test Condition Key.

The process was started up, operated, and shut down in the following manner.

At start-up, the system was charged with aqueous solutions first, and each mixer settler of the process was charged with approximately 50% of its respective volume. The system is initially charged with 50% Sulfuric Acid, followed by a 15% Sodium Carbonate solution. The more preferred method is to charge the strippers with 25% $H_2SO_4$ to stay away from excessive strong acid which can tend to third phase formation. Most preferred is to charge the system with actual $M-SO_4$ concentrate from a previous run. Charging the system in this manner causes the extractant overflow receiving compartments to partially fill. After this phase of start-up is complete the system is now ready for the extractant solution.

The extractant solution must be fully acid stripped of $Cl^-$ and then carbonate loaded (1-25% $Na_2CO_3$), preferably 15% $Na_2CO_3$) before being added to the process. Although the introduction of extractant solution is best achieved at the pilot and commercial scale levels using pumps, at the bench/lab scale this can be quickly achieved by manually pouring the extractant solution into the mixer-settlers to the point of overflow into the E-phase overflow compartments. After charging the flotation liquid-liquid extraction circuit with a sufficient volume of extractant solution, there needs to be enough extractant solution left in the surge tank so that the process needs are met during normal operation. The total volume of the extractant solution surge tank should be designed large enough so that it does not overflow during the operation of the flotation liquid-liquid extraction process and can be charged with extractant solution when the system is shut down between operations. The steady-state volume of the extractant solution in the surge tank is then monitored visually or electronically with level switches. This should be done periodically so that the extractant solution surge tank is volume can be adjusted as needed to maintain sufficient extractant solution volume to provide steady operation over extended periods, for example weeks, months and possible years. The stirrers for the mixers were then powered up, adjusted and maintained at steady-state by the following procedures.

All of the mixers were set between 700-1700 rotations per minute (rpm). The mixers need at least 15 minutes to warm up, preferably 30 minutes. During this time the mixers are monitored and adjusted, usually decreasing the rotation rate in order to avoid excessive mixing. Excessive mixing is very undesirable. It can lead to problems such as spatter as well as the formation of fine emulsions that may be stable or that require longer phase coalescence time in the settlers. Although any type of stirring is sufficient enough to mix medium to low viscosity immiscible fluids, disk or fin type stirrer pumps are preferred. They are both designed to pull the two fluids, aqueous and extractant solution, into the mixing compartment from the upstream mixer settlers. The shearing blades of the mixers generate micro droplets that create a very high interfacial surface area that is critical to fast contaminant extraction and strip kinetics. Higher mixing speeds accommodate shorter residence time of the fluid in the mixer and compensate for extractant/aqueous ratios other than 1:1. Although stirrer speeds that result in the mutual blending of only 20% of the two phases is sufficient, a blend of at least 80% is preferred and if optimum conditions can be achieved 95-100%. Excessive mixing is suitable but less preferred if the resultant emulsion formed requires mixing for long periods of time to disengage and break due to exceedingly fine droplet size. Mixing conditions preferred by the invention is about 12-120 seconds, preferably 30-90 seconds, and if optimum conditions can be achieved 45-seconds. The total hydraulic fluid residence time in the mixer and the settler necessary for this process should be 10 times that amount or approximately 15 minutes. Due to the low values and/or quantities of the contaminants present in the Acid Mine Drainage water purification process (Fe, Al, Se, Si, Mn, Zn, Ni, Co, Ca, $SO_4^{-2}$), and the very high flow rates of 10-10,000 gal/min (averaging about 500 gal/min, but often variable) of water, conventional metals extraction by liquid-liquid extraction is not feasible because of the very large equipment and E/A ratio requirements that would be required for the large aqueous flows involved in water purification. Although the mixing conditions can be either extractant phase continuous or aqueous continuous, the latter is the more typical since special startup conditions are not needed to achieve it.

After this initial loading of strip solutions and the warm up time for the mixers are both complete, the system is now ready for the charging of the acid mine drainage feed water and {the acid mine drainage feed pump was set to 72 ml/min at system start-up (test parameter goal for acid mine drainage feed stream is 100 ml/min)} the extractant phase feed streams. The N-extractant (extraction circuit designed to extract+2 metal ions) feed flow rate at system start-up is set to 18 ml/min. The extractant surge tank for this process was a 4 L clear chemical resistant PVC tank. Other feed agents are listed in the LLX Test Condition Key.

Operation, Control, Monitoring (approaching and maintaining steady-state): The process is run for approximately 20 hours before steady-state is reached. This gives the extractant phase enough time to cycle through the process at least 3 times (assuming 6 L surge tank used @ 15 ml/min). The extractant phase contacts the feed first during the metal extraction stage and then gets metal stripped with Sulfuric Acid (50% $H_2SO_4$). After the Metal Strip Stage the extractant gets carbonate (15% $Na_2CO_3$) loaded to extract the sulfate ions and is now ready for use again. The extractant phases flow scheme is also illustrated in FIG. 13.

Once the extractant has had enough time to cycle through the system at least once approximately 80% of the extractant phase stays within the system and the remaining 20% stays in the surge tank. The acid mine drainage feed rate was increased in 10 ml/min increments until the test parameter of 100 ml/min was reached. Occasionally the system must be put in idle mode (park) until certain control issues can be adjusted, any chemical additions can be added, or any maintenance issue can be addressed. When this is done all of the feed pumps are shut off and the mixers are allowed to continue to circulate the process fluids. For example, for this test the process was parked for the following reasons: extractant feed levels running too low, recalibration of pumps needed, aqueous in extractant feed pump, etc. Once the process is said to have reached steady-state data readings can be collected and sampling can now take place.

The samples for this test were collected out of the metal and sulfate strip extraction stages as well as the acid mine drainage Feed and Raffinate discharge lines (E1-E2-E3-E4-S1SO4-S2SO4-S3SO4-S4SO4-Feed-Raffinate). There were two samples taken in 1 L bottles from the acid mine drainage drum per run for analysis (sample with 2% Nitric Acid and "as is" sample).

Each extraction stage sample was taken from the aqueous phase of the fluid in the settler tank using plastic disposable Luer Lock syringes, and filtered using Serum Acrodisc 37 mm syringe filters with glass fiber (GF)/0.2 micron pores. This precautionary measure was taken to assure a minimal amount of organic phase within the sample. The samples were taken within one hour of each other. There were four samples taken from this run. The data collection should be done in collaboration with the sample collection every hour, it consists of: pH, density, E:A ratio, chemical volume, extractant depth, and mixer tip speeds. Once the data has been collected it will immediately be place inside of the lab notebook. The samples are then sent off for Inductive Coupled Plasma (ICP) and Inductive Coupled Plasma Mass Spectrometry (ICP-MS) analysis.

At the end of this test 37.2 gallons of acid mine drainage feed had been used over the course of approximately 40 hours.

Example 1A

Stages Determination

This example determined the effect of sulfate extraction efficiency using extractant phase formulation. The apparatus of FIG. 13 was constructed. The extractant phase was prepared by selecting components from Table 3, and certain components of these were selected and blended in proportions given in Table 5. The test conditions used are given in Table 5.

The experiment used extractant solution from Table 5 to extract sulfate from 2000 ppm $Na_2SO_4$ solution. Since the extraction of sulfate anions in a $Na_2SO_4$ solution rely mainly on a concentration gradient, this set-up served as "worst case" in sulfate anion removal of water purification process. The extractant solution was treated with 15% $Na_2CO_3$ to load up the extractant with carbonate anion, and then the extractant and $Na_2SO_4$ solution were tested under different E/A ratio. The aqueous phase was analyzed using ion chromatography to determine the remaining sulfate concentration. The ion chromatography results determined the amount of sulfate removed at different E/A ratio. And those results were also plotted via McCabe-Thiele plot, which lead to the discovery of the stages needed for sufficient sulfate loading and stripping of the water treatment process. The experiment also determined the range of extractant needed for effective sulfate extraction, which preferred by the invention is about 5-15%, most preferably 8-12%. The McCabe-Thiele result is shown in FIG. 9 to FIG. 12.

To validate the results, a sulfate extraction process was set up with the apparatus of FIG. 13. This process was designed to extract sulfate anion from a 2000 ppm $Na_2SO_4$ solution via a continuous circuit. The result from this process validated the proposed design and the same sulfate process apparatus was implemented into the overall process flow scheme. This also established a baseline test condition, which includes E/A ratio between 1/4-1/6 for sufficient sulfate extraction and stripping in three to four stages.

Example 2

Run #2

This example determined the effect of metal and sulfate extraction efficiency in a less contaminated stream using extractant phase formulation. The apparatus of FIG. 14 was constructed. The extractant phase was prepared by selecting components from Table 3 blended in proportions giving in Table 5. The test conditions used are given in Table 5.

This experiment used extractant solution from Table 5 with process apparatus of FIG. 14 to perform water purification process with an acid mine drainage stream containing low contaminant levels. The process was set up with the same number of extracting and stripping stages. The combination of high extraction efficiency of metal cation and sulfate anion and the low contaminant concentration in the acid mine drainage stream caused secondary emulsion at the third extraction stage. The emulsion also stopped phase disengagement between extractant solution and the raffinate. The extractant solution and raffinate emulsion created from the process behaved similarly to an emulsion of an extractant solution and deionized water. The emulsified raffinate from this process was left in the tank for 24 hours to prolong the settling time in an attempt to achieve better phase disengagement. However, there was no visible phase separation after 24+ hours of settling time, and the emulsion was not able to break until pH adjustment was made by addition of sulfuric acid. It appears that mixing was excessive thus forming a stable microemulsion. Stable in that the disengagement from the emulsion was too slow. When mixer speed was controlled this problem did not return.

Example 3

Run #6

This example determined the effect of acid mine drainage liquid-liquid extraction MA system efficiency with shorter mixing residence time using extractant phase formulation. The apparatus of FIG. 14 was constructed. The extractant phase was prepared by selecting components from Table 3 blended in ranges given in Table 4. The test conditions used are given in Table 5.

This experiment also used extractant solution from Table 5 with process apparatus of FIG. 14 to evaluate acid mine drainage water purification process performance under shorter mixing residence time. The two-part experiment tested different process conditions; the first part of the experiment tested the treatment process with E/A ratio of 1/6 and mixing residence time of 60 seconds, and the second part tested the treatment process with E/A ratio of 1/8 and mixing residence time of 35 seconds.

The 60 seconds mixing residence time trial was behaving well on its own, and the consumption rates of $Na_2CO_3$ and $H_2SO_4$ were determined in this experiment. The raffinate from individual stream was sent to ion chromatography and Inductively Coupled Plasma Mass Spectrometry (ICP/MS) to determine the final metal and sulfate concentration. These results and measurements helped to determine the final mass/molar balance of the overall process. The 35 seconds mixing residence time trial also had a smooth operation. However, the raffinate's ion chromatography and ICP/MS results from this trial turned out not fulfilling the performance requirement. This allowed the determination of the mixing residence time and E/A ratio limitation for the treatment system. The analytical results from these trials are shown in Table 6.

The result from the two-part experiment not only showed the limitation of E/A ratio and mixing residence time needed for sufficient process treatment, but also determined the extractant solution input rate with respect to the mixer size. If too much extractant solution pushed into strippers, the mixer section would be overwhelmed and started plugging up because of the excess extractant solution in the mixer. The excess extractant solution in the mixer had gel-like behavior and caused the mixer to lose hydraulic suction. This would severely cripple the process because it was essentially equal to shutting down the process at midpoint while more acid mine drainage water and extractant were being pushed through the front end of the process. The discovery of this particular limitation allowed the determination of the maximum extractant solution flow rate into the strippers, thus provided the boundary condition needed for the process.

Example 4

This example determined the effect of water entrainment from extractant phase formulation, especially the contribution of chosen extractant and diluent and their relationship. The test apparatus consisted of a series of graduated, capped vials used to perform batch evaluations of the degree of water entrainment with respect to extractant phase formulation at extraction and strip conditions, and while preserving good yields of sulfate ion extraction. The extractant phase was prepared by selecting components from Table 3; blended in proportions given in Table 5. The test conditions used are given in Table 5.

This series of experiments used extractant solution from Table 5 to determine the "best case" extractant phase formulation that yielded the least water entrainment in the extractant phase. The experiments were designed by using Design Expert, version 6.0, and the goal for this experiment was to discover the extractant phase formulation range that would potentially produce the highest metal sulfate product without compromising the sulfate extraction efficiency. There were five different concentrations of extractant solutions and each was conditioned with 15% $Na_2CO_3$. The different extractant solutions were thoroughly mixed with acid mine drainage water with E/A ratio of 1/6. The mixtures were then left to settle and the settling time was recorded. A certain amount of extractant phase was transferred to a centrifuge to pull any entrained raffinate out from the extractant phase. The leftover raffinate was then transferred out and the extractant phase was then treated with 50% $H_2SO_4$ for metal extraction. Measurements such as phase disengagement time, amount of raffinate entrained, color of the extractant phase, etc. were taken during the experiments and the results were entered into the Design Expert software.

Figure 16:
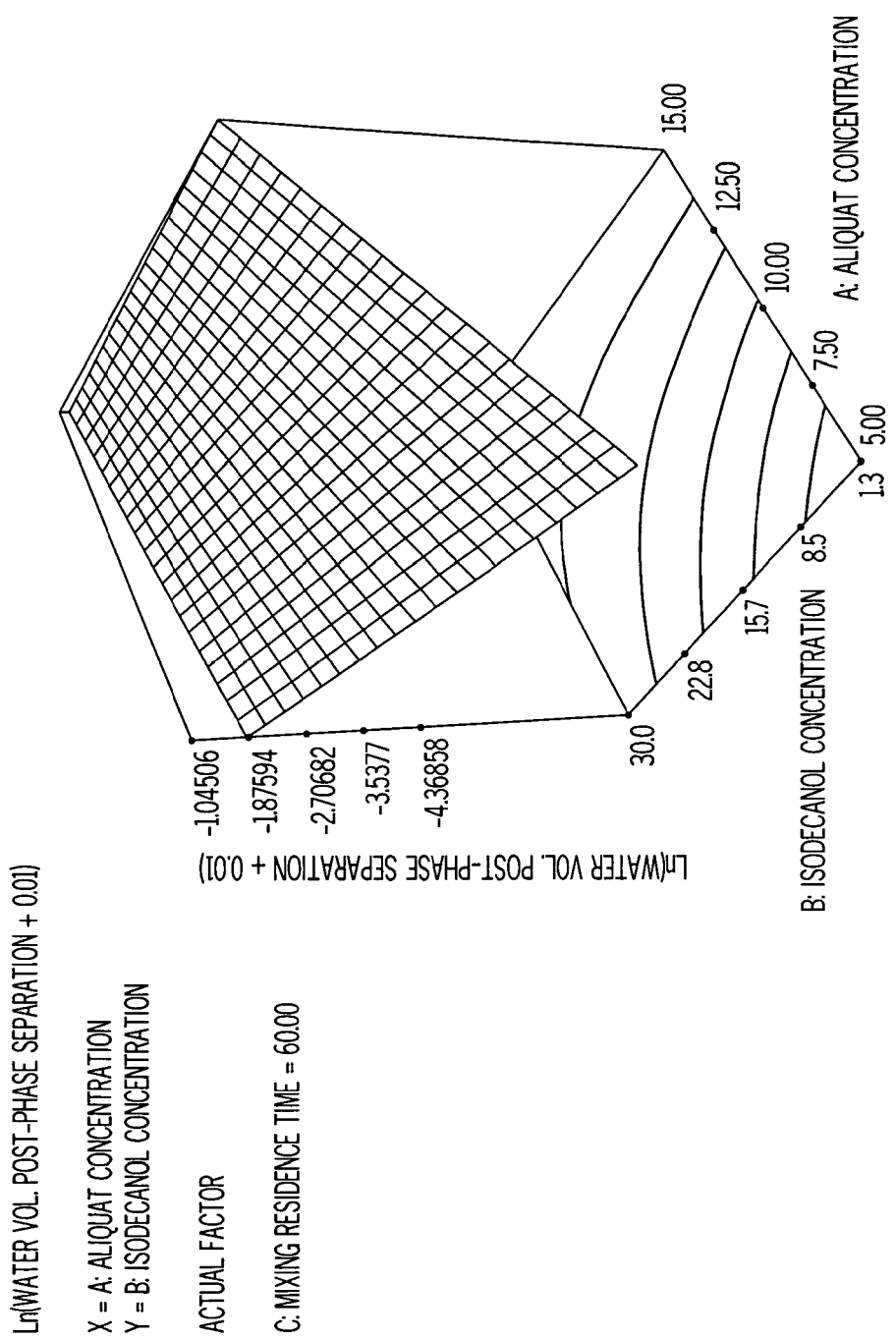
FIG. 16 is a plot of the correlation of Aliquat™ and isodecanol concentration and the impact of the formulation to post phase separation water entrainment.

FIG. 16, from Design Expert version 6.0, showed schematically the relationship of the concentration of Aliquat and Isodecanol and their impact on post-phase separation water entrainment in the extractant solution. The goal was to find a "best case" formulation and test condition with respect to high metal sulfate production. This experiment not only led to the discovery of the "best case" test condition needed for producing high metal sulfate product, but also demonstrated the effect of the rapidly declining metal sulfate concentration caused by water entrainment. If the raffinate water was entrained in extractant solution, even a small amount of water would reduce the metal sulfate concentration dramatically and sacrificed the salability of the metal sulfate product. The diluted metal sulfate concentration would also need a long time to build back up to a desirable level.

Example 5

Run #7, Scheme 3

This example determined the effect of the optimum extractant phase formulation found in the previous designed experiments (example 4) and its influence on metal sulfate product concentration. The apparatus of FIG. 3 was constructed. The extractant phase was prepared by selecting components from Table 3 and blended in proportions giving in Table 4. The test conditions used are given in Table 5.

This experiment used extractant solution from Table 5 with process apparatus of FIG. 3 to evaluate the extractant phase "best case" formulation with respect to amount of water entrainment in the extractant phase and the concentration increase in the metal sulfate product stream. The experiment was set up to test several different test conditions, and a set of measurements were conducted from each of the test conditions to determine the metal sulfate product flow rate and the consumption rate of sulfuric acid. These measurements were critical for determining the metal sulfate production rate and provide a more realistic economic estimation for the field-scale process unit. The results from the experiment were then entered into the Design Expert software, version 6.0 to determine the optimum test condition for producing high concentration metal sulfate product stream. Test condition range and the optimum test condition that would be needed to produce high metal sulfate concentrations were determined. As determined by the software, the E/A ratio would be increased from 1/6 to 1/4.35, with longer mixing residence time of 112.5 seconds. The result from this experiment will serve as the test condition for the next experiment, and the metal sulfate product concentration would be compared with the previous tests and a final extractant phase formulation could be determined.

Example 6

Run #8

This example determined the effect of the "best case" extractant phase test condition found in the previous designed experiments (example 5) and its influence on metal sulfate product concentration. The apparatus of FIG. 3 was constructed. The extractant phase was prepared by selecting components from Table 5 and blended in proportions giving in Table 4. The test conditions used are given in Table 5.

With the previously determined test condition, the experiment ran over 27 hours without major problems and was also able to provide valuable information on the metal sulfate product concentration. The flow rate of metal sulfate product was determined, and the ratio of metal sulfate product to acid mine drainage feed flow rate were about 1/5 or less.

The process also added sodium hydroxide solution into the last stage of extraction in an attempt to extract out additional magnesium via pH control. And some solid particles precipitated and settled in the bottom of the last extraction settler. This also indicated the potential product that could be produced from this process and also the additional implementation to avoid solid blockage inside the transferring lines. The results for this experiment are shown in Table 8

This experiment not only showed the potential concentration of the metal sulfate product, but also the sensitivity of such product stream toward water carry-over by the extractant solution. Even a small amount of water/raffinate carried over by the extractant solution would decrease the concentration tremendously. And once the concentration dropped, it would take a long time to build up the concentration back to the desirable level. The diluted metal sulfate product stream would also create faster harvesting flow rate, i.e. the ratio of metal sulfate product to acid mine drainage feed flow rate would increase to 1/3 or more. The sudden surge of water/raffinate disrupted the level of the extractant and aqueous phase and caused domino effect to all the downstream process. Therefore, it was essential to find a good control method for metal sulfate stripper to guarantee the success of this process.

Example 7

Run #9

This example determined the effect of the extractant phase test condition with alternative diluent in the formulation and its influence on metal sulfate product concentration. The apparatus of FIG. 3 was constructed. The extractant phase was prepared by selecting components from Table 5 and blending in proportions giving in Table 4. The test conditions used are given in Table 5, see Run #9 in this table where Scheme 3 denotes the apparatus in FIG. 3.

This experiment evaluated$^f$ the metal sulfate product concentration and the presence of water/raffinate in the extractant solution with alternative diluent. Additional bench-scale testing showed that incorporating aromatic diluent in extractant phase formulation would yield low water/raffinate entrainment in the extractant solution, thus lower the water/raffinate carry-over into the metal sulfate strippers. The extractant phase formulation with aromatic diluent behaved well in the same process configuration. And the alternative extractant phase formulation performed as expected and significantly decreased the water/raffinate carry-over into the metal sulfate strippers.

The test condition of this experiment was kept at baseline process condition, i.e. 60 seconds mixing residence time, E/A ratio=1/6. Testing with the baseline process condition provided grounds for comparison between different extractant phase formulation and the effect of using different diluent. The formulation with aromatic diluent showed the metal oxide colloids in extractant solution were flowing well and did not create clumps of metal oxide floc. This definitely helped the transfer efficiency of metal oxide colloids into metal sulfate strippers due to the fluidity of the solution. Unfortunately, the process had some water carry-over during part of the experiment, which decreased the metal sulfate concentration. However, once the process was back to steady state condition, the metal sulfate concentration would build up quickly.

This experiment provided grounds for baseline comparison between extractant phase formulation effect with respect to aliphatic and aromatic diluent. This experiment had demonstrated the efficiency of using aromatic diluent for extractant phase formulation. However, aromatic diluent had long term material compatibility problem with the current setup, which provided the basis for determining an optimum extractant phase formulation with proper diluent mix. The optimum extractant phase formulation would have low water/raffinate entrainment in extractant phase while being compatible with easily accessed materials, such as PVC or fiberglass reinforced plastics.

TABLE 4

Extractant phase formulation table with typical minimum and maximum extractant component. The extractant, modifier, and diluent can be referred to Table 3.

Extractant phase Formulation

| Extractant | Volume Percentage (%) | |
| --- | --- | --- |
| Formulation Component | Minimum | Maximum |
| Extractant | 5 | 15 |
| Modifier | 2.3 | 15 |
| Diluent | 70 | 92.7 |

In a broader aspect of the invention the formulations may comprise the following (in volume %):
Extractant: 0.5 minimum to 70 maximum;
Modifier: 0 minimum to 95.5 maximum;
Diluent: 0 minimum to 95.5 maximum.

The important criteria that is required within the narrow or broader material limits is that a floc is formed that separates from the treated aqueous phase and the loaded extractant phase.

Example 8

This example illustrates the determination of oil water separator and extractor setting time and the determination of the acid and base consumption rate during purification of acid mine drainage water using the invention.

Figure 9:
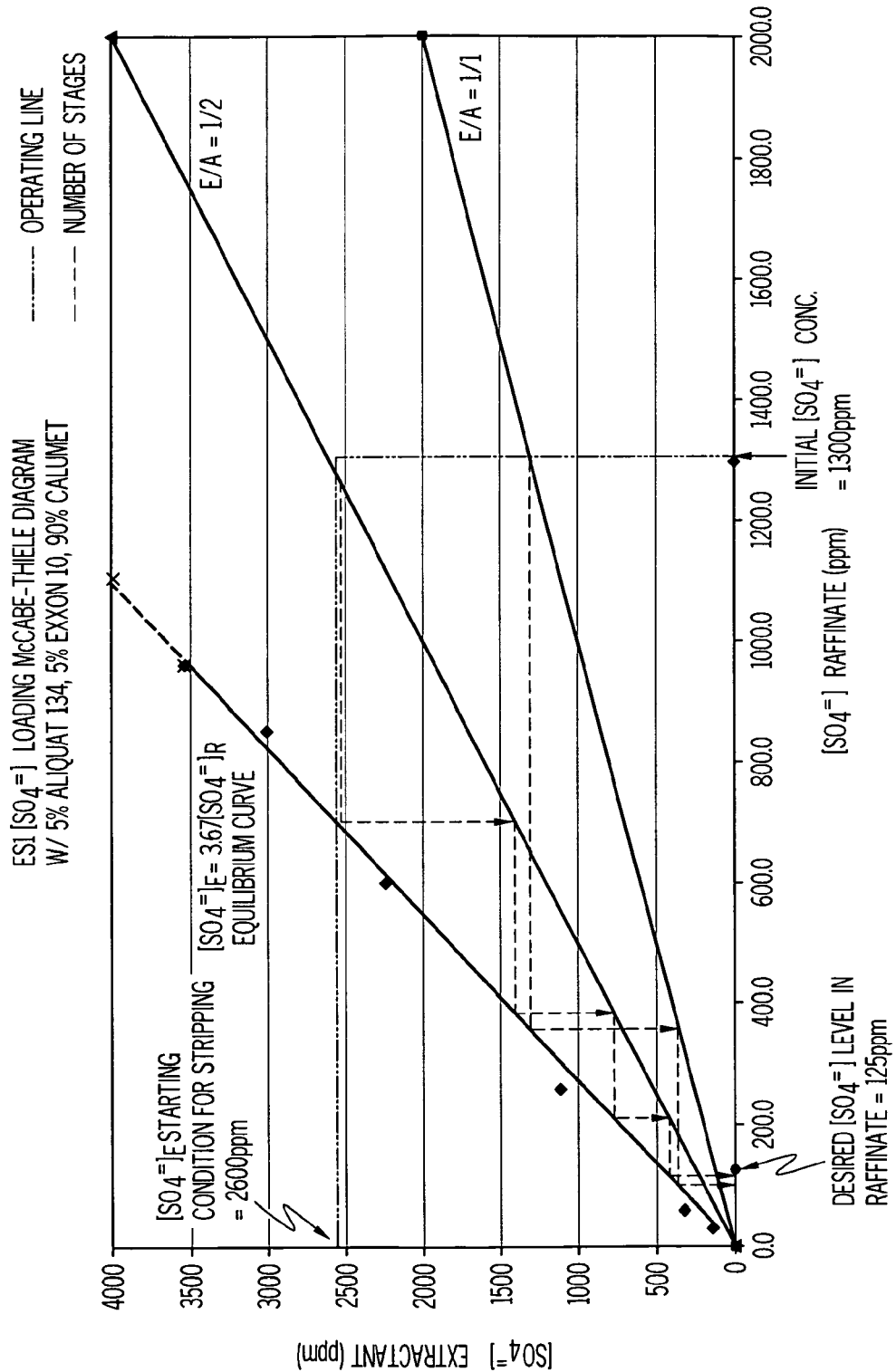
FIG. 9 is a graph showing sulfate loading stages determination from McCabe-Thiele plots with 5 (v/v) % extractant.

The continuous process configuration in FIG. 9 was constructed using clear, chemical resistant PVC for the mixer-settler tanks, which had an internal mixer volume of 180 ml. This allowed the process fluids to have a residence time of 60 seconds with the ETA total (combined) flow rate of 180 ml/min. Additional equipment included, clear Tygon tubing for the piping (0.375" I.D.), Cole-Parmer Instrument Company Master-flex L/S Peristaltic pumps, and Dayton AC-DC series motor mixers. The extractant phase formulation was prepared using 15% (v/v) Aliquat 134®, 15% (v/v) Exxal 10® (Isodecanol), and 70% (v/v) Calumet 400-500 diluent. This diluent is less than 1 wt % aromatics. Other test conditions are given in Table 5.

Relative to example 4, the process alterations made were:
1. The M & N extraction box decanters were replaced with separatory funnels to allow fluid dimensions and sharp phase separator control.

2. The M & N Sulfate product discharge lines fed directly into separate tanks.
3. The M Sulfate decanter was modified by drilling angled holes into the mixer overflow weirs to facilitate a discharge of equal or lesser height of the E1 M Sulfate extractant phase flow.
4. A peristaltic pump was installed to transfer the M, N metal ions (trivalent and divalent) and $SO_4$ loaded extractant phase (s) to the appropriate stripper.
5. The extractant phase to aqueous acid mine drainage/extractant phase ratio was changed to 1:5.
6. An oil/water separator was added to recover any extractant phase lost from the extraction operation to the aqueous raffinate exit stream of the E4 extraction stage.
7. Double wide settler used for E3 and E4 (FIG. 3).
8. To determine the impact of settling time during the extraction operation.

The process was started up, operated, and shut down in the following manner:

Chemical Charging (Start-up): The system was charged with aqueous solutions, with each mixer settler of the process charged with approximately 50% of its respective volume. The strippers were initially charged with 5-50% (w/w) sulfuric acid. The extractant phase regeneration mixer-settlers were charged with a 15% (w/w) sodium carbonate solution. By charging the system in this manner, typically the extractant overflow compartments fill to half full capacity. After this phase of start-up is complete the system was now ready for the extractant phase.

Fresh extractant phase was optimally pre-cleaned prior to first charging to the extraction system by fully acid stripped (0.1 50% v/v $H_2SO_4$, preferable 25%) and then carbonate loaded (15% w/w $Na_2CO_3$ (range 0.5-30%) before being added to the process. Although the introduction of extractant phase is best achieved at the pilot and commercial scale levels using pumps, at the bench/lab scale this can be quickly achieved by pouring the extractant phase into the mixer-settlers to the point of overflow into the settler compartments. After charging the liquid-liquid extraction (LLX) circuit with a sufficient volume of extractant phase, there should be enough extractant phase left in the surge tank so that the process needs are met during normal operation. The total volume of the extractant phase surge tank should be large enough so that it does not overflow during the operation of the LLX process and can be charged with extractant phase when the system is shut down between operations. The steady-state volume of the extractant phase in the surge tank is then monitored visually or electronically with level switches. This should be done periodically so that the extractant phase surge tank volume can be adjusted as needed to maintain sufficient extractant phase volume to provide steady operation over extended periods, for example weeks, months and possibly years. The stirrers for the mixers were then powered up, adjusted and maintained at steady-state by the following procedures.

All of the mixers were set between 700-1700 rotations per minute (rpm). The mixers needed at least 15 minutes to warm up, preferably 30 minutes. During this time the mixers were monitored and adjusted, usually decreasing the rotation rate in order to avoid excessive mixing. Excessive mixing is very undesirable; it can lead to problems such as spatter as well as the formation of fine emulsions that require longer phase coalescence time in the settlers. Although any type of stirring is sufficient enough to mix medium to low viscosity immiscible fluids, disk or fin type stirrer pumps are preferred. They are both designed to pull the two fluids, aqueous and extractant phase, into the mixing compartment from the upstream mixer settlers. The shearing blades of the mixers generate micro droplets that create a very high interfacial surface area that is critical to fast contaminant extraction and strip kinetics. Higher mixing speeds accommodate shorter residence time of the fluid in the mixer and compensate for extractant/aqueous ratios other than 1:1. Although stirrer speeds that result in the mutual blending of only 20% of the two phases is sufficient, a blend of at least 80% is preferred and if optimum conditions can be achieved 95-100%. Excessive mixing is suitable but less preferred if the resultant emulsion formed requires mixing for long periods of time to disengage and break due to exceedingly fine droplet size. Mixing conditions preferred by the invention is about 12-120 seconds, preferably 30-90 seconds, and optimally 45-seconds. The total hydraulic fluid residence time in the apparatus will be the sum total of the volumes of the individual operations of the apparatus, including mixers, settlers, pumps and surge capacity. Due to the low values and/or quantities of the contaminants present in the Acid Mine Drainage water purification process (Fe, Al, Se, Si, Mn, Zn, Ni, Co, Ca, $SO_4^{-2}$), and the very high flow rates of 10-10,000 gal/min (averaging about 500 gal/min, but often variable) of water, conventional metals extraction by LLX is not feasible because of the very large equipment and E/A ratio requirements that would be required for the large aqueous flows involved in water purification. Although the mixing conditions can be either extractant phase continuous or aqueous continuous, the latter is the more typical since special startup conditions are not needed to achieve it.

After this initial loading of strip solutions and the warm up time for the mixers are both complete, the system was now ready for the charging of the Acid Mine Drainage feed water and (the acid mine drainage feed pump was set to 145 ml/min at system start-up) the extractant phase feed streams. The N-extractant (extraction circuit designed to extract+2 metal ions) feed flow rate at system start-up was set to 28 ml/min, and the M-extractant (extraction circuit designed to extract+3 metal ions) feed flow was set at 7.3 ml/min. The extractant surge tank for this process was a 6 L clear chemical resistant PVC tank. Other feed agents are listed in the LLX Test Condition Key in Table 5.

TABLE 5

LLX Test Condition Key
(extractant phase test conditions with extractant formulation selection for each test trial.)
LLX Test Condition Key

| Run # | AMD Flow Rate mL/min | Extractant Flow Rate (N Circuit) mL/min | Extractant Flow Rate (M Circuit) mL/min | E/A Ratio | Mixing Residence Time second |
|---|---|---|---|---|---|
| 1 | 100 | 17 | 8 | 1/6 | 333.6 (640 mL mixer-settler) |
| 3 | 100 | 17 | 8 | 1/6 | 333.6 (640 mL mixer-settler) |

TABLE 5-continued

LLX Test Condition Key
(extractant phase test conditions with extractant formulation selection for each test trial.)
LLX Test Condition Key

| | | | | | |
|---|---|---|---|---|---|
| 4 | 100 | 20 | 5 | 1/5 | 307.2 (640 mL mixer-settler) |
| 5.1 | 100 | 20 | 5 | 1/5 | 90 (180 mL mixer-settler) |
| 5.2 | 145 | 28 | 7.3 | 1/5 | 60 (180 mL mixer-settler) |
| 6.1 | 154 | 26 | N/A | 1/6 | 60 (180 mL mixer-settler) |
| 6.2 | 275 | 35 | N/A | 1/8 | 35 (180 mL mixer-settler) |
| 7 | — | — | — | — | — |
| 8 | 78.1 | 17.9 | N/A | 1/4.35 | 112.5 |
| 9 | 154 | 26 | N/A | 1/6 | 60 |

| Run # | Extractant Formulation | Test Objective | Process Configuration | Note |
|---|---|---|---|---|
| 1 | Aliquat 134: 15% IDA: 15% Calumet: 70% | Basic LLX process evaluation and key parameter range finding | Scheme 1 | |
| 3 | Aliquat 134: 15% IDA: 15% Calumet: 70% | LLX process evaluation | Scheme 1 | Added ceramic milling rods in O/W separator |
| 4 | Aliquat 134: 15% IDA: 15% Calumet: 70% | LLX process evaluation and Determining 15% Na2CO3 consumption rate | Scheme 1 | Added ceramic milling rods in O/W separator; Used sep. funnels as decanters |
| 5.1 | Aliquat 134: 15% IDA: 15% Calumet: 70% | LLX process evaluation and Determining 15% Na2CO3 consumption rate | Scheme 1 | Added air floatation device and ceramic milling rods in O/W separator |
| 5.2 | Aliquat 134: 15% IDA: 15% Calumet: 70% | LLX process evaluation and Determining acid and base consumption rate | Scheme 1 | |
| 6.1 | Aliquat 134: 15% IDA: 15% Calumet: 70% | LLX process evaluation and Determining acid and base consumption rate | Scheme 2 | Run E4 extractant FR at 40 ml/min (pH = 10). Added flotation O/F attachment. |
| 6.2 | Aliquat 134: 15% IDA: 15% Calumet: 70% | LLX process evaluation and key parameter range finding | Scheme 2 | Extractant inlet: E1, E2, and E4. |
| 7 | Aliquat 134: 9.1% IDA: 4.3% Calumet: 86.6% | Statistically designed test to determine "best case" testing condition | Scheme 3 | Changed E1 and E2 to T-shapped mixer-settler (Scheme 3) |
| 8 | Aliquat 134: 9.1% IDA: 4.3% Calumet: 86.6% | LLX process evaluation and key parameter range finding | Scheme 3 | Test condition determined by Run #7 based on maximizing [MSO4] product. |
| 9 | Aliquat 134: 9.1% IDA: 4.3% Aromatic 150: 86.6% | LLX process evaluation with Aromatic diluent and the impact of [MSO4] product | Scheme 3 | Extractant inlet: E1, E2, and E4 |

Figure 10:
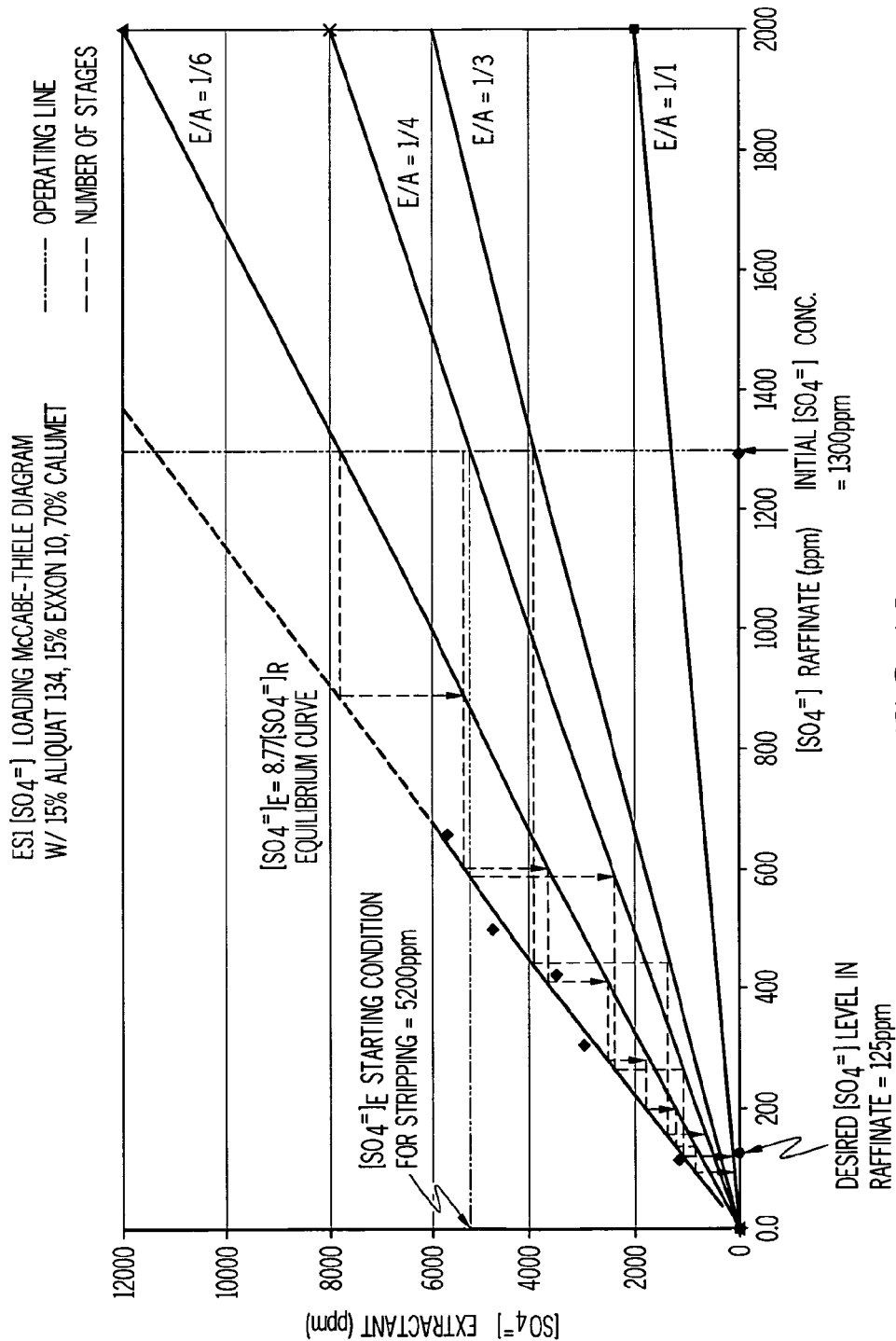
FIG. 10 is similar to FIG. 9 except that sulfate loading stages determinations from McCabe-Thiele plots with 5 (v/v) % extractant are shown.
Figure 11:
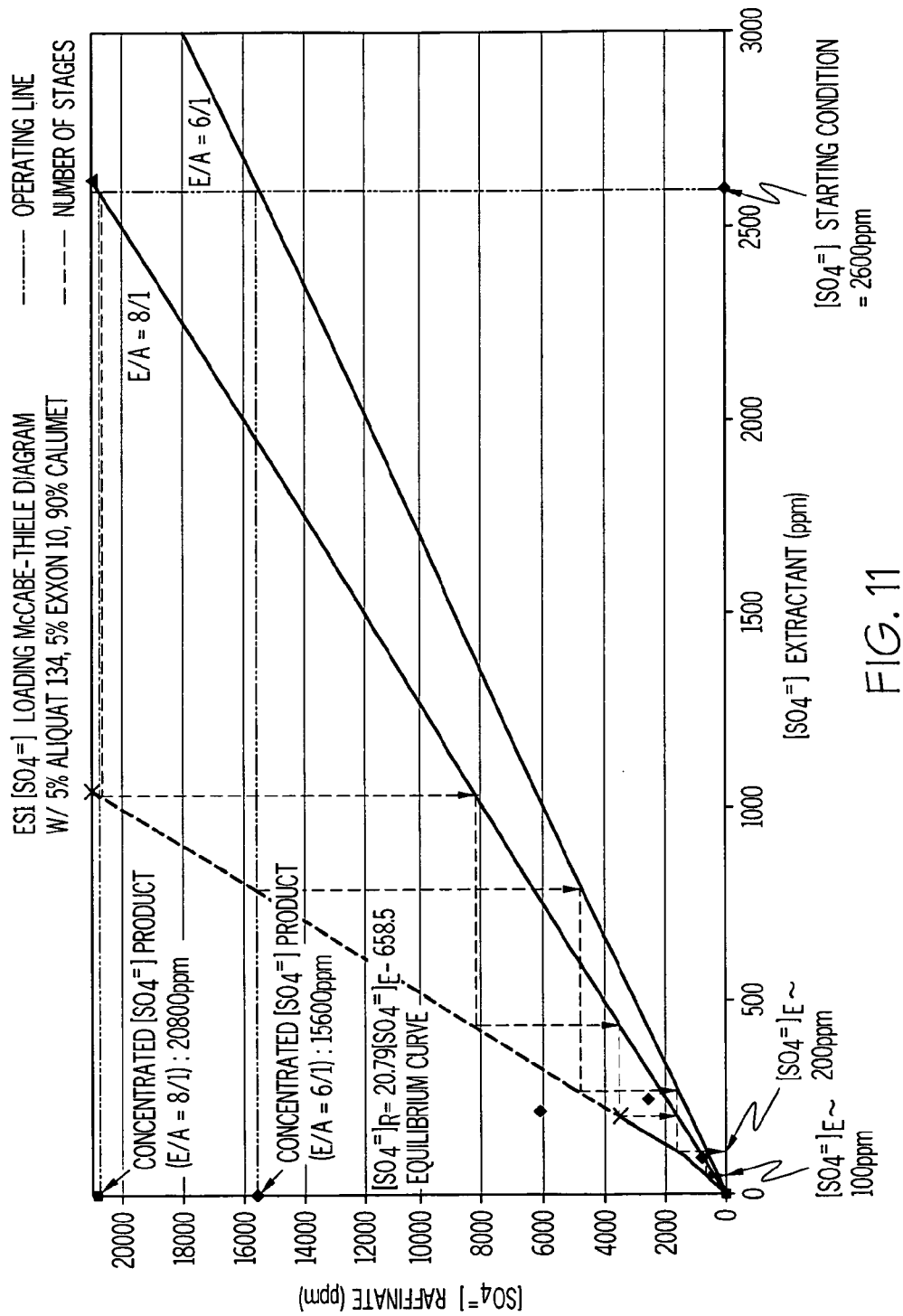
FIG. 11 is a graph showing other conditions for sulfate loading stages determination from McCabe-Thiele plots with 5 (v/v) % extractant.
Figure 12:
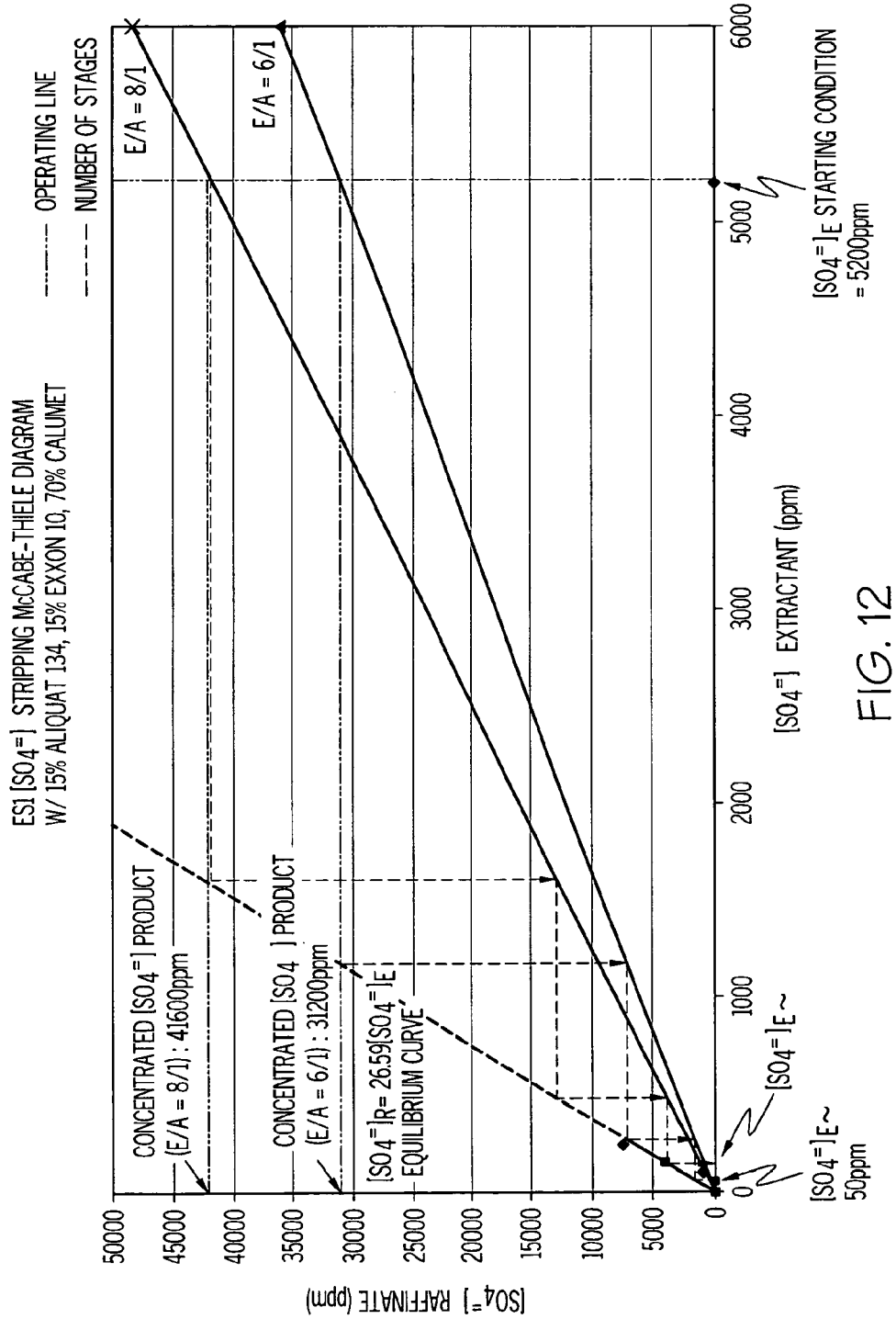
FIG. 12 is similar to FIG. 11 except that sulfate loading stages determinations from McCabe-Thiele plots with 5 (v/v) % extractant are shown.

Operation, Control, Monitoring (Approaching and Maintaining Steady-State):

The process was run for approximately 20 hours to insure steady-state concentration was reached. This amount of time gives the extractant phase enough time to cycle through the process hardware at least 3 times (6 L of extractant phase with surge tank and regenerates the extractant phase leaving it 15 ml/min). The extractant phase contacts the feed first during the metal and sulfate ion extraction stage and then the metals are stripped with sulfuric acid (initially 50% v/v $H_2SO_4$). After the metal ion strip stage the extractant was regenerated using counter-current flow with 15% w/w $Na_2CO_3$ to strip the sulfate ions and regenerates the extractant phase leaving it ready for use again. The extractant phases flow scheme is illustrated in FIG. 10.

Once the extractant has had enough time to cycle through the system, at least once, approximately 80% of the extractant phase stays within the system and the remaining 20% stays in the surge tank. The fact that the apparatus can be turned off and on quickly is an important operational advantage. Occasionally the system was put in "idle" mode (parked) until certain controls or hardware could be made or addressed chemical additions could be added, or any maintenance issue could be addressed. When this was done all of the feed pumps were shut off and the mixers were allowed to continue to circulate the process fluids in the mixer-settler. For example, for this test the process was parked for the following reasons: extractant phase in E1D was too thin. The E1D decanter, with the drilled holes, allowed the aqueous phase at a pH of 3.35 to enter the S1M stripper, the S1M and S2M mixer settlers became aqueous flooded causing the combined extractant and aqueous phases from S2M to enter S1-SO4 causing it to contain too much aqueous phase. Once the process reaches steady-state, data readings were collected and samples were taken long enough without upset of steady-state conditions to achieve steady-state (three (3) turnovers of extractant phase in the system).

Sampling and Data Collection: The samples for this test were collected from the metal ion and sulfate ion strip and extraction settlers, as well as from the acid mine drainage feed and raffinate discharge lines (E1, E2, E3, E4, S1M, S2M. S1N, S2N, S1SO4, S2SO4, S3SO4, S4SO4, Feed-Raffinate). Only aqueous phases were sampled.

TABLE 6

Analytical result from Run #6.1 with 60 seconds mixing residence time and E/A ratio of 1/6.

Run #6.1: 60 Second Mixing, E/A = 1/6

|  | Sample Position Sample Unit | Sulfate ppm | Magnesium ppm | Aluminum ppm | Silicon ppm | Calcium ppm | Iron (total) ppm | Manganese ppm | Cobalt ppm | Nickle ppm | Zinc ppm |
|---|---|---|---|---|---|---|---|---|---|---|---|
| Average Data | AMD Stream | 2512 | 142.1 | 1.204 | 5.623 | 152.2 | 234.0 | 78.77 | 0.9494 | 0.8324 | 1.633 |
|  | Std. Dev. | 1180 | 2.6 | 1.311 | 0.207 | 3.6 | 9.0 | 5.16 | 0.0316 | 0.0229 | 0.315 |
|  | Concentrated Sulfate Product Stream | 209982 | 39.55 | 14.25 | 10.25 | 81.35 | 495.6 | 99.82 | 1.931 | 1.584 | 8.138 |
|  | Std. Dev. | 121274 | 3.91 | 8.18 | 6.73 | 55.40 | 853.4 | 100.63 | 2.454 | 2.017 | 4.179 |
|  | Concentration Factor | >80x | N/A | N/A | N/A | N/A | N/A | N/A | N/A | N/A | N/A |
|  | Metal (II) Sulfate Product Stream | 58728 | 136.9 | 12.07 | 12.13 | 178.7 | 693.5 | 162.1 | 2.922 | 2.420 | 2.499 |
|  | Std. Dev. | 27799 | 4.0 | 11.19 | 8.75 | 37.2 | 775.9 | 110.7 | 2.461 | 2.031 | 0.221 |
|  | Concentration Factor | N/A | N/A | >10x | >2x | >1x | >2x | 2x | >3x | >2x | >1.5x |
|  | Purified Stream | 41.63 | 134.5 | <0.1 | <2.5 | <10 | <0.25 | 8.936 | <0.01 | <0.01 | N/A |
|  | Std. Dev. | 17.55 | 4.8 | 1.032 | 0.491 | 14.55 | N/A | 4.596 | 0.0043 | 0.0571 | N/A |
| Target Performance | Minimum Achievement | <500 | <120 | <1 | — | <300 | <1 | <1 | — | — | — |
| Acheivement in Purified Stream | Drinking Water Standard | ≤250 | ≤80 | ≤0.2 | — | ≤150 | ≤0.3 | ≤0.3 | — | — | — |
|  | Phase 2 Screening Objective | ≤125 | ≤40 | ≤0.1 | — | ≤125 | ≤0.15 | ≤0.15 | — | — | — |

TABLE 7

Results from Run #6.2 with 35 seconds mixing residence time and E/A ratio of 1/8

Run #6.2: 35 Seconds Mixing, E/A = 1/8

|  |  | Sample Position | | | | | | | | | | |
|---|---|---|---|---|---|---|---|---|---|---|---|---|
|  | Sample Unit | Sulfate ppm | Magnesium ppm | Aluminum ppm | Silicon ppm | Calcium ppm | Iron (total) ppm | Manganese ppm | Cobalt ppm | Nickle ppm | Zinc ppm | *O/G Analysis mg/L |
| Average Data | AMD Stream | 1713 | 155.3 | 0.7332 | 5.661 | 151.7 | 239.9 | 84.12 | 0.957 | 0.8159 | 1.444 | N/A |
|  | Std. Dev. | 105 | 6.5 | 0.5024 | 0.243 | 1.1 | 12.7 | 2.52 | 0.044 | 0.0309 | 0.133 | N/A |
|  | Concentrated Sulfate Product Stream | 236571 | 36.64 | 4.833 | 11.10 | 70.02 | 599.8 | 57.70 | 1.054 | 0.9989 | 2.218 | N/A |
|  | Std. Dev. | 64000 | 16.88 | 2.928 | 2.56 | 36.88 | 257.0 | 42.44 | 0.741 | 0.5827 | 1.246 | N/A |
|  | Concentration Factor | >130x | N/A | N/A | N/A | N/A | N/A | N/A | N/A | N/A | N/A | N/A |
|  | Metal (II) Sulfate Product Stream | 77392 | 184.3 | 18.49 | 18.31 | 327.0 | 1388 | 301.1 | 4.932 | 4.085 | 8.974 | N/A |
|  | Std. Dev. | 58097 | 25.8 | 12.49 | 8.52 | 120.5 | 863 | 141.5 | 2.466 | 1.991 | 5.671 | N/A |
|  | Concentration Factor | >55x | N/A | >25x | >3x | >2x | >5x | >3x | >5x | >5x | >6x | N/A |
|  | Purified Stream | 1605 | 136.3 | <0.1 | 3.811 | 70.73 | 126.5 | 19.48 | 0.2642 | 0.2392 | <1 | 9.5 |
|  | Std. Dev. | 1201 | 19.4 | N/A | 0.784 | 38.56 | 56.5 | 28.31 | 0.4044 | 0.3455 | N/A | N/A |
| Target Performance | Minimum Achievement | <500 | <120 | <1 | — | <300 | <1 | <1 | — | — | — | — |
| Acheivement in Purified Stream | Drinking Water Standard | ≤250 | ≤80 | ≤0.2 | — | ≤150 | ≤0.3 | ≤0.3 | — | — | — | — |
|  | Phase 2 Screening Objective | ≤125 | ≤40 | ≤0.1 | — | ≤125 | ≤0.15 | ≤0.15 | — | — | — | 10.00 |

*O/G analysis refers to oil/grease analysis

TABLE 8

Run #8 Results with 112.5 seconds mixing residence time and E/A ratio of 1:4.35

Run #8: 112.5 Second Mixing, E/A = 1/4.35

| | | Sample Position | | | | | | | | | | |
|---|---|---|---|---|---|---|---|---|---|---|---|---|
| | Sample Unit | Sulfate ppm | Magnesium ppm | Aluminum ppm | Silicon ppm | Calcium ppm | Iron (total) ppm | Manganese ppm | Cobalt ppm | Nickle ppm | Zinc ppm | *O/G Analysis mg/L |
| Average Data | AMD Stream | 1665 | 171.8 | 2.298 | 4.645 | 133.1 | 199.9 | 87.12 | 0.9517 | 0.8471 | 1.579 | N/A |
| | Std. Dev. | 87.77 | 1.9 | 0.245 | 0.102 | 3.7 | 6.1 | 0.71 | 0.0067 | 0.0149 | 0.162 | N/A |
| | Concentrated Sulfate Product Stream | 131976 | 22.72 | 2.036 | 7.846 | 33.77 | 56.24 | 26.23 | 0.3500 | 0.3309 | 0.8110 | N/A |
| | Std. Dev. | 12403 | 16.52 | 2.028 | 2.081 | 27.63 | 65.11 | 35.68 | 0.4150 | 0.3459 | 0.5477 | N/A |
| | Concentration Factor | >80x | N/A | N/A | N/A | N/A | N/A | N/A | N/A | N/A | N/A | N/A |
| | Metal (II) Sulfate Product Stream | 256314 | 193.2 | 21.17 | 20.65 | 423.7 | 2174 | 693.5 | 8.236 | 7.258 | 13.139 | N/A |
| | Std. Dev. | 182848 | 24.6 | 16.19 | 11.87 | 164.0 | 1415 | 446.7 | 5.689 | 5.106 | 8.923 | N/A |
| | Concentration Factor | N/A | N/A | >5x | >2x | >1x | >3x | >1.5x | >3x | >2x | >1.5x | N/A |
| | Purified Stream | 80.71 | 148.8 | <0.1 | <2.5 | <10 | <0.25 | 0.0800 | <0.01 | <0.01 | 0.0741 | 27.6 |
| | Std. Dev. | 74.93 | 8.2 | N/A | N/A | N/A | N/A | 0.0761 | N/A | N/A | 0.0338 | N/A |
| Target Performance Acheivement in Purified Stream | Minimum Achievement | <500 | <120 | <1 | — | <300 | <1 | <1 | — | — | — | — |
| | Drinking Water Standard | ≤250 | ≤80 | ≤0.2 | — | ≤150 | ≤0.3 | ≤0.3 | — | — | — | — |
| | Phase 2 Screening Objective | ≤125 | ≤40 | ≤0.1 | — | ≤125 | ≤0.15 | ≤0.15 | — | — | — | 10.00 |

Run #8 Test Condition:

E/A in E1, E2E3, E4 = 1/4.35

Mixing residence time = 112.5 seconds

Extractant formula: 9.1% Aliquat 134, 4.3% Exxal 10, 86.6% Calumet 400-500

*O/G analysis result is from Lancaster Laboratory

TABLE 9

Results for Run #9 with 60 seconds mixing residence time and E/A ratio of 1/6.

Run #9: 60 Second Mixing, E/A = 1/6

| | | Sample Position | | | | | | | | | | |
|---|---|---|---|---|---|---|---|---|---|---|---|---|
| | Sample Unit | Sulfate ppm | Magnesium ppm | Aluminum ppm | Silicon ppm | Calcium ppm | Iron (total) ppm | Manganese ppm | Cobalt ppm | Nickle ppm | Zinc ppm | *O/G Analysis mg/L |
| Average Data | AMD Stream | 1535 | 161.1 | 2.424 | 6.275 | 133.4 | 193.9 | 84.89 | 0.9609 | 0.8491 | 1.446 | N/A |
| | Std. Dev. | 84 | 2.5 | 0.092 | 0.268 | 2.0 | 2.2 | 1.66 | 0.0161 | 0.0168 | 0.033 | N/A |
| | Concentrated Sulfate Product Stream | 155455 | 9.572 | 0.1947 | 8.571 | 14.26 | 17.08 | 3.122 | 0.0366 | 0.0653 | 0.6134 | N/A |
| | Std. Dev. | 9426 | 0.881 | 0.0128 | 0.337 | 1.30 | 3.26 | 0.589 | 0.0018 | 0.0115 | 0.0701 | N/A |
| | Concentration Factor | >100x | N/A | N/A | N/A | N/A | N/A | N/A | N/A | N/A | N/A | N/A |
| | Metal (II) Sulfate Product Stream | 217119 | 131.0 | 14.42 | 24.27 | 224.1 | 1541 | 404.3 | 5.994 | 5.114 | 9.370 | N/A |
| | Std. Dev. | 81856 | 7.3 | 5.37 | 7.01 | 40.1 | 547 | 143.1 | 2.284 | 1.965 | 3.435 | N/A |
| | Concentration Factor | N/A | N/A | >5.5x | >3x | >1x | >7.5x | >4.5x | >6x | >6x | >6x | N/A |
| | Purified Stream | 19.48 | 136.7 | <0.1 | <2.5 | <10 | <0.25 | 0.489 | <0.01 | <0.01 | 0.0467 | 133.0 |
| | Std. Dev. | 15.05 | 0.8 | N/A | N/A | N/A | N/A | 0.279 | N/A | N/A | 0.0530 | N/A |

TABLE 9-continued

Results for Run #9 with 60 seconds mixing residence time and E/A ratio of 1/6.

Run #9: 60 Second Mixing, E/A = 1/6

| | | Sample Position | | | | | | | | | |
|---|---|---|---|---|---|---|---|---|---|---|---|
| | Sample Unit | Sulfate ppm | Magnesium ppm | Aluminum ppm | Silicon ppm | Calcium ppm | Iron (total) ppm | Manganese ppm | Cobalt ppm | Nickle ppm | Zinc ppm | *O/G Analysis mg/L |
| Target Performance | Minimum Acheivement | <500 | <120 | <1 | — | <300 | <1 | <1 | — | — | — | — |
| Acheivement in Purified Stream | Drinking Water Standard | ≤250 | ≤80 | ≤0.2 | — | ≤150 | ≤0.3 | ≤0.3 | — | — | — | — |
| | Phase 2 Screening Objective | ≤125 | ≤40 | ≤0.1 | — | ≤125 | ≤0.15 | ≤0.15 | — | — | — | 10.00 |

Run #9 used an aromatic diluent instead of aliphatic.
9 Test Condition:
E/A in E1, E2, E3, E4 = 1/6
Mixing residence time = 60 seconds
Extractant formula: 9.1% Aliquat 134, 4.3% Exxal 10, 86.6% Aromatic 150
*O/G analysis result is from Lancaster Laboratory Example 9

This example illustrates potassium sulfate ($K_2SO_4$) product production. The sulfate concentrate was collected from the S1-SO4 exit stream of the operating unit (see FIG. 17) to purify acid mine drainage water (see Table 2B and 2C) and to determine whether $K_2SO_4$ solid might be prepared without formation of system damaging $K_2SO_4$ crystals, which are very hard and adherent. Initially, a test was conducted to determine the details of the $K_2SO_4$ isolation process. For this test, a graduated cylinder was weighed and used to collect approximately 300 mL of the sulfate concentrate. The concentrate that was collected was produced from the low Al acid mine drainage water (Table 2C). The weight and volume of the sulfate concentrate was recorded and used to calculate the density of the concentrate. A 20 mL sulfate concentrate sample was collected for carbonate and sulfate analysis to determine the initial carbonate and sulfate concentrations. To achieve $K_2SO_4$ crystallization, $K_2CO_3$(s) was added to the concentrate. Since it is desired to have a recycle solution that is 5.5 wt % $K_2CO_3$ and 6.5 wt % $K_2SO_4$ to enable generation of solution that could be recycled directly back to stage S2-SO4 unit of the sulfate strip circuit without further treatment, approximately 82.5 g $K_2CO_3$(s) was added to the sulfate concentrate in five 16.5 g increments. The solution was mixed using a stir bar and the mixing time, settling time, color, and temperature observations were recorded. It was observed that crystallization of a white solid occurs immediately after $K_2CO_3$(s) addition and the increase in temperature is barely noticeable. Once the crystals settled, gravity filtration was employed to capture the fine white crystals. A 5μ filter bag was used to filter the solution and the filtrate was collected in a beaker. It was noted that the solution filtered quickly through the bag and that the filtrate was a clear, yellow solution. The yellow color is due to trace Fe contamination and is of no consequence. The weight and volume of the filtrate was recorded and used to calculate the density of the filtrate. A 20 mL filtrate sample was collected for carbonate and sulfate analysis to determine the carbonate and sulfate concentrations after $K_2CO_3$(s) addition and filtration. The wet, ivory-colored solid was scraped out of the filter bag, weighed, and collected in a small vial. For the 300 mL sulfate concentrate collected, 1.05 g of ivory-colored solid $K_2SO_4$ was produced.

Example 10

The production process of Example 9 was scaled up 10-fold to investigate the $K_2SO_4$ yield with excess $K_2CO_3$(s). For this scale-up process, a 4 L beaker was weighed and used to collect approximately 3 L of the sulfate concentrate from the F-LLX operation. The weight and volume of the concentrate was recorded and used to determine the density of the sulfate concentrate. A 20 mL sulfate concentrate sample was collected for carbonate and sulfate analysis to determine the initial carbonate and sulfate concentrations. To achieve $K_2SO_4$ crystallization, approximately 825.0 g $K_2CO_3$(s) was added to the sulfate concentrate in five 165.0 g increments. The solution was mixed using a stir bar and the mixing time, settling time, color, and temperature observations were recorded. It was observed that crystallization of a white solid occurs immediately after $K_2CO_3$(s) addition and the increase in temperature is barely noticeable. Once the crystals settled, vacuum filtration was employed to isolate the white crystals. A Buchner funnel, filter paper, and pump were used to filter the solution and the filtrate was collected in a 4 L flask. It was noted that the solution filtered quickly and that the filtrate was a clear, yellow solution. The weight and volume of the filtrate was recorded and used to calculate the density of the filtrate. A 20 mL filtrate sample was collected for carbonate and sulfate analysis to determine the carbonate and sulfate concentrations after $K_2CO_3$(s) addition and filtration. The wet, ivory-colored solid was allowed to air dry for a few hours, scraped off the filter paper, weighed, and collected in a sample jar. A 2.0 g non-hygroscopic solid sample was collected to determine the moisture content of the solid. When running the low aluminum AMD water (see Table 2B), for every 3 L of sulfate concentrate processed, approximately 66.78 g $K_2SO_4$ is produced.

Additional gravity filtration tests were conducted to determine which filter bag pore size would work best. For these tests, the following pore sizes were evaluated: 1 μm, 5 μm, and 25 μm. In addition, the amount of $K_2CO_3$(s) was varied to determine whether the same yield could be achieved using less $K_2CO_3$(s). In the first round of testing, a 4 L beaker was weighed and used to collect approximately 3 L of the sulfate concentrate from the F-LLX pilot unit. The concentrate that was collected was produced from the high Al acid mine drainage water (Table 2C). The weight and volume of the concentrate was recorded and used to determine the density of the sulfate concentrate. A 20 mL sulfate concentrate sample was collected for carbonate and sulfate analysis to determine the initial carbonate and sulfate concentrations. Approximately 90.0 g of $K_2CO_3$(s) was added to the sulfate concentrate and the solution was mixed using a stir bar. The 3 L solution was divided into (3) 1 L portions and each 1 L portion went through a separate filter bag. A peristaltic pump was used to pump the 1 L solution into each filter bag. For the 1 μm filtration, the 1 L solution was divided into two segments: 420 mL and 580 mL. The 420 mL solution was pumped to the filter bag at 70 mL/min and the remaining 580 mL was pumped at 580 mL/min. For the 5 μm filtration, the 1 L solution was divided into two 500 mL portions and each portion was pumped into the filter bag at 500 mL/min. For the 25 μm filtration, the 1 L solution was pumped at 1000 mL/min. The pumping times for each filtration were recorded along with draining times and observations about the filtrate and filtration process. For each filtration, a 20 mL filtrate sample was collected for carbonate and sulfate analysis to determine the carbonate and sulfate concentrations. If any solids were present, the wet, tan-colored solid was scraped out of the filter bag, weighed, and collected in a jar. The results of each filtration are displayed in Table 10 and the analytical results are displayed in Tables 11A and 11B.

TABLE 10

Gravity Filtration Data

| Filter pore size | Amount of $K_2CO_3(s)$ | Concentrate Volume | Filtration Time | Filtrate Observations | Amount Solid Collected |
|---|---|---|---|---|---|
| 1 μm | 90.0 g | 1 L | 14 min 18 sec | Colorless solution, small amount of white solids | 7.69 g |
| 5 μm | 90.0 g | 1 L | 23 min | Light orange solution, small amount of white solids | 9.39 g |
| 25 μm | 90.0 g | 1 L | 5 min | Cloudy orange solution, large amount of white solids | 0.00 g |

TABLE 11A

Carbonate Analysis

| Sample ID/ (Porosity) | Sample Volume (mL) | Initial pH of sample | Equivalents to pH 8.3 (eq/L) | Equivalents to pH 4.5 (eq/L) | Sample Density (g/mL) | % $K_2CO_3$ (w/w) |
|---|---|---|---|---|---|---|
| K2SO4 Conc. | 2.000 | 3.53 | x | x | 1.0853 | x |
| Filtrate (1 μm) | 0.400 | 10.62 | 0.19 | 0.45 | 1.1075 | 3.83 |
| Filtrate (5 μm) | 0.400 | 10.75 | 0.19 | 0.43 | 1.1018 | 3.65 |
| Filtrate (25 μm) | 0.400 | 10.59 | 0.20 | 0.44 | 1.1058 | 3.67 |

TABLE 11B

Sulfate Analysis

| Sample ID/ (Porosity) | Dilution | Sample Volume (μL) | Observed mg/L | Calculated mg/L | Actual mg/L | mol/L of K2SO4 |
|---|---|---|---|---|---|---|
| K2SO4 Conc. | 1000 | 50.0 | 49.5 | 51.1 | 51100 | 0.293 |
| Filtrate (1 μm) | 1000 | 50.0 | 44.5 | 45.8 | 45800 | 0.263 |
| Filtrate (5 μm) | 1000 | 50.0 | 44 | 45.2 | 44000 | 0.252 |
| Filtrate (25 μm) | 1000 | 50.0 | 43.7 | 44.9 | 43700 | 0.251 |

Based upon the experiment data, it is clear that the 1μ and 5μ filter bags would perform well in the field. In the second round of testing, the 1μ filter bag was used and the amount $K_2CO_3(s)$ was increased from 90.0 g per 3 L of sulfate concentrate to 180.0 g per 3 L of sulfate concentrate to increase the yield of solid $K_2SO_4$. In addition, the sulfate concentrate was pumped to the filter bag in three 3 L additions at 1000 mL/min. The first two 3 L solutions were pumped directly to the filter bag while mixing and the last 3 L solution was mixed and allowed to settle before being pumped to the filter bag. The pumping times for each filtration were recorded along with draining times and observations about the filtrate and filtration process. For each filtration, a 20 mL filtrate sample was collected for carbonate and sulfate analyses. If any solids were present, the wet, tan-colored solid was scraped out of the filter bag, weighed, and collected in a jar. A 2.0 g solid sample was collected to determine the moisture content of the solid. The results of each filtration are displayed in Table 12 and the analytical results are displayed in Tables 13a and 13b below. In Table 14, the moisture content results are displayed.

TABLE 12

Gravity Filtration Results-1μ Filter bag

| Concentrate Volume | Amount of $K_2CO_3$(s) | Filtration Time | Filtrate Observations | Total Amount of Solid Collected |
|---|---|---|---|---|
| 3 L | 180.0 g | 32 min 38 sec | Colorless solution, very few white solids | |
| 3 L | 180.0 g | 24 min | Colorless solution, very few white solids | |
| 3 L | 180.0 g | 25 min 20 sec | Colorless solution, very few white solids | 284.43 g (per 9 L concentrate) |

TABLE 13A

Carbonate Analysis-1μ Filter bag

| Sample ID Concentrate/ Volume | Sample Volume (mL) | Initial pH of sample | Equivalents to pH 8.3 (eq/L) | Equivalents to pH 4.5 (eq/L) | Sample Density g/mL | % $K_2CO_3$ (w/w) |
|---|---|---|---|---|---|---|
| Filtrate $1^{st}$/3 L | 0.400 | 10.85 | 0.41 | 0.88 | 1.1075 | 7.19 |
| Filtrate $2^{nd}$/3 L | 0.400 | 10.86 | 0.41 | 0.86 | 1.1100 | 6.94 |
| Filtrate $3^{rd}$/3 L | 0.400 | 10.86 | 0.45 | 0.95 | 1.1161 | 7.71 |
| Supernatant $3^{rd}$/3 L | 0.400 | 10.84 | 0.41 | 0.88 | 1.1134 | 7.23 |

TABLE 13B

Sulfate Analysis-1μ Filter bag

| Sample ID/ Volume | Dilution | Observed mg/L | Calculated mg/L | Actual mg/L | mol/L of K2S04 |
|---|---|---|---|---|---|
| Filtrate $1^{st}$ 3 L | 1000 | 37.1 | 49.2 | 49200 | 0.282 |
| Filtrate $2^{nd}$ 3 L | 1000 | 37.3 | 49.4 | 49400 | 0.283 |
| Filtrate $3^{rd}$ 3 L | 1000 | 36.9 | 48.9 | 48900 | 0.281 |
| Supernatant $3^{rd}$ 3 L | 1000 | 38.0 | 50.3 | 50300 | 0.289 |

TABLE 14

Moisture Content Results

| Sample ID | Tare Weight (g) | Initial Weight (g) (tare + solid) | Initial Solid Wt. (g) | Final Weight (g) (tare + solid) | Final Wt. (g) (solid) | % Moisture |
|---|---|---|---|---|---|---|
| A1 | 0.9868 | 2.4139 | 1.4271 | 2.2346 | 1.2478 | 12.56 |
| A2 | 1.0188 | 2.5639 | 1.5451 | 2.3583 | 1.3395 | 13.31 |
| B1 | 1.0224 | 2.4077 | 1.3853 | 2.1975 | 1.1751 | 15.17 |
| B2 | 1.0190 | 2.6346 | 1.6156 | 2.3693 | 1.3503 | 16.42 |
| C1 | 1.0094 | 1.7719 | 0.7625 | 1.5222 | 0.5128 | 32.75 |
| C2 | 1.0206 | 1.6979 | 0.6773 | 1.4789 | 0.4583 | 32.33 |

(Samples were weighed, dried overnight @ 105° C. without vacuum, cooled in a desiccator, and then reweighed.)

Example 11

$K_2SO_4$(s) Process Control Methods

This example determined the range of process conditions in which $K_2SO_4$(s) could be continuously produced without forming an adherent scale in the process and the procedures to use to control sulfate solid formation and avoid a temporary shut down.

Precipitation of potassium sulfate in the sulfate circuit is a concern because the process is based on liquid-liquid extraction and solids formation could plug piping causing a maintenance action or even temporary shut down for water washing recovery of the stripper (most likely S1-SO4 stage and E-phase over-flow lines from the last metal sulfate strip unit (normally S2M or S3M or wash unit), to S1-SO4, then S1-SO4 to S2-SO4). During initial experiments, the $K_2SO_4$(s) hard crystals plugged up the system and made the equipment inoperable. The operation had to be temporarily shut down and partially disassembled to remove the solid build-up.

The potassium sulfate crystallization reaction is shown as follows:

$$2K^+(aq) + SO_4^{2-}(aq) \longleftrightarrow K_2SO_4(S) \qquad (20)$$

The solubility of potassium sulfate at ambient room temperature is approximately 10.7% by weight or 0.672 M when stoichiometric amounts of potassium and sulfate ions are present. The literature data indicates that $K_2SO_4$ solubility is decreased more by having excess $K^+$ ion than by reducing temperature. Hence, we took this route to devise a $K_2SO_4$ solid production process.

The solubility product expression for the reaction was calculated from:

$$K_{sp}^{K_2SO_4} = [K^+]^2[SO_4^{2-}] \qquad (21)$$

Using the literature solubility data, the solubility product constant, $K_{sp}$, was calculated to be 1.212 M. By rearranging this equation, the sulfate ion concentration can be calculated using $$[SO_4^{2-}]_{max} = \frac{K_{sp}^{K_2SO_4}}{[K^+]^2} \quad (22)$$

This equation shows that the sulfate ion concentration is set by the solubility of $K_2SO_4$(s) and the sulfation solubility is set by the potassium ion concentration which means that the potassium and sulfate ion concentrations m need to be monitored in the sulfate circuit, especially in S1-SO4 and S2-SO4 aqueous phases to avoid exceeding the $K_2SO_4$ solubility in the process which would lead to the operating problems described above. Therefore, the AMD treatment unit was operated at approximately 6-8% potassium carbonate by weight fed to S4-SO4 to prevent crystallization of solids to avoid potential problems such as plugging of the lines within the system, although 9% is still effective.

By keeping the potassium ion concentration constant across the sulfate strippers, the sulfate max was controlled at 80-90% of $1.212(K^+)^2$. The potassium ion concentration is set by the $K_2SO_4$ harvest filtrate which was set to 5.5% $K_2CO_3$ (0.500 M) and 6.5% $K_2SO_4$ (0.392 M). The maximum sulfate concentration tolerable can be calculated based upon the filtrate potassium ion concentration using Equation 22. This sulfate ion maximum concentration limits the amount of sulfate ion that can be acquired in the sulfate strippers and therefore can be used to prevent unwanted premature crystallization. It is possible to control the potassium ion concentration by controlling the sulfate and carbonate ion concentrations as seen by the charge balance in Equation 23.

$$[+]=[-]$$

$$[K^+]=2[SO_4^{2-}]+2[CO_3^{2-}]+[HCO_3^-] \quad (23)$$

The carbonate and bicarbonate concentrations are related by $pK_a$ and can be determined by alkalinity titration to pH 8.3 and then to pH 4.5, respectively using standard HCR solution. By deriving the bicarbonate and carbonate concentration equations, the potassium ion concentration can be calculated as shown by Equation 24.

$$[K^+]=2[SO_4^{2-}]+[2(V_{HCl}^{pH\to8.3})(N_{HCl})]+ [(V_{HCl}^{pH8.3\to4.5})(N_{HCl})-(V_{HCl}^{pH8.3\to}(N_{HCl})] \quad (24)$$

By inserting Equation 24 into Equation 22, the process control Equation 25 was developed where $K_{sp}^{K_2SO_4}=1.212M^3$.

$$[SO_4^{2-}]_{Max} = \frac{K_{sp}^{K2SO4}}{\left[(2[SO_4^{2-}]) + \left[N_{HCl}(2 \cdot V_{HCl}^{pH\to8.3})\right + \left(V_{HCl}^{pH8.3\to4.5} - V_{HCl}^{pH8.3\to}\right)\right]\right]^2} \quad (25)$$

Therefore a control method includes one or more of the below:

1. Minimize the $K^+$ exposure to the process using the process control Equation 25.
2. Purge S1-SO4 aqueous phase at a rate to maintain $(SO_4^{2-})_{sample}$ at 80-90% of $(SO_4^{2-})_{max}$.
3. Be sure that none of the aqueous streams in the sulfate circuit exceeds the comfort safety factor of 80-90% of $(SO_4^{2-})_{max}$
4. Add $K_2CO_3$ (aq) to S4-SO4 such that S3-SO4 and S4-SO4 aqueous phases are ≤70% of $(SO_4^{2-})_{max}$ and ≤1% of $(SO_4^{2-})_{max}$ respectively.
5. Because the operating window is narrow (about 10% percent), each batch of filtrate should be assayed prior to introduction to the operation at the S2-SO4 point.

While the forms of the invention herein disclosed constitute presently preferred embodiments, many others are possible. It is not intended herein to mention all of the possible equivalent forms or ramifications of the invention. It is to be understood that the terms used herein are merely descriptive, rather than limiting, and that various changes may be made without departing from the spirit of the scope of the invention.

We claim:

1. A method for treating a first aqueous solution to remove at least one metal ion and at least one anion from the first aqueous solution, comprising:
   (a) mixing the first aqueous solution with an extractant phase to form a first unstable emulsion having an equilibrium pH of about 2 to about 12, wherein the extractant phase comprises:
      (i) an extractant that forms a floc with the at least one metal ion and the at least one anion, wherein the extractant comprises a positively charged molecule having at least 8 carbon atoms, and an anionic base;
      (ii) an optional diluent; and
      (iii) an optional modifier for modifying phase disengagement;
   (b) disengaging a first treated aqueous phase and a first loaded extractant phase from the first unstable emulsion, wherein a floc is present in the first loaded extractant phase;
   (c) separating the first loaded extractant phase from the first treated aqueous phase, wherein the at least one metal ion and the at least one anion are present in the first loaded extractant phase; and
   further comprising stripping the metal ions from the first loaded extractant phase by:
   (d) mixing the first loaded extractant phase with an aqueous acid solution to form a second unstable emulsion; wherein the metal ions in the first loaded extractant phase are dissolved into the aqueous acid solution, and
   (e) disengaging a first loaded aqueous acid phase and a first metal ion stripped extractant phase from the second unstable emulsion.

2. The method according to claim 1, wherein the first loaded aqueous acid phase is treated by one or more of an oil/water separator, a solid/liquid separator, and an organic odor sorbent wherein a first metal ion product is obtained.

3. The method according to claim 1, wherein the aqueous acid solution is aqueous sulfuric acid, hydrochloric acid, methanesulfonic acid, formic acid, monobasic phosphate, acetic acid, or an acid with a pKa value of <3.

4. The method according to claim 1, further comprising:
   (a) mixing the first metal ion stripped extractant phase with an aqueous stripping solution containing an alkali metal cation and an anionic base selected from the group consisting of $CO_3^{2-}$, $HCO_3^-$, $OH^-$, $PO_4^{3-}$, $HPO_4^{2-}$, $H_2PO_4^-$, $HS^-$, and $S^{2-}$, to produce a third unstable emulsion;
   (b) disengaging the third unstable emulsion to yield (i) a regenerated extractant phase stripped of the at least one cation removed from the first aqueous solution and (ii) a third aqueous phase containing a salt formed from the alkali metal cation and the at least one cation removed from the first aqueous solution; and (c) separating the regenerated extractant phase from the third aqueous phase.

5. The method according to claim 4, wherein the regenerated extractant phase is recycled to the mixing step (a) of claim 1.

6. The method according to claim 4, wherein the third aqueous phase containing sulfate is either recycled to be reused as the aqueous stripping solution, or is withdrawn and treated by one or more of an oil/water separator, a centrifuge, a solid/liquid separator, a sparger, and an organic odor sorbent to obtain a concentrate product of the at least one cation removed from the first aqueous solution.

7. The method according to claim 4, wherein the pH of the aqueous stripping solution is about 0 to about 14.

8. The method according to claim 4, wherein the pH of the third aqueous phase is about 2 to 14.

9. The method according to claim 1, wherein the weight ratio of the aqueous acid solution to the first loaded extractant phase is about 2:98 to about 98:2.

10. A method for treating a first aqueous solution for treating a first aqueous solution to remove at least one cation and at least one anion from the first aqueous solution, comprising:
  (a) mixing the first aqueous solution with an extractant phase to form a first unstable emulsion having an equilibrium pH of about 2 to about 12, wherein the extractant phase comprises:
    (i) an extractant that forms a floc with the at least one metal ion and the at least one anion, wherein the extractant comprises a positively charged molecule having at least 8 carbon atoms, and an anionic base;
    (ii) an optional diluent; and
    (iii) an optional modifier for modifying phase disengagement;
  (b) disengaging a first treated aqueous phase and a first loaded extractant phase from the first unstable emulsion, wherein a floc is present in the first loaded extractant phase;
  (c) separating the first loaded extractant phase from the first treated aqueous phase, wherein the at least one metal ion and the at least one anion are present in the first loaded extractant phase;
  (d) mixing at least a portion of the first treated aqueous phase with the extractant phase to form a fourth unstable emulsion having an equilibrium pH of about 5 to about 9;
  (e) disengaging a fourth treated aqueous phase and a fourth loaded extractant phase from the fourth unstable emulsion, wherein a floc is present in the fourth loaded extractant phase; and
  (f) separating the fourth loaded extractant phase from the fourth treated aqueous phase.

11. The method according to claim 10, wherein the fourth treated aqueous phase is further treated in one or more of an oil/water separator, a solid/liquid separator, and an organic odor sorbent to obtain purified water.

12. The method according to claim 10, wherein the fourth loaded extractant phase contains at least one cation selected from the group consisting of $Ni^{+2}$, $Fe^{III}$, $Al^{3+}$, $Zn^{2+}$, $Co^{2+}$, $Co^{III}$, $Fe^{2+}$, $Ca^{2+}$, $Mg^{2+}$, $Cd^{2+}$, $Mn^{2+}$, $Pb^{2+}$, $Hg^{2+}$, $CH_3Hg^+$, and $Cr^{III}$.

13. The method according to claim 10, wherein the separation of the fourth loaded extractant phase and the fourth treated aqueous phase is performed (1) in a settling basin with an overflow weir, or (2) in a centrifuge or a hydrocyclone having an overflow weir, wherein the fourth loaded extractant phase flows over the weir.

14. The method according to claim 13, wherein the overflow weir comprises a smooth entrance ramp, a curved lip, and a smooth exit ramp.

15. The method according to claim 10, wherein the fourth loaded extractant phase contains at least one anion selected from the group consisting of sulfate, selenate, nitrate, nitrite, phosphate, arsenate, arsenite, bromate, bromide, perchlorate, iodide, chloride, chromate(VI), permanganate, and sulfide ions, protonated versions thereof, neutral versions thereof, and combinations thereof.

16. The method according to claim 10, wherein the fourth loaded extractant phase is dewatered to thicken the floc.

17. The method according to claim 10, wherein the fourth loaded extractant phase is treated in a decanter to dewater and thicken the floc.

18. The method according to claim 10, wherein the fourth loaded extractant phase is treated to separate residual water from the floc using a decanter fitted with internal weirs to guide the surface flow of the floc in a narrowing channel such that the flow rate of the floc is maintained as the floc thickens, and where the flow rate is maintained until the floc reaches and flows over an overflow weir having a 15-45° approach ramp, smooth lip and 15-45° exit ramp, wherein the angle of the approach ramp is measured from vertical.

19. The method according to claim 10, wherein at least a portion of the fourth loaded extractant phase is sent to the mixing step (a).

20. The method according to claim 10, wherein the fourth loaded extractant phase contains metal ions, and further comprising stripping the metal ions from the fourth loaded extractant phase:
  a. mixing the fourth loaded extractant phase with an aqueous acid solution to form a fifth unstable emulsion, wherein the metal ions in the fourth loaded extractant phase are stripped into the aqueous acid solution, and
  b. disengaging a fourth loaded aqueous acid phase and a second metal ion stripped extractant phase from the fifth unstable emulsion.

21. The method according to claim 20, wherein the fourth loaded aqueous acid phase is treated by one or more of an oil/water separator, a solid/liquid separator, and an organic odor sorbent wherein a second metal ion product is obtained.

22. The method of claim 10, further comprising:
  (a) mixing at least a portion of the fourth treated aqueous phase with the extractant phase to form a sixth unstable emulsion having an equilibrium pH of about 8.5 to about 10.5;
  (b) disengaging a sixth treated aqueous phase and a sixth loaded extractant phase from the sixth unstable emulsion, wherein a floc is present in the fourth loaded extractant phase and wherein the sixth treated aqueous phase contains manganese particulates or calcium particulates; and
  (c) separating the sixth loaded extractant phase from the sixth treated aqueous phase.

23. The method according to claim 22, wherein the sixth treated aqueous phase is further treated in one or more of an oil/water separator, a solid/liquid separator that separates out the manganese particulates or calcium particulates, and an organic odor sorbent to obtain purified water.

24. The method according to claim 23, wherein the pH of the purified water is optionally adjusted to <9 using $CO_2$ gas.

25. The method according to claim 22, wherein at least a portion of the sixth loaded extractant phase is sent to the mixing step (a) of claim 10.

26. The method of claim 22, further comprising:
(a) mixing at least a portion of the sixth treated aqueous phase with the extractant phase to form an eighth unstable emulsion having an equilibrium pH of about 10.5 to about 12;
(b) disengaging an eighth treated aqueous phase and an eighth loaded extractant phase from the eighth unstable emulsion, wherein a floc is present in the eighth loaded extractant phase and wherein the eighth treat aqueous phase contains magnesium particulates; and
(c) separating the eighth loaded extractant phase from the eighth treated aqueous phase.

27. The method according to claim 26, wherein the eighth treated aqueous phase is further treated in one or more of an oil/water separator, a solid/liquid separator that separates out the magnesium particulates, and an organic odor sorbent to obtain purified water.

28. The method according to claim 27, wherein the pH of the purified water is adjusted to <9 using $CO_2$ gas.

29. A floc composition comprising: an oil soluble cation, a metal ion, a hydroxide, and an anion of the formula,

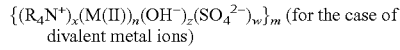
{$(R_4N^+)_x(M(II))_n(OH^-)_z(SO_4^{2-})_w$}$_m$ (for the case of divalent metal ions)

or

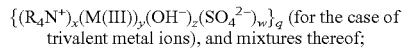
{$(R_4N^+)_x(M(III))_y(OH^-)_z(SO_4^{2-})_w$}$_q$ (for the case of trivalent metal ions), and mixtures thereof;

wherein x=2-4, n=0-1, Y=1-2, Z=2, and w=1-3; and each R is independently selected from alkyl, aryl, and alkylaryl, which may be substituted with Si, F, Cl, Br, O, N, S, or P; and wherein M(III) can be Fe(III) or Al, and M(II) can be Fe(II), Ni, Co(II), Cu, Zn, Pb, Cd, or Mn; and wherein m and q can be 1 to about 100,000.

30. A floc composition comprising: an oil soluble cation, a metal ion, a hydroxide, and an anion of the formula,

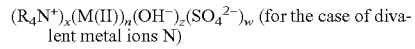
$(R_4N^+)_x(M(II))_n(OH^-)_z(SO_4^{2-})_w$ (for the case of divalent metal ions N)

or

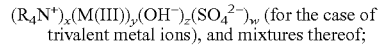
$(R_4N^+)_x(M(III))_y(OH^-)_z(SO_4^{2-})_w$ (for the case of trivalent metal ions), and mixtures thereof;

wherein x=2-4, n=0-1, Y=1-2, Z=2, and w=1-3; and each R is independently selected from alkyl, aryl, and alkylaryl, which may be substituted with Si, F, Cl, Br, O, N, S, or P; and wherein M(III) can be Fe(III) or Al, and M(II) can be Fe(II), Ni, Co(II), Cu, Zn, Pb, Cd, or Mn, and where the material is dispersed in a non-water soluble liquid such that the floc represents 1 to 100% by weight of the slurry.

31. A method for treating a first aqueous solution to remove a metal ion and sulfate ions from the first aqueous solution, comprising:
(a) mixing the first aqueous solution with an extractant phase to form a first unstable emulsion having an equilibrium pH of less than 5, wherein the extractant phase comprises:
   (i) an extractant that forms a floc with the metal ion and the sulfate ions, the extractant comprising a positively charged molecule and an anionic base;
   (ii) a water-immiscible diluent; and
   (iii) an optional modifier for modifying phase disengagement;
(b) disengaging a first treated aqueous phase and a first loaded extractant phase from the first unstable emulsion, wherein a floc is present in the first loaded extractant phase; and
(c) separating the first loaded extractant phase from the first treated aqueous phase, wherein the metal ion and the sulfate ions are present in the first loaded extractant phase;
wherein the metal ion in the first aqueous solution is selected from the group consisting of Fe(III), Al, and Cu; and
wherein the anionic base of the extractant is $OH^-$, $CO_3^{2-}$, or $HCO_3^-$.

* * * * *

UNITED STATES PATENT AND TRADEMARK OFFICE
CERTIFICATE OF CORRECTION

PATENT NO. : 8,585,903 B2  Page 1 of 1
APPLICATION NO. : 12/527325
DATED : November 19, 2013
INVENTOR(S) : Monzyk et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1128 days.

Signed and Sealed this
Twenty-second Day of September, 2015

Michelle K. Lee
*Director of the United States Patent and Trademark Office*